July 30, 1946.   H. C. FORD   2,405,028
FIRE CONTROL APPARATUS
Original Filed Sept. 1, 1926   12 Sheets-Sheet 1

INVENTOR.
Hannibal C. Ford
BY Moahley and Gill
ATTORNEYS.

July 30, 1946.   H. C. FORD   2,405,028
FIRE CONTROL APPARATUS
Original Filed Sept. 1, 1926   12 Sheets-Sheet 2

INVENTOR.
Hannibal C. Ford
BY
Noah Ley and Gill
ATTORNEYS.

July 30, 1946.  H. C. FORD  2,405,028
FIRE CONTROL APPARATUS
Original Filed Sept. 1, 1926  12 Sheets-Sheet 5
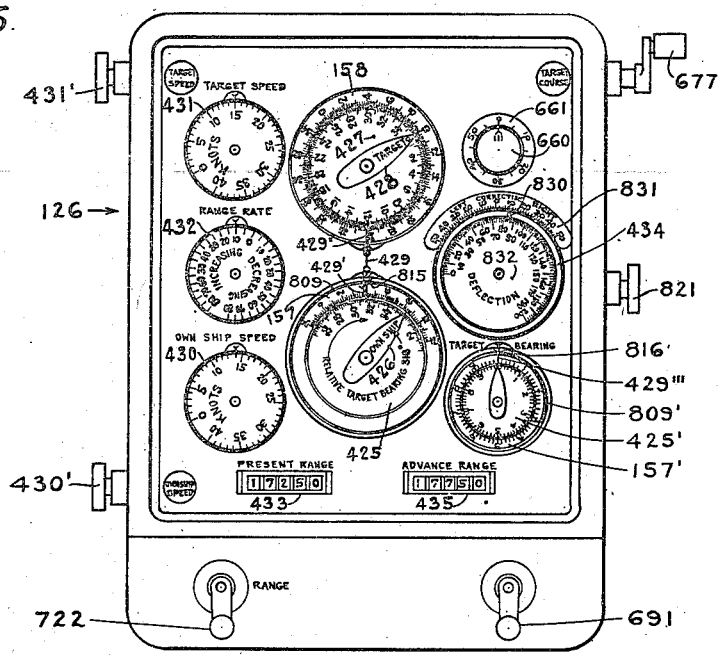
Fig. 5.
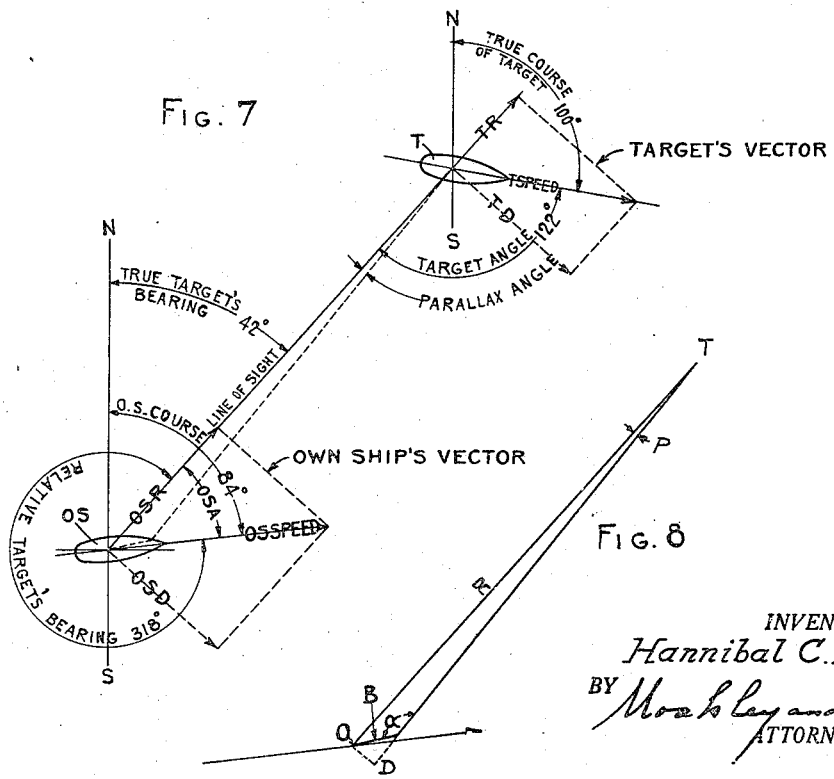
Fig. 7
Fig. 8
INVENTOR.
Hannibal C. Ford
BY
ATTORNEYS.

Fig. 9

July 30, 1946.    H. C. FORD    2,405,028
FIRE CONTROL APPARATUS
Original Filed Sept. 1, 1926    12 Sheets-Sheet 7
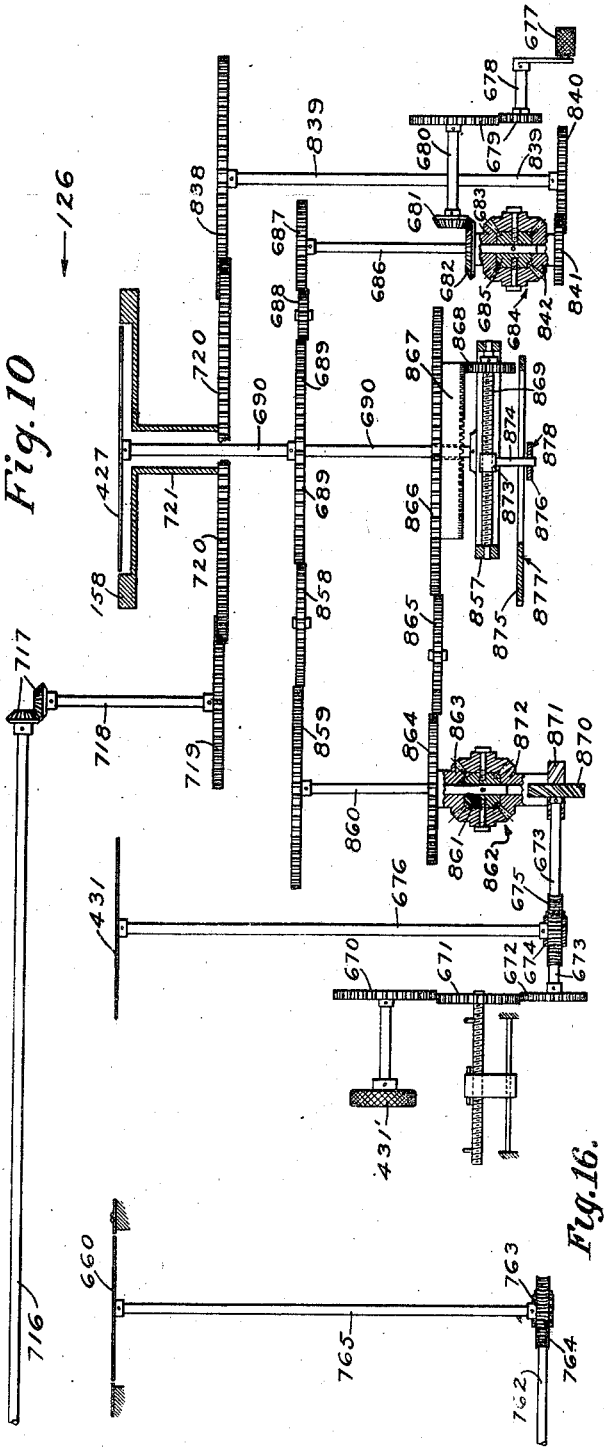
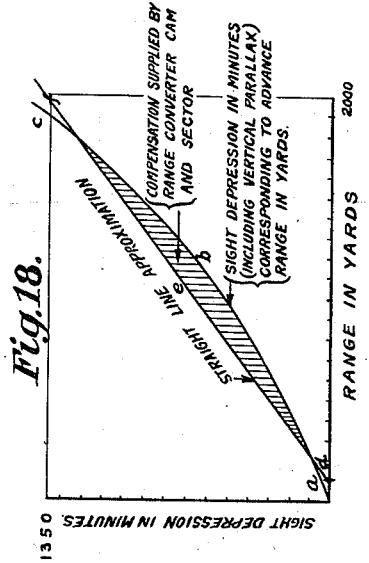
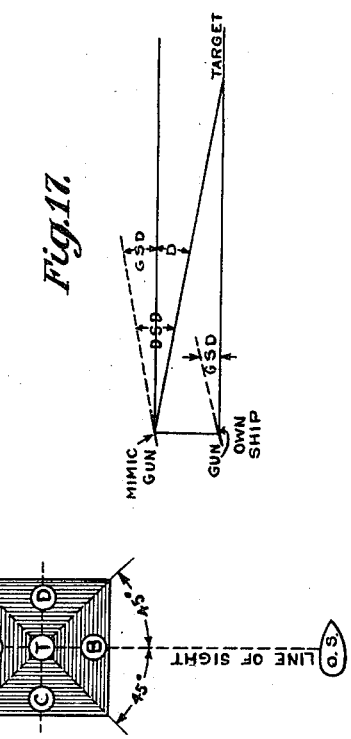
INVENTOR
*Hannibal C. Ford*
BY
*Moakley and Gill*
ATTORNEYS

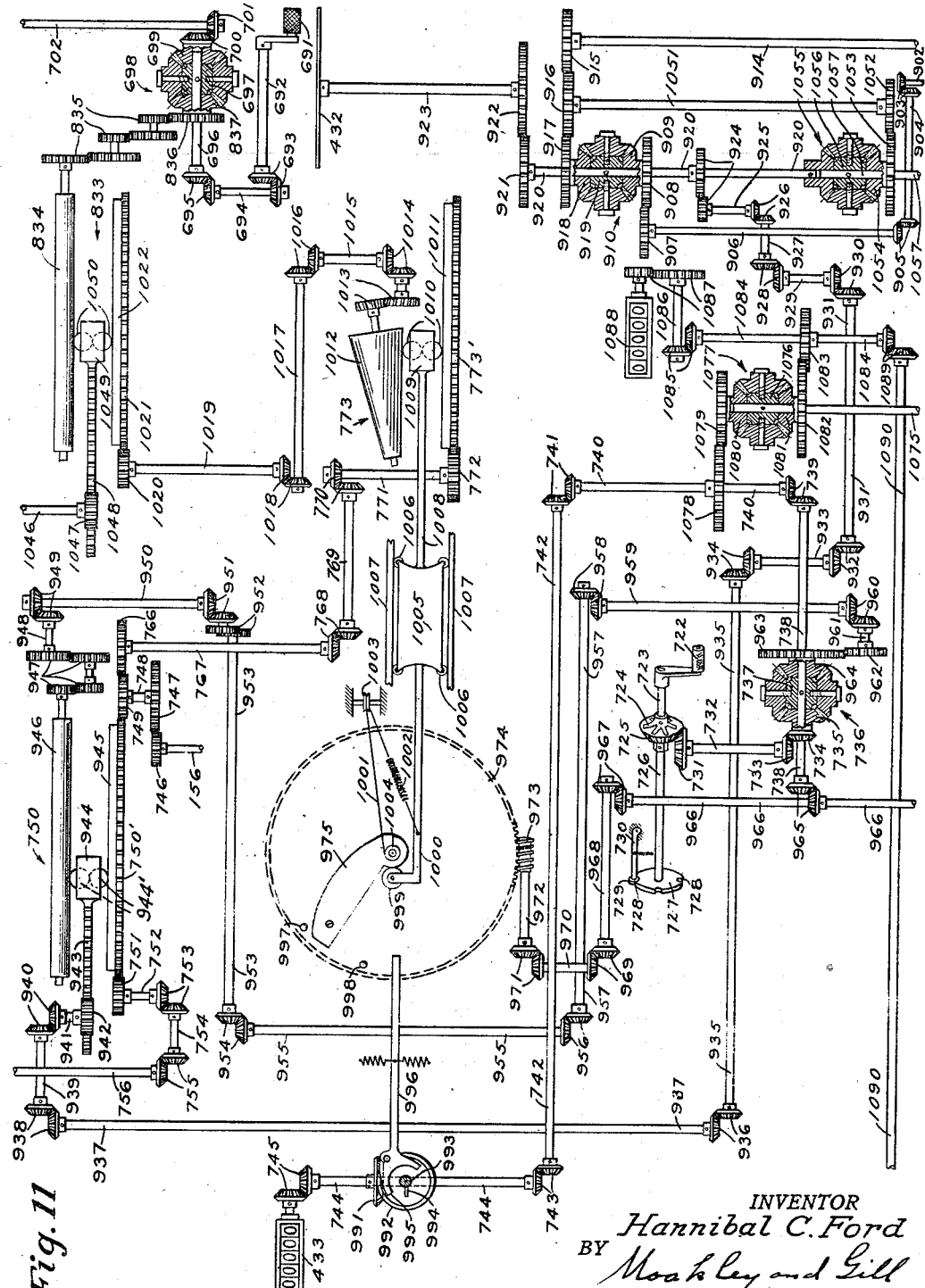

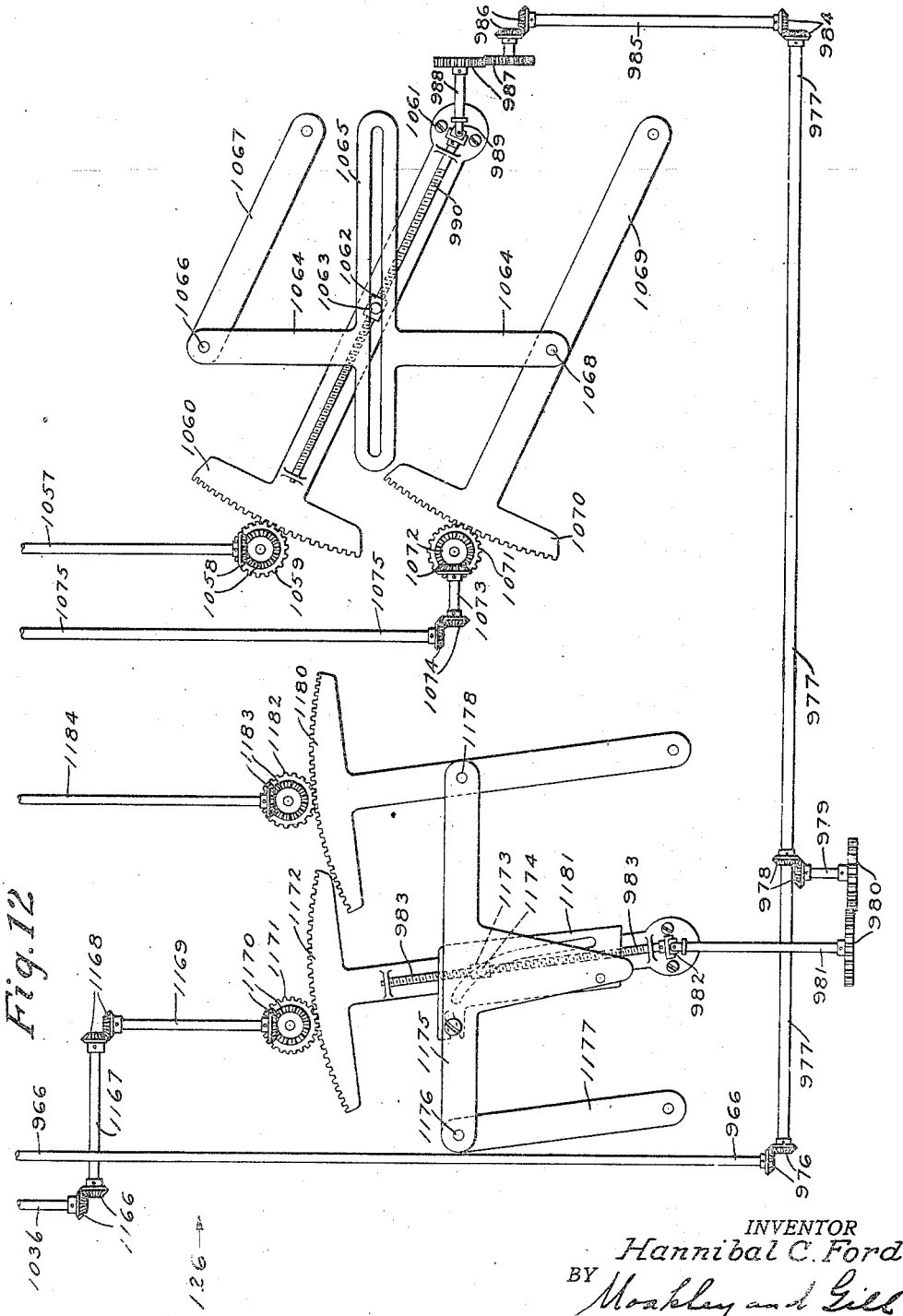

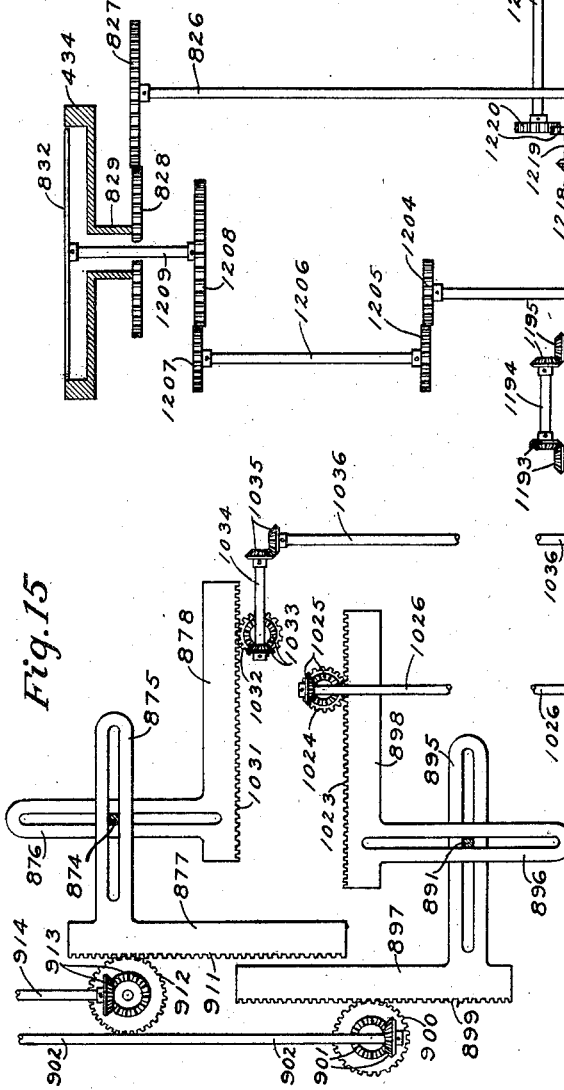

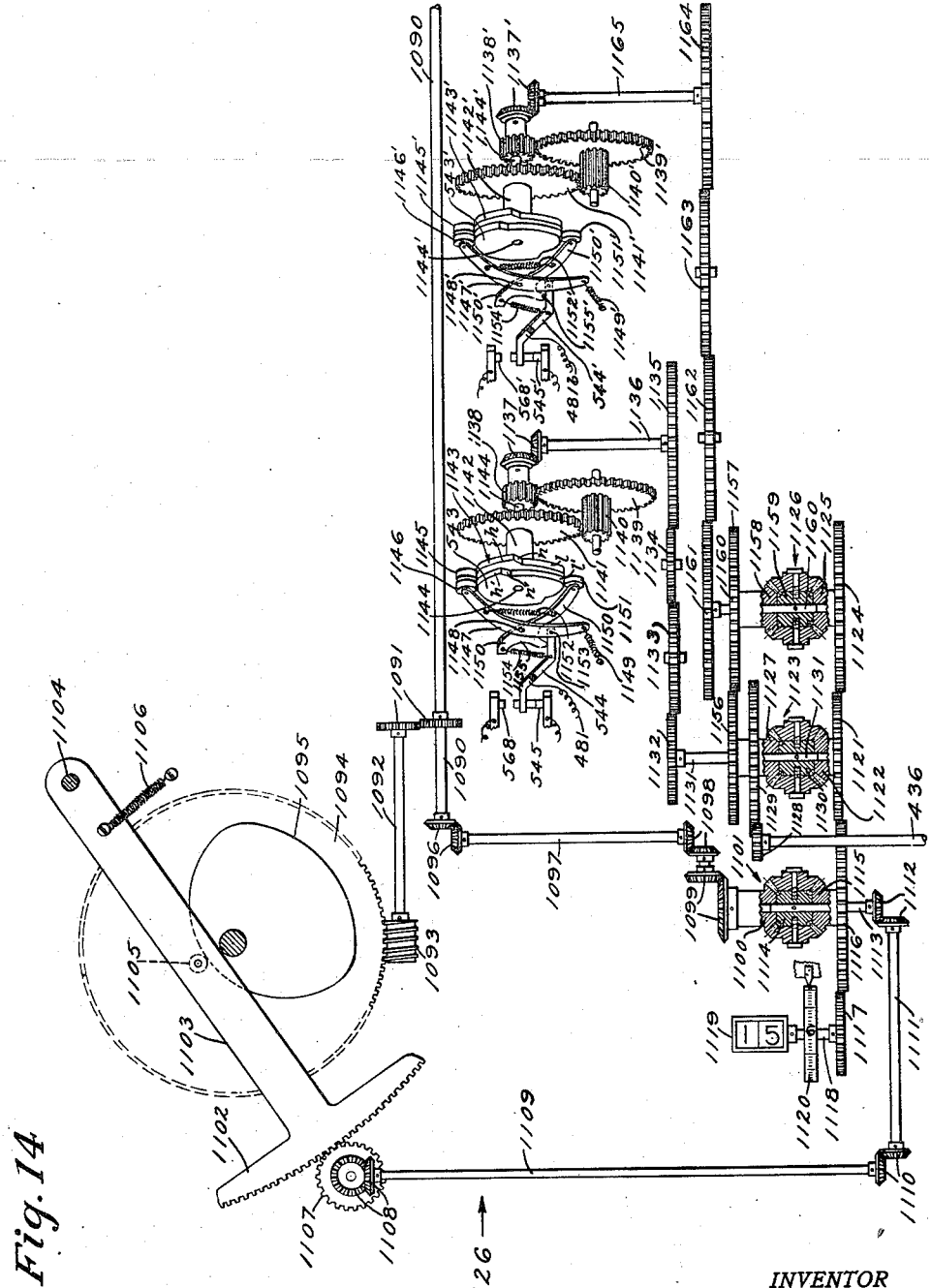

July 30, 1946.  H. C. FORD  2,405,028

FIRE CONTROL APPARATUS

Original Filed Sept. 1, 1926   12 Sheets—Sheet 12

INVENTOR
*Hannibal C. Ford*
BY *Moakley & Gill*
ATTORNEYS

Patented July 30, 1946

2,405,028

UNITED STATES PATENT OFFICE 2,405,028

FIRE CONTROL APPARATUS

Hannibal C. Ford, Jamaica, N. Y., assignor to Ford Instrument Company, Inc., Long Island City, N. Y., a corporation of New York Application September 1, 1926, Serial No. 133,021
Renewed July 27, 1935

136 Claims. (Cl. 33—49)

This invention relates to apparatus for controlling the pointing, training and firing of the guns of a battery, in which apparatus there is employed a director having a computing instrument associated with it.

At the present time it is the usual practice to control the guns of warships by means of sighting devices or directors as they are called, which are placed in elevated positions from which better views of the target can be obtained than from positions at or near the guns. Transmitters are associated with these directors for sending to the guns indications of the train and the elevation which should be given to the guns for the azimuth and range of the target. These indications are suitably corrected in accordance with the various factors which affect the proper setting of the guns and to take account of differences between the positions of the directors and the guns which they are adapted to control, in order that most accurate firing may be obtained.

The guns adapted to be controlled in elevation and train from a director may also be fired from the director. For this purpose electrical circuits controlled by suitable contact devices at the director are provided. In some cases these devices are adapted for actuation by an operator of the director while in other cases they are automatically actuated.

The aim of guns on shipboard is affected by angular motion of the ship around an axis parallel to the line of sight to the target, thereby introducing errors, commonly called trunnion tilt errors, depending upon the elevation of the guns and the amplitude of the roll of the ship. Various arrangements have been proposed for correcting these errors in order that the guns may be maintained in vertical planes passing through the predicted position of the target, or brought into such position when they are to be fired. One of the earliest arrangements proposed for this purpose depended upon the use of a pendulum for swinging the sighting device of the director about an element constituting a mimic or dummy gun, so as to maintain these parts in a vertical plane during the roll of the ship. Other arrangements have sought to accomplish the same result by means of spirit levels. In order to overcome the disadvantages attending the use of pendulums and levels for this purpose, it has been proposed to employ an optical instrument through which an observer may view a distant point, such as the horizon, at a substantial angle to the line of sight to enable him to maintain the elements of the director in proper relation to produce the correction which should be applied to the position of the controlled guns to compensate for the roll of the ship about an axis parallel to the line of sight.

These prior arrangements for compensating for the effect upon the guns of angular movement of the ship about an axis parallel to the line of sight, or for cross-levelling, as it is now commonly called, require the movement of comparatively heavy parts of the instrument with consequent increased expenditure of energy and lessened accuracy, for the operator who performs this function is working against the trainer and pointer both of whom are manipulating the same parts in the performance of their duties.

In directors of the earlier types, the data required for setting the various elements thereof, such as gun elevation, deflection, etc., has either been transmitted from distant stations, or has been determined at the director, and in either case, has been applied to the director by setting the elements manually in accordance with such data.

It is an important object of the present invention to establish an operative combination of the distinctive director mechanism with other mechanism, whereby there may be an interchange of quantities developed in one mechanism and dispensed thereby to and used in the other. If desired, the director mechanism may constitute an instrument of one category, while its associated mechanism may be in the nature of an instrument of a different type, the different kinds of instruments being so combined that they are capable of automatically contributing essential actuations to each other to supply movements and mathematical quantities not developed in the recipient instrument. Thus, the laborious and continual manual introduction of necessary data into the director is obviated, as is hand computation and the remote transmissions thereof. The associated instruments through their automatic interaction reduce the chance of human error and simplify the director operation, as well as rendering it more reliable and continuous, whereby instantaneous information is constantly available.

An instrument of the type known as a range keeper for calculating the data required for the operation of the director may constitute the companion instrument for the director. The indications of the range keeper may be utilized for causing the director to follow a target at such times as the latter cannot be seen through the sighting devices of the director. Certain elements of the range keeper are actuated from the ship's compass and others by the movement of the director as it is turned in azimuth in following a target. The range keeper is power-driven, and in turn automatically actuates some of the elements of the director in accordance with settings which should be given them for the particular conditions under which the director is being used. Provision is also made for the manual actuation of these elements, if, for any reason, the range keeper becomes ineffective for this purpose through accident, or otherwise.

Another object of this invention is to produce a director of simple construction in which the effect of the angular movement of the ship about an axis perpendicular to the line of sight is automatically compensated by means of relatively light optical elements associated with the trainer's and pointer's telescopes proper which are mounted in fixed relation to the director. The optical elements are stabilized by means of a gyroscope so that the target continually appears in the fields of both telescopes in spite of the angular movement of the ship, thereby making it unnecessary for either the trainer or the pointer to impart any movement to their telescopes while operating the instrument, other than that required to follow the target in azimuth, which is done by the trainer.

Associated with the optical elements of the director is a member which is elevated and trained in accordance with the elevation and train which should be given to the real guns, and which, therefore, may be regarded as a mimic gun. The movements of the mimic gun are reproduced at the real guns by a suitable signal transmission system. The director has a member for controlling one element of an automatic firing device, the other element of which is maintained in a predetermined position by the gyroscope. The position of the mimic gun with respect to the member is controlled automatically by the range keeper in accordance with sight depression, i. e., the angular relation which the real guns should bear to the line of sight. The position of the member is controlled by the pointer in accordance with director correction, i. e., the point on the roll of the ship at which firing is desired.

It is a further object to provide, in connection with the training and pointing elements of the director, an arrangement whereby the errors due to angular movements of the ship around an axis parallel to the line of sight may be more effectively eliminated with less expenditure of energy by the operator who performs this duty. To this end, an optical system is provided for viewing the horizon, or other distant point at a substantial angle to the line of sight, and as an auxiliary to this arrangement means are provided for viewing a reference mark associated with the gyroscope, which through its connection with the mirrors of the trainer's and pointer's telescopes effects the stabilization of the image in the field of view. Thus, through the auxiliary means there is produced an artificial horizon, which may be used in case the real horizon is obscured.

The instrument for viewing the horizon, or the reference point of the gyroscope, as the case may be, is suitably connected to a member associated with the mimic gun and with a member which carries the main mirrors, so that movement is imparted to the latter to displace the images of the target in the pointer's and trainer's telescopes. As the pointer and trainer restore the displaced images to their proper positions in the fields of view of their telescopes, they displace the mimic gun in elevation and train in accordance with the movement to be applied to the real guns to compensate for the effect of the angular movement of the ship around an axis parallel to the line of sight. The correctional movements of the mimic gun are transmitted to the real guns whereby the cross-levelling correction is applied to them.

Since the fields of view of the telescopes are stabilized, the pointer and trainer receive no indications of the angular movement of the ship. Such indications are necessary, particularly for the pointer to enable him to make adjustments of the elements of the director which are under his control and to show at any instant how far the guns are from the point at which they should be fired. Means are therefore provided for this purpose consisting of an optical system for producing in the field of view of the pointers' telescope an image of a member which partakes of the movement of the ship.

For the convenience of the trainer, a corresponding image is produced in his telescope in order that he may know when the guns are to be fired, so that he may most accurately manipulate the portions of the director under his control as the instant for firing approaches.

In director firing systems it is customary to employ a plurality of directors between which the control of the guns may be divided or to provide stand by directors for use in case those in control are disabled or destroyed. In systems of this character the guns and the directors are usually referred to a common point of reference which may be at the main fire control position or at some other location on the ship. It is, therefore, necessary to apply to the guns and the directors, corrections for any factors which may be dependent upon the positions of the guns and the directors with respect to the reference point, and which, if not corrected, might cause the introduction of appreciable errors. A correction of this nature is required for each of the directors which is so far from the point of reference that the errors resulting therefrom are not negligible. One of such errors is that commonly known as horizontal parallax which depends upon the horizontal distance between the director and the reference point, as a base line, the bearing of the target with respect to this base line and the range of the target.

Provision is, therefore, made in the instrument for applying corrections to compensate for the errors mentioned above as well as other corrections, such as deflection, drift and the like. In general, corrections dependent upon the relative positions of the guns and the directors are introduced between the elements of the directors and the transmitters so that the latter send corrected indications to the guns, while the other corrections are introduced between the sighting elements and the mimic gun so that the act of maintaining the former on the target causes correctional displacements to be imparted to the mimic gun which are sent to the guns by the transmitters of the director.

The particular nature of the invention as well as other objects and advantages thereof will appear more clearly from a description of a preferred embodiment thereof which is shown in the accompanying drawings in simplified form by the omission of structural details.

In these drawings,

Fig. 5 is a face view of the range keeper showing its dials;

Fig. 7 is a geographical diagram, showing the relation of own ship and a target at a given instant;

Fig. 8 is a mathematical diagram of the relation of own ship and the target at such instant;

Figure 9:
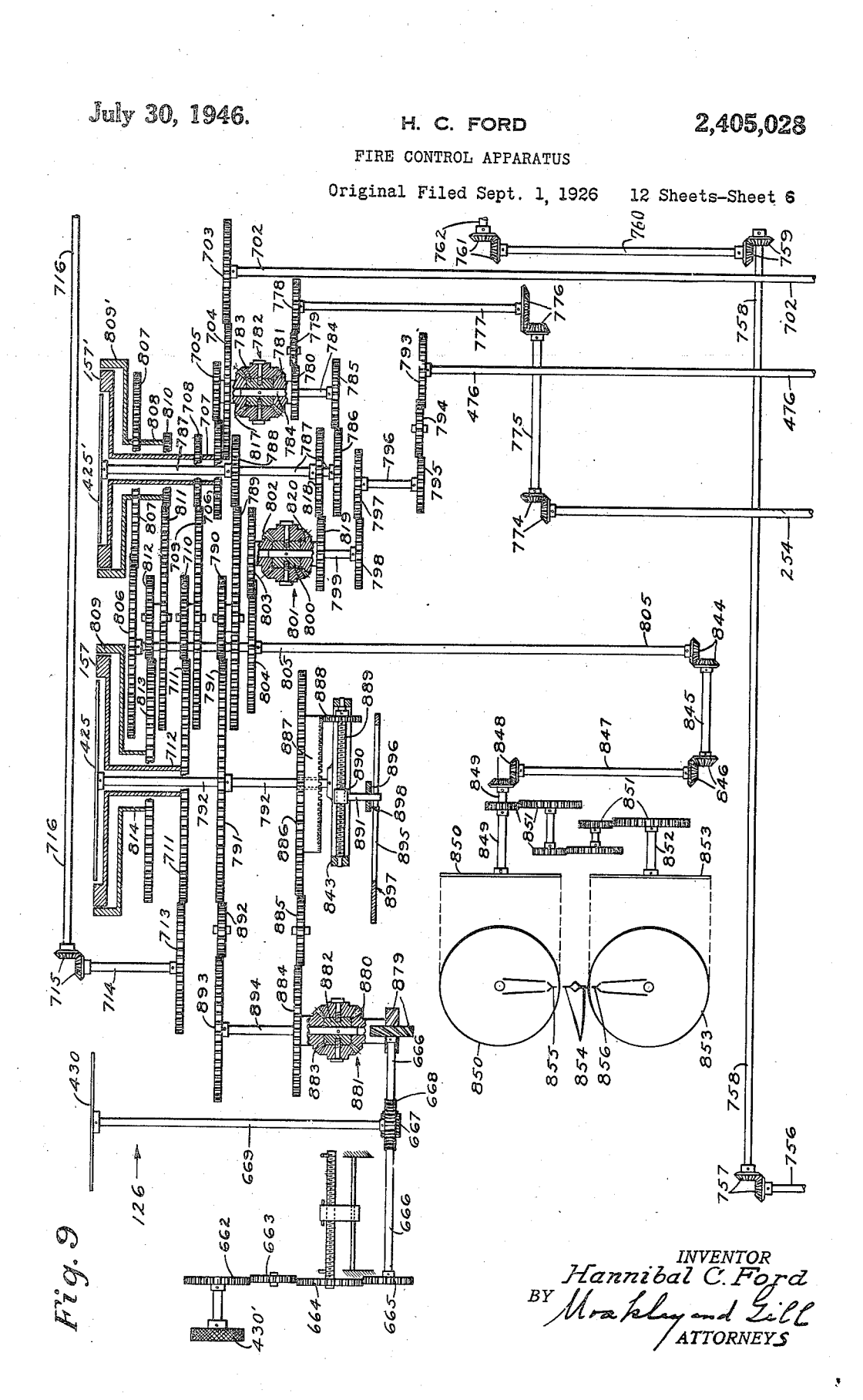

Figs. 9 to 14 inclusive, taken in a group, constitute a diagrammatic illustration of the mechanism of the range keeper which is associated with the director;

Fig. 15 shows the mechanical own ship and target vectors, as viewed perpendicularly to their positions in Figs. 9 and 10;

Fig. 16 is a diagram showing the variable range relation between own ship and a target, as well as the changeable target bearing;

Fig. 17 is another diagram illustrating the combining of the gun sight depression and the correction for vertical parallax to establish the director sight depression;

Fig. 18 is a diagram, which discloses a method of obtaining sight depression from advance range as effected through the mechanism of the range keeper.

Figure 19:
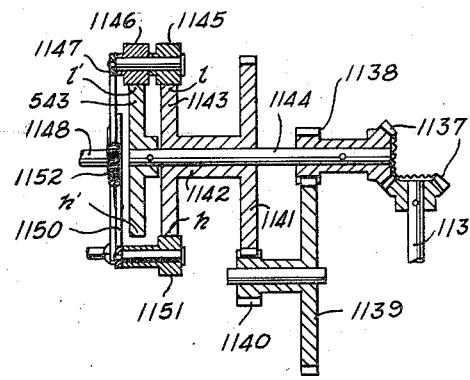
Figure 20:
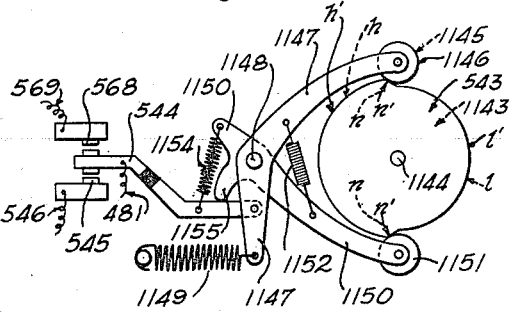
Figure 21:
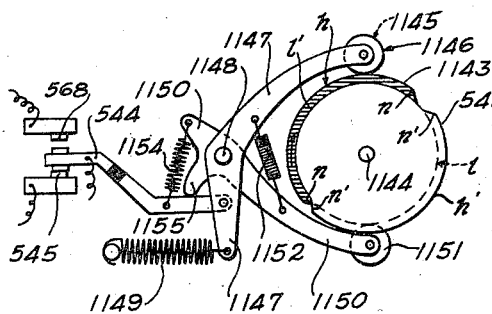
Figure 22:
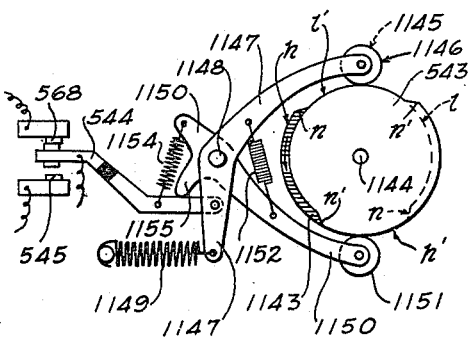

Fig. 19 is a vertical section through one of the similar follow up mechanisms shown in Fig. 14;

Fig. 20 is an elevational view of the mechanism of Fig. 19 showing the high and low speed cams in coincident positions and with the movable contact in its neutral position;

Fig. 21 is a similar view showing the high and low speed cams in positions which they occupy when sight depression is being measured in one direction, and with the movable contact engaged with the proper fixed contact; and Fig. 22 is another similar view disclosing the high and low speed cams in other positions which cause the movable contact to engage the other of the fixed contacts in accordance with the reverse direction of sight depression.

Figure 1:
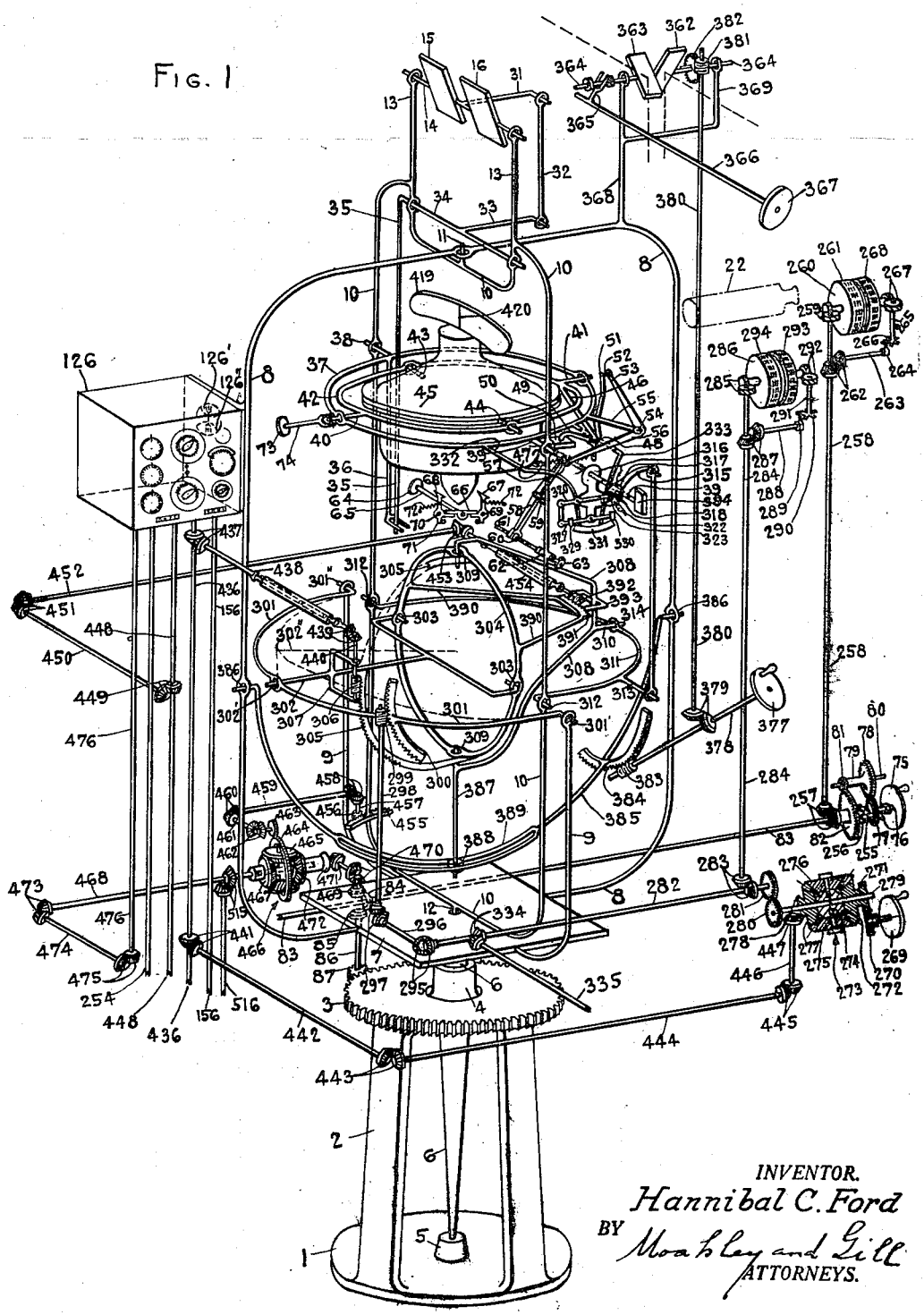
Fig. 1 is a skeletonized perspective view showing diagrammatically the framing and certain of the operating parts of the instrument in its simplified form.

Referring now to the drawings, and examining the assembly of the director first, 1, shown in Fig. 1, represents a base adapted to be bolted or otherwise secured in rigid and non-rotative manner to a platform at an observation station which will be associated with one of two relatively movable objects, one of which may be a navigable craft. For the purposes of this disclosure, this craft may be regarded as a warship, but it is to be understood that the use of the invention is not limited to marine vessels, since it is obvious that a land fortification and a marine vessel, or a land fortification and an aerial craft, as well as a marine craft and an aircraft, constitute relatively movable objects, and it will become clear that by embodying the invention in a suitable design, it is adaptable to use in a wide variety of conditions.

The base 1 of the director is the bottom of a pedestal, which further comprises legs 2 that support a stationary gear or annular rack 3 at their upper ends. At the center of the annular rack 3 is a journal 4, which is aligned with another journal 5 in the base 1, these journals rotatively mounting a vertical training shaft 6, which projects above the journal 4. Supported upon the upper end of the shaft 6 to turn therewith about a normally vertical axis is a main frame, which, for simplicity, is shown in Fig. 1 as comprising a bottom plate 7, a major frame 8 and standards 9, which lie in a vertical plane normal to the vertical plane that contains the frame 8.

With an axis of rotation coincident with that of the main frame 8, a correction frame 10 is pivotally connected at 11 and 12 with such major main frame, and has upwardly extending standards 13, in the upper ends of which a shaft 14 is journalled. Mirrors 15 and 16 for viewing a distant object, such as a target, are mounted on the shaft 14 at a suitable angle to the incident light rays.

Figure 3:
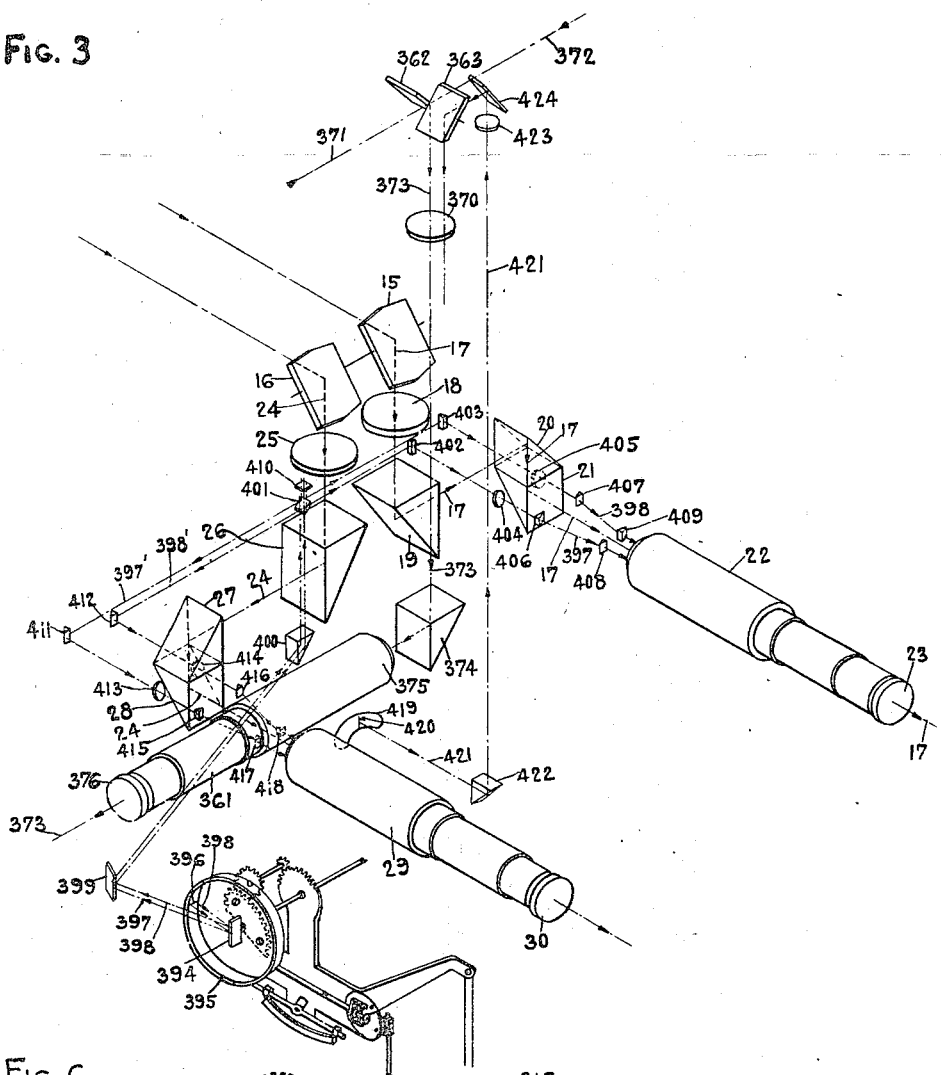
Fig. 3 is a perspective diagram of the optical systems forming part of the instrument, but which are segregated from Figs. 1 and 2 to avoid obscurity.

As shown in Fig. 3, image rays received by the mirror 15 may be traced by the central ray 17 through the objective lens 18, and prisms 19, 20 and 21 into the trainer's erecting and eye-piece system contained in the tube 22, having an ocular 23. Concurrently, the image rays at the mirror 16 are reflected, as may be traced by the central ray 24, through the objective lens 25, and prisms 26, 27 and 28 into the pointer's erecting and eye-piece system contained in the tube 29 having an ocular 30.

To keep the mirrors 15 and 16 on the target, they are stabilized, as shown in Fig. 1, wherein the mirror shaft 14 is provided with an arm 31 which is connected by a link 32 to another arm 33 co-extensive with arm 31. The arm 33 is rigid with a rock-shaft 34 journalled in the standards 13 carried by the correction frame 10.

Rigidly attached to and depending from the rock-shaft 34 is an actuating arm 35, the unattached end of which is received by the bifurcated end of a shorter arm 36 which is rigid with, depends from and is stabilized by an outer gimbal ring 37, as subsequently explained. The gimbal ring 37 is provided with trunnions 38 and 39 pivotally mounted in the correction frame 10.

Since the shorter arm 36 is stabilized, as will be hereinafter explained, the parts of the instrument that accompany the ship as it rolls will have an angular displacement with respect to the shorter arm 36 equal to the angle of the roll of the ship. Inasmuch, however, as the radial length of the arm 35 is twice that of the shorter arm 36, the angular displacement of the arm 35 is equal to only one-half the angle of the roll of the ship. Thus, rock-shaft 34, its lever arm 33, lever arm 31, mirror shaft 14 and mirrors 15 and 16 turn relatively to the ship through one-half the angle of roll of the ship. Accordingly, the mirrors, while rocked through this lesser angle with respect to the parts which sway with the ship, have their entering image rays stabilized and therefore maintain the target in the fields of view of the trainer and pointer.

Pivotally supported in the outer gimbal ring 37 by trunnions 40 and 41 journalled therein is an inner gimbal ring 42, in which other trunnions 43 and 44 are pivotally mounted to support a gyroscope 45 to which they are attached. This gyroscope is of the electric induction motor type, and when energized tends to remain fixed in space in accordance with the principle of such devices.

Depending from the inner gimbal 42 is a bracket 46, attached to the lower end of which is a spring 47. As the spring is also affixed to the casing of the gyroscope, it tends to draw the bracket 46 toward the latter. This action is opposed by a linkage of parts, including a vertically disposed bell crank lever pivoted at 48 to the depending bracket 46, and having an arm 49 the end of which bears on a lug 50 projecting from the casing of the gyroscope. Another arm 51 of this bell crank lever has, through the medium of an anti-friction thrust pin 52, a connection with the end of an arm 53 of a horizontally disposed bell-crank lever. The latter is fulcrumed at 54 to the outer end of a bracket 55, which projects from the outer gimbal ring 37.

The other arm 56 of the horizontal bell-crank lever is connected by another anti-friction thrust pin 57 to a double arm lever 58, which has an intermediate pivotal connection to a bracket 59 affixed to one side of the correction frame 10. At its lower end, the lever 58 is bifurcated and has a travelling nut 60 pivoted therein, the nut being on a threaded shaft 61. This shaft has an unthreaded portion that is journalled in a bearing 62 carried by the correction frame 10, there being collars fixed to the shaft on opposite sides of the bearing to prevent longitudinal displacement of the shaft 61. A knob 63 on the outer end of the shaft 61 makes it possible to turn it for adjustment purposes referred to later.

As the gyroscope tends to remain fixed in space, the trunnions 43 and 44 projecting therefrom into pivotal connection with the inner gimbal ring 42 stabilize the latter about the trunnion axis 40—41. The inner gimbal ring 42 is also stabilized about the trunnion axis 43—44, since its depending bracket 46 is pivotally connected at 48 to the vertical bell-crank lever 49—51, which is stabilized by having its arm 49 bearing on the gyroscope, while its arm 51 bears against the arm 53 of the horizontal bell-crank lever, the other arm 56 of which reacts against the upper end of the fixedly positioned lever 58. The spring 47 contributes by eliminating lost motion in the linkage comprising the co-acting bell-crank levers.

Because of the stabilization of the inner gimbal ring 42 about the axis 43—44, the trunnions 40 and 41, which pivotally connect the inner and outer gimbal rings, stabilize the outer gimbal ring 37 about the trunnion axis 38—39, whereby the arm 36 of the mirror-control is stabilized.

Times will probably occur when the gyroscope 45 will wander a little and it will be desirable to adjust the angle of the mirrors 15 and 16 mechanically without precessional manipulation of the gyroscope. The knob 63 will accordingly be operated to turn the threaded shaft 61 in the proper direction to effect the desired mirror adjustment. The travelling nut 60 will thus be shifted longitudinally of the threaded shaft 61, resulting in a partial rotation of the double arm lever 58. If the upper end of the lever 58 is consequently moved outward, for example, the pin 57 will push the arm 56 of the horizontal bell-crank lever outward, the arm 53 thereof moving inward. This causes the anti-friction pin 52 to be thrust against the upper end of the arm 51 of the vertical bell-crank lever, moving it inward. As the extremity of the other arm 49 of the vertical bell-crank lever rests on the lug 50 of the gyroscope, it cannot move down and becomes, at such times, the fulcrum of the lever 49—51, which under these circumstances does not act as a bell-crank.

Accordingly, as the upper end of the arm 51 is thrust inward, the lever 49—51 swings upward about the inner extremity of its arm 49, raising the pivot 48, and, of course, the bracket 46, which depends from the inner gimbal ring 42. The latter is tilted about the trunnion axis 43—44, as is the outer gimbal ring 37 because of the trunnions 40—41. As the outer gimbal ring 37 tilts, the arm 36 rigidly combined therewith necessarily is angularly displaced about the trunnion axis 38—39, the lower end of the arm 36 correspondingly displacing the lower end of the actuating arm 35 of the rock shaft 34. Simultaneously, the rock-shaft lever arm 33 is likewise displaced, and through the link 32 and 31 similarly moves the mirror shaft 14, thereby correctively tilting the mirrors 15 and 16, as desired. If the knob 63 be turned in the reverse direction, there will be a reversal of action, and the mirrors will be tilted in the reverse direction. In performing the mirror-adjusting operation the reaction against the gyroscope is not sufficient nor does it last long enough to produce appreciable precession thereof.

Excessive, or any, precessional inclination of the gyroscope 45 may be removed by directly precessing the latter. If the gyroscope has precessed about the trunnion axis 40—41, a knob 64 (see Fig. 1) is turned in the proper direction, and with it a shaft 65, thereby tilting a double arm lever 66 secured on the inner end of this shaft. Actuated by one or the other of the arms of the lever is a force-applying bell-crank lever 67 or 68, which bell-cranks are similar, one being pivoted at 69 and the other at 70.

Each bell-crank lever 67 and 68 has a lug 71 adapted to be brought into an engagement with a pin or stop, as a spring 72 draws the bell-crank lever away from the lower pointed end of the casing of the gyroscope 45. Either spring 72 is adapted to yield to manual force applied through the lever 66, which acts only in one direction at a time, whereby either the precessing bell-crank lever 67 or 68 is swung against the lower end of the gyroscope casing, so applying a torque about the trunnion axis 43—44, thereby causing the gyroscope 45 to precess about the trunnion axis 40—41.

Should gyroscopic wandering take place about the trunnion axis 43—44, restoration of the spinning axis of gyroscope 45 to a vertical position may be accomplished by turning another knob 73, shown in Fig. 1. This knob is on shaft 74, which is forked at its inner end to co-act with a pin projecting transversely and beyond both sides of the trunnion 40. In this way, a torque is applied about the trunnion axis 40—41 and the correctional precession will accordingly take place about the trunnion axis 43—44.

With the mirrors 15 and 16 stabilizing the image rays against vertical displacement from the target, as described, it remains necessary to maintain the mirrors on the target when it moves horizontally away from the point on which the sight optics are focused. Any relative azimuthal displacement of the target and the craft carrying the gun director will be evidenced in the trainer's telescope by the displacement of the target's image therein with respect to the vertical cross wire of the telescope. Thereupon, the trainer operates the hand wheel 75 shown in Fig. 1 as being secured to a shaft 76 to the inner end of which a gear pinion 77 is affixed. This pinion drives a gear 78 carried by a sleeve 79 that is freely revoluble on a shaft 80, and also secured to the sleeve 79 is a pinion 81, which meshes with a gear 82 rigidly mounted on a training shaft 83.

Extending under the bottom plate 7 of the main frame, the shaft 83 is provided with a bevel gear 84, which meshes with another bevel gear 85 on the upper end of a vertically disposed shaft 86. Secured to the lower end of the shaft 86 is a pinion 87 which is in mesh with the stationary annular rack 3. Operation of the trainer's hand wheel 75 causes the pinion 87 to be oriented about the annular rack 3, and, since the shafts 83 and 86 are carried by the main frame, the latter and the parts mounted thereon are trained. These parts include the correction frame 10, the standards 13 of which support the mirror shaft 14 and the mirrors 15 and 16, whereby these mirrors are turned in azimuth as much as is necessary to cause them to continue to bear on the target during relative displacement of it and own ship.

Figure 2:
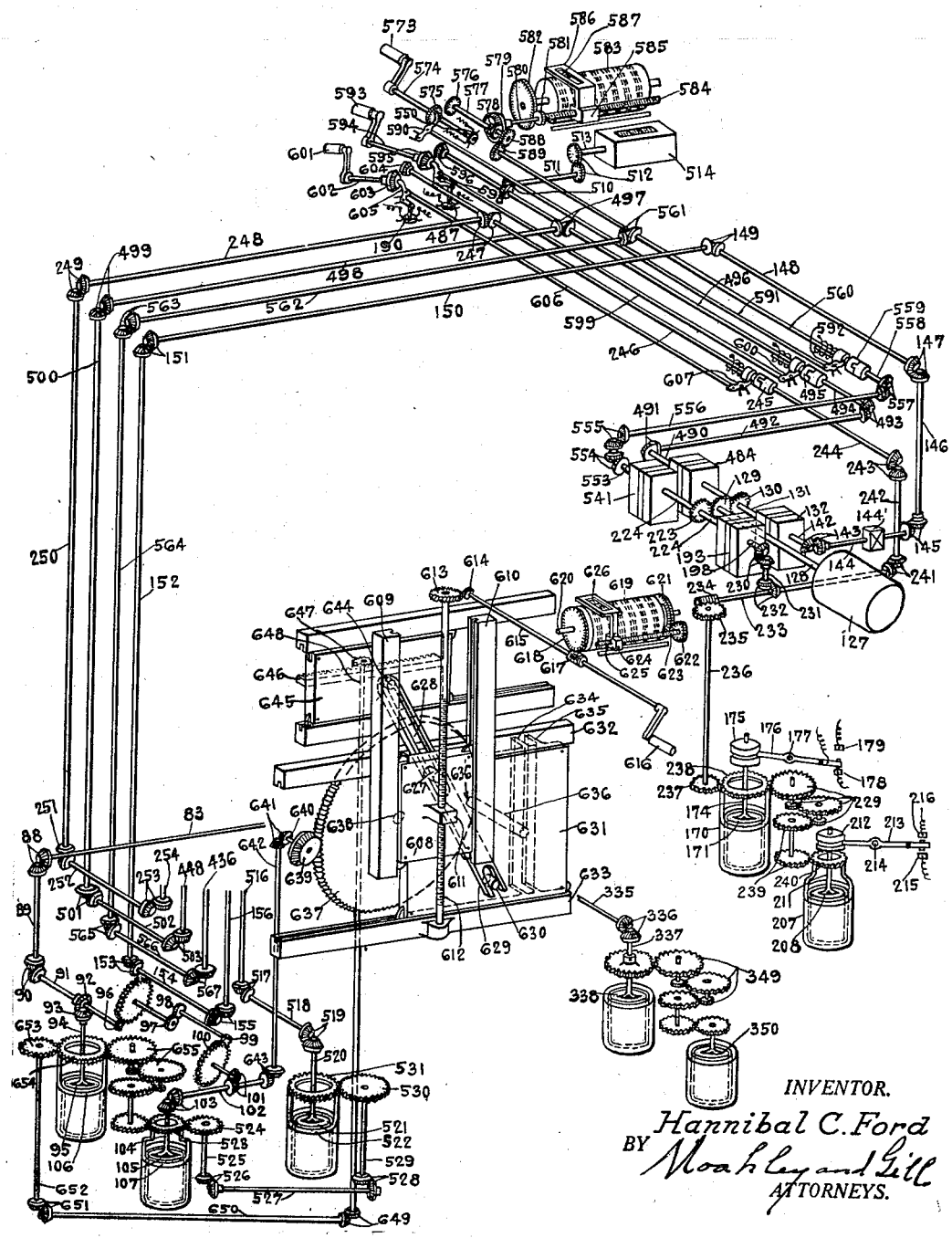
Fig. 2 is complementary to Fig. 1, and shows in the same manner other elements of the instrument that in practice are draped about and carried by the parts of Fig. 1 that are adapted to be oriented, which elements are shown in Fig. 2 to preserve clearness.

The parts illustrated in Fig. 2 are supported by and turn with the main frame shown in Fig. 1, and the shaft 83 is shown in Fig. 2, where it drives through gears 88, shaft 89 and other gears 90 to turn shaft 91. A bevel gear 92 on the shaft 91 drives a similar gear 93 on a shaft 94, which in turn effects rotary displacement of a rotor 95 of a transmitter of fine measures of the training of the gun director. Such fine measures integrate into larger amounts of train, which are more conveniently noted in terms of coarse measures. To this end, the shaft 91 is provided with a pinion 96 of a gear reduction train comprising other gears 97, 98, 99 and 100, the last named gear being on a shaft with one of a pair of bevel gears 101, the other bevel gear of which is fixed on a shaft 102. This shaft turns a pair of gears 103 one of which is on a shaft 104 that turns a rotor 105 of a transmitter of coarse measures of train of the instrument.

Figure 4:
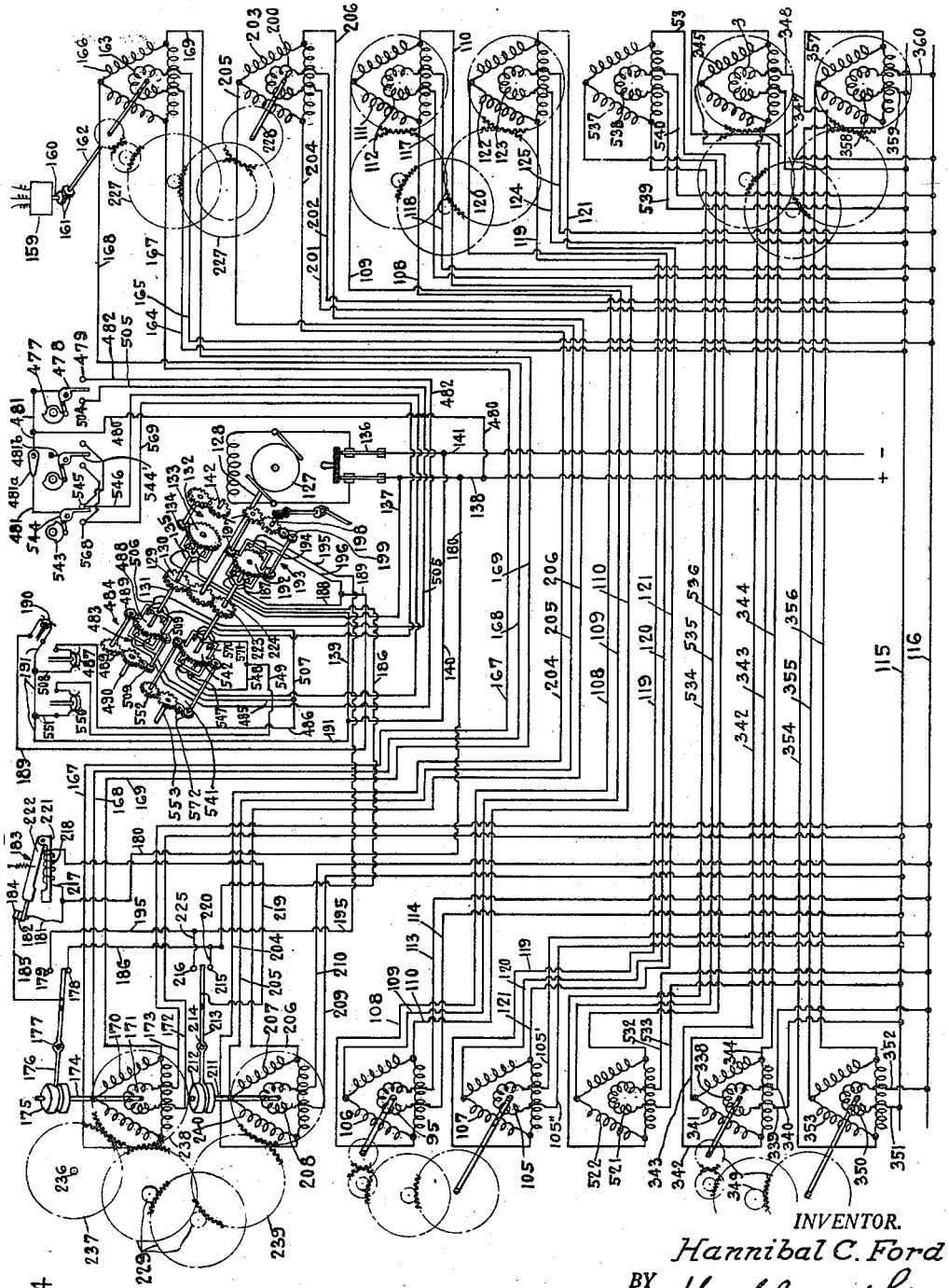
Fig. 4 is a diagram of the electrical circuits in which the wiring of the instrument is included.

Any suitable type of transmitter may be used in either direct or alternating current circuits, but for simplicity of illustration alternating current transmitters have been shown wherein the rotors 95 and 105 are rotatively mounted within stators 106 and 107, respectively. As shown in Fig. 4, conductors 108, 109 and 110 connect spaced points of the delta-wound stator 106 of the fine train transmitter with correspondingly spaced points of the delta winding of a stator 111 of a fine train receiver, which is provided with a rotor 112 encompassed by the stator 111. Conductors 113 and 114 connect the fine train transmitter rotor 95 across the alternating current main line conductors 115 and 116, while conductors 117 and 118 connect the fine train receiver rotor 112 across the main line conductors.

Similarly, conductors 119, 120 and 121 connect spaced points of the stator 107 of the coarse train transmitter with corresponding points of a stator 122 of a coarse train receiver, the rotor 123 of which is connected by conductors 124 and 125 across the alternating current main line conductors 115 and 116. Conductors 105' and 105'' connect the transmitter rotor 105 across these main line conductors.

Training the gun director as outlined above causes the fine and coarse train transmitter rotors 95 and 105 to become displaced with regard to their stators 106 and 107, respectively, and, in consequence of the described circuits, the rotors 112 and 123 of the fine and coarse train receivers automatically assume the same relation to their respective stators 111 and 122 that the transmitter rotors have with regard to their stators, as is well understood in the art. Dials (not shown) turn with the receiver rotors and read against indexes to visualize the measures of train occasioned by turning the rotatable portion of the gun director in azimuth.

Such training of the gun director effects a basic measure of train for the guns, and, therefore, the transmitters and receivers just referred to are conveniently designated as the gun train transmitters and receivers. The latter are ordinarily located at the guns, though some of them may be in other places where it is desirable to know the amount of required gun train for calculative or directive purposes.

To merely train the guns on a moving target would be a little use, for, if the former were fired under these conditions, the target would have passed from the place of ultimate impact of the projectiles by the time the latter arrived there. Accordingly, a range keeper 126 is operatively combined with and carried by the rotary portion of the gun director and is shown in Fig. 1 as being mounted on the main frame 8 of the director.

As shown in Fig. 5, the range keeper 126 is provided with an information-disclosing face, having a number of dials and counters, the respective purposes of which will become apparent hereinafter. It is advantageous to maintain a prescribed practice with respect to these dials and counters, and, according to the existing conditions, they may be regarded as occupying a "secured position," when the range keeper is not in use, a "standby position" when it is about to be put in use, or to be in a state of operation subsequent to the "standby position."

In the range keeper, there are certain elements which have variable positions, including neutral positions. Since the director firing apparatus herein disclosed will usually be carried by a craft subject to oscillatory motion, the referred to elements and their associated parts are liable to be subjected to minor stresses resulting from vibratory impulses. By adopting a "secured position" wherein such elements may be retained in neutral positions, there is an avoidance of the development of small stresses during periods of instrument inactivity, which is contributory to the safeguarding of the accuracy of the instrument.

Prior to, but when the director firing apparatus is about to be placed in use, the dials, etc., of the range keeper 126 are manipulated to assume the "standby position." Thus, the switch which controls the motor from which power is derived for the range keeper may be turned on, and a check of the speed of the parts of the range keeper which are synchronized with time may be had by comparing the clock dial 660 and its associated graduations 661 with the reading of a stop watch. For the "standby position," the motor switch is turned off with the clock pointer marked on dial 660 positioned at zero.

With the energization of the circuits which are responsive to the follow-up mechanism 159 (see Fig. 4) that is controlled by the ship's compass, own ship's compass dials 158, 157 and 157' will function automatically.

In making the dial settings for the "standby position" of the instrument, own ship's speed dial 430 is set by the knob 430' which, as shown in Fig. 9, operates a gear train comprising gears 662, 663, 664 and 665, the last named gear being on a shaft 666, which is provided with a worm 667 rigidly affixed thereto. Meshing with the worm 667 is a worm gear 668 carried by a shaft 669 mounted on which for rotation therewith is own ship's speed dial 430. The target's speed dial 431 is set equal to own ship's speed by operating the knob 431', shown in Fig. 10 to actuate a gear train comprising gears 670, 671 and 672, the last mentioned gear being mounted on a shaft 673 affixed to which is a worm 674, which meshes with a worm gear 675 that is carried by a shaft 676 which turns the target's speed dial 431. Target dial 427 is set parallel to the own ship's dial 425, this setting in conjunction with the equal speed settings already referred to keeping the indicated range rate zero. Deflection will be small, but not zero owing to the fact that for equal speeds of own ship and a target, the mils deflection due to own ship and to the target are not the same. There is also a slight deflection due to drift. To set the target's dial 427 parallel to the own ship's dial 425, a crank handle 677, shown in Fig. 10, is operated to turn a shaft 678, gears 679 and a shaft 680. A bevel gear 681 at one end of this shaft drives another bevel gear 682 which is rigid with one side 683 of a differential 684. The center 685 of the differential, which comprises a spider and bevel gears rotatively mounted thereon, is secured to a shaft 686 upon which is mounted a gear 687 that drives gears 688 and 689, the latter being rigidly mounted on a shaft 690 that carries the target dial 427.

Another setting is that of the target's bearing to correspond to the expected initial bearing, this setting being effected by operating the generated bearing crank handle 691, shown in Fig. 11. A shaft 692 is turned by handle 691, gears 693, shaft 694, other gears 695 and another shaft 696 also being turned. The center 697 of a differential 698 is secured to the shaft 696, and is turned thereby to turn a side 699 of the differential 698, thus turning a bevel gear 700 which is rigid with the differential side 699. The bevel gear 700 drives another bevel gear 701 on a shaft 702, which extends to and carries a gear 703, shown in Fig. 9. The gear 703 drives another gear 704, which is compounded with a gear 705, the latter gear driving a gear 706 that is rigidly mounted on a sleeve 707, which carries own ship's vernier compass dial 157'. Also mounted on the sleeve 707 is another gear 708 meshing with a gear 709 that is compounded with a gear 710. The gear 710 drives a gear 711 carried by a sleeve 712, which is the tubular shaft for the major compass dial 157. The latter may thus be set to read against the end 429' of the pointer 429 to give the major reading of the expected target's true bearing (see Fig. 5), while the vernier compass dial 157' will read against a fixed pointer 429''' to give a micrometer reading of the expected target's true bearing. The same result may be accomplished by using the same handle 691 and turning the compass rings 157 and 157' until own ship dials 425 and 425' indicate the expected initial relative bearing when read against the fixed pointers 429 and 429'''.

As the gear 711 rotates, it drives a gear 713 fastened on a shaft 714, resulting in the turning of the latter, bevel gears 715 and a shaft 716, which, as shown in Fig. 10, turns other bevel gears 717, a shaft 718, a gear 719 on the latter, and a gear 720 on a sleeve 721, which carries the compass ring 158 that is associated with the target dial 427.

For the "standby position" the present range counter 433 is set for the range at which it is expected to pick up the target. This setting is made by turning the range crank handle 722, shown in Fig. 11, so turning shaft 723, which carries a friction-driving member 724, which bears against a bevel gear 725 to normally turn the same, but to slip without driving it in case of abnormal resistance for any reason, whereby no harm may result to the mechanism responsive to movement of the handle 722.

The bevel gear 725 is secured on a shaft 726, which also carries a disc 727, the disk having its periphery notched at 728, whereby a roller 729 on the end of a pivoted and spring-influenced arm 730 snaps into successive notches 728. This causes the operator to feel periodic points of slightly increased and abrupt resistance to the turning of the handle 722, each miniature jolt to the operator's hand indicating to him, without requiring observation of the counter, a change in the reading of the present range counter 433 of a given number of yards, say 100.

As the range handle 722 is being turned, the bevel gear 725 turns another bevel gear 731, so turning a shaft 732 and bevel gears 733 and 734, the gear 734 being rigidly combined with one side 735 of a differential 736. The center 737 of the differential is thus caused to rotate and turns the shaft 738 on which it is pinned, whereby there is a drive established from the shaft 738 through bevel gears 739, a shaft 740, gears 741, a shaft 742, gears 743, a shaft 744 and gears 745 to the present range counter 433.

Although the indicated range rate is zero, the advance range may differ from present range, because own ship's and the target's movements have different effects on the range prediction.

The range at which it is expected to pick up the target having been set upon the present range counter 433, the switch 136 (see Fig. 4) in the director is closed, causing the power motor 127 to be driven.

A drive is established from the power motor 127, shown in Fig. 2, which extends from this motor by a driven shaft 128, carrying a gear 129. Driven by the latter is a gear 130 secured on a shaft 131 which enters and forms part of a power clutch 132. This clutch is diagrammatically illustrated in a simple form in Fig. 4, and includes a disk-like gear 133, which is susceptible to lateral play. It has a neutral position in which it is out of mesh with a gear train 134, but is adapted to be placed in mesh therewith upon the energization of an electromagnet 135.

A conductor 137 extends from the positive line conductor 138 to the coil of the electromagnet 135, returning therefrom by conductors 139 and 140 to the negative line conductor 141. Under these conditions, the disk gear 133 is rotating and is drawn by the electromagnet 135 into mesh with the gear train 134, which drives the shaft 142.

As seen in Fig. 2, the shaft 142 turns bevel gears 143, and the power drive continues by a shaft 144, under the control of any suitable speed regulating mechanism 144', such as that shown in my United States Patent No. 1,577,618, issued March 23, 1926, the mechanism being operated in accordance with time. The time-controlled power drive proceeds by gears 145, a shaft 146, bevel gears 147, another shaft 148, other bevel gears 149, a shaft 150, bevel gears 151, another shaft 152, a pair of bevel gears 153, a shaft 154, and through gears 155 turns a shaft 156. The shaft 156, as shown in Fig. 1, extends into the range keeper 126 to operate portions of its mechanism.

In the range keeper 126, the power shaft 156, which is synchronized with time, carries a pinion 746, shown in Fig. 11, which meshes with a gear 747 on a shaft 748, which also carries another gear 749. The gear 749 drives the disk gear 750' of a range integrator 750 more extensively referred to hereinafter, the disk gear 750' continuing the drive through a pinion 751, a shaft 752, bevel gears 753, another shaft 754, other bevel gears 755 to a shaft 756. This shaft turns bevel gears 757, shown in Fig. 9, the drive proceeding by a shaft 758, bevel gears 759, a shaft 760 and bevel gears 761 to a shaft 762, which, as shown in Fig. 10, carries a worm 763. Meshed with this worm is a worm gear 764 on a shaft 765, which carries the clock dial 660, operated in accordance with time, as previously stated.

Reference to Fig. 11 shows that time-controlled power shaft 156 also establishes another drive through gears 746 and 747, shaft 748, gear 749, another gear 766, a shaft 767, bevel gears 768, a shaft 769, other bevel gears 770, a shaft 771 and a gear 772 to the disk gear 773' of an inverse range integrator 773, which is more appropriately referred to further on, it sufficing, for the present, to show the introduction and application of power synchronized with time in the range keeper 126.

Consideration of the compass dials of the range keeper 126, as they relate both to own ship and the target will now be had. Compass dials 157 and 158, relating respectively to own ship and the target, are centrally located on the face of range keeper 126, as shown in Fig. 5, and these dials, as well as a vernier compass dial 157' which is associated with compass dial 157, are operated synchronously with the ship's compass. To this end, a follow-up mechanism of any suitable well-known type, indicated at 159 in Fig. 4, is controlled by the ship's compass. The follow-up mechanism turns a shaft 160, gears 161 and through another shaft 162 turns a rotor 163 of a compass transmitter for fine increments of the compass indications. The rotor 163 is connected across the alternating current line conductors 115 and 116 by conductors 164 and 165. The fine compass transmitter has a stator 166 spaced points in the delta winding of which are connected by conductors 167, 168 and 169 with correspondingly spaced points of a similar stator 170 of a fine compass receiver. Within the stator 170 is a rotor 171 connected by conductors 172 and 173 across the alternating current line 115—116.

When the rotor 163 of the fine compass transmitter alters its relation to its stator 166, the rotor 171 of the fine compass receiver assumes a corresponding relation to its stator 170. Rotary movement of the fine compass receiver rotor 171 turns a rotor shaft 174 on which a drum cam 175 is mounted, the cam groove therein receiving one end of a lever 176 which is fulcrumed at 177. Normally, the lever 176 is in a neutral position, but as the rotor turns it is swung so that its opposite insulated end engages one or the other of a pair of electrical contacts 178 and 179.

Upon the engagement of the arm 176 with the contact 178, current flows from the positive line conductor 138, shown in Fig. 4, to a conductor 180, continuing through a conductor 181, a movable contact 182 of a relay 183, a fixed contact 184 and a conductor 185 to the lever 176. From here the current goes by contact 178 and conductor 186 to the coil of an electromagnet 187, then proceeding by conductors 188 and 189 to a cutout switch 190, through the same and by conductors 191 and 140 to the negative line conductor 141. The result is the energization of the electromagnet 187, and a consequent attraction thereby of a disk-gear 192 of a diagrammatically illustrated compass clutch 193.

Another electromagnet 194 is present in the compass clutch 193, the gear-disk 192 being positioned between the electromagnets 187 and 194, and having sufficient lateral play to permit it to be attracted by either and to be in a neutral position when not so attracted. The electromagnet 194 is energized when the switch arm 176, responding to a compass movement of opposite sign to that previously referred to, engages the contact 179 instead of contact 178. At such times, direct current from the positive line conductor 138 to the switch arm 176, as previously traced, goes to the contact 179, and by a conductor 195 to the coil of the electromagnet 194. From this coil the current proceeds by conductors 196 and 189, cut-out switch 190 and conductors 191 and 140 to the negative line conductor 141.

According to whether the ship's compass indicates changes in the ship's heading to the right or to the left, one or the other of the electromagnets 187 and 194 of the compass clutch is energized, attracting the disk-gear 192. When the latter is attracted by the magnet 187, the disk-gear 192 is thrown into mesh with a gear train 197, shown in Fig. 4, thus turning a shaft 198. Energization of the magnet 194 carries the disk-gear 192 into mesh with another gear train 199, turning the shaft 198 in the reverse direction.

For coarse readings, a coarse compass transmitter is used and has a rotor 200 connected across the alternating current mains 115 and 116 by conductors 201 and 202. The delta winding of a stator 203 has spaced points connected by conductors 204, 205 and 206 to correspondingly spaced points of a stator 207 of a coarse compass receiver. Rotatable within the stator 207 is a rotor 208, which is connected across the alternating current main line conductors by conductors 209 and 210. Relative displacement of the rotor 200 and the stator 203 of the coarse transmitter effects a corresponding relative displacement of the rotor 208 and its companion stator 207 of the coarse compass receiver. Rotary movement of the rotor 208 turns a shaft 211 to which is affixed a drum cam 212 that operates a lever 213, which is similar to the lever 176, and is fulcrumed at 214.

In its neutral position, the lever 213 is out of engagement with a pair of electrical contacts 215 and 216. When the contact 215 is engaged by the lever 213, a circuit is completed from the positive line conductor 138, through conductors 180 and 217, the magnetizing coil 218 of the relay 183, a conductor 219, the lever 213, contact 215, conductors 220 and 186, the coil of the compass clutch magnet 187, conductors 188 and 189, cut-out switch 190, and conductors 191 and 140 to the negative line conductor 141.

Accordingly, the core 221 of the relay 183 attracts the relay armature 222, which is pivoted to the core 221, thereby opening the contacts 182 and 184, and thus the fine compass receiver circuit through the magnet 187 of the compass clutch. Because, however, of the described circuit which passes through the arm 213 and contact 215 of the coarse compass receiver, the magnet 187 of the compass clutch 193 remains energized. Therefore, as the power motor 127 continues to drive the shaft 128, the gear 129 thereon drives a gear 223 which is secured on a shaft 224 on which the disk-gear 192 is also affixed. Accordingly, the disk-gear 192 is still kept in mesh with the gear train 197, and the shaft 198 continues to rotate, but is under the control of the coarse compass receiver. The coarse compass receiver is in control only when the fine compass receiver is out of synchronism with the fine compass transmitter by more than an allowable extent. The arm 213 of the coarse compass receiver is at other times in its neutral position out of engagement with both of its associated contacts 215 and 216.

When the rotor 208 turns in the opposite direction to that already referred to, in response to a reversed change in the ship's heading, and the lever 213 engages the contact 216, current flows from the positive line conductor 138, through conductors 180 and 217, the relay magnet coil 218, conductor 219, lever 213, contact 216, conductors 225 and 195 to and through the other magnet of the compass clutch 193 thence going by conductors 196 and 189, the cut-out switch 190, and conductors 191 and 140 to the negative line conductor 141. This causes the disk-gear 192 of the compass clutch 193 to be attracted by the electromagnet 194, thereby throwing the disk-gear 192 into mesh with a gear train 199. As a result, the driven shaft 198 of the compass clutch is driven reversely to the direction previously referred to, while under the control of the coarse compass receiver.

As previously explained, the fine compass transmitter, shown in Fig. 4, is actuated by the compass follow-up mechanism 159. A reduction gear train 227 is driven by the shaft 162, and turns a shaft 228 of the coarse compass transmitter, so turning the rotor 200 of the latter in the correct ratio to the rotor 163 of the fine compass transmitter. In a similar manner, the stator 170 of the fine compass receiver is connected through a reduction gear train 229 with the stator 207 of the coarse compass receiver. The reduction gear train 229 is operated from the driven shaft 198 of the compass clutch, the shaft 198 driving through bevel gears 230, shown in Fig. 2, a shaft 231, bevel gears 232, another shaft 233, a worm 234, a worm gear 235, a shaft 236, a gear 237 and a gear 238 which is mounted on the stator 170 of the fine compass receiver. The reduction gear train 229 turns a gear 239 and so a gear 240, which is mounted on the stator 207 of the coarse compass receiver.

Since the distance between the contact end of lever 176, when it is in its neutral or mid-position, and either fixed contact 178 or 179 is small, the circuit closure is effected quickly upon the actuation of lever 176 by drum cam 175 as the latter turns with the fine compass receiver rotor 171 in the direction in which this rotor is caused to turn by the fine compass transmitter. As explained hereinbefore, when, for instance, the lever 176 engages contact 178 a previously traced circuit is closed through the electro-magnet 187 of the compass clutch 193, whereby its output shaft 198 is driven and in turn, as shown in Fig. 2, drives gears 230, shaft 231, gears 232, shaft 233, worm 234, worm gear 235, shaft 236, gear 237 and the gear 238 that is mounted on the stator 170 of the fine compass receiver. The stator 170 is thus turned in the opposite direction to that in which the rotor 171 of the fine compass receiver is being urged to turn by the fine compass transmitter.

Accordingly, when the ship changes its heading in the direction under consideration, the stator 170 exerts a torque upon the rotor 171 causing its movement, in accordance with a well-known law, whereby the drum cam 175 acts upon the lever 176 to quickly throw the latter into engagement with contact 178. Thereafter, the already described driving of the stator 170 simultaneously with the urging of the rotor 171, but in the opposite direction to that in which this rotor is being urged, results in the shaft 174 and drum cam 175 being maintained from further rotation, since by as much as the rotor 171 tends to turn in response to the fine compass transmitter, the stator 170 is being reversely driven to offset the impulse of rotor 171 to turn.

This condition continues until the stator 170 has been driven by the amount corresponding to the extent of the torque developed between the rotor 163 and stator 166 of the fine compass transmitter in consequence of the angular displacement of the rotor 163 proportionately to the change in the ship's heading in the particular direction being considered. This continued oppositional co-operative action of the stator 170 and rotor 171 of the fine compass receiver neutralizes the torque developed therebetween by the setting of the fine compass transmitter, so that by the time that the stator 170 has been operated proportionately to the extent of the torque developed in the fine compass transmitter there is no torque left between the stator 170 and the rotor 171 of the fine compass receiver. Since the rotor 171 moves initially to engage arm 176 with contact 178 while the stator 170 is stationary, this stator is not driven angularly as far as is the rotor 171 by the angular amount necessary for the arm 176 to move into engagement with contact 178. Therefore, when the stator 170 and rotor 171 have been simultaneously reversely driven by the amount that causes the rotor 170 to have been urged through an angle that is equal to the angle of change in the ship's heading in the given direction, the stator 170 will be behind the angular displacement of rotor 171 by the angular distance through which the lever 176 moved to engage contact 178. A counter torque exists between the stator 170 and the rotor 171 at the time when the torque therebetween due to the setting of the fine compass transmitter becomes neutralized as described. Consequently, the rotor 171 is now turned reversely to its former direction of urge into a zero-torque relationship with the stator 170, which turns shaft 174 and drum cam 175 by the angular amount necessary to return the lever 176 into its former or neutral position. This opens the circuit through the compass clutch 193, stopping the drive of the stator 170 at the time when rotor 171 has been actuated in exact proportion to the angle of change in the ship's heading in the direction of such change.

If the ship's heading changes in the opposite direction, the operation is similar but in the reverse direction, whereby lever 176 engages contact 179, thereby energizing the other electromagnet 194 of compass clutch 193, which then drives the stator 170 in the opposite direction to that previously described. Hence, any change in the heading of the ship in either direction is accurately measured for the angular value of the change of heading for the direction in which the change takes place.

If for any reason, such as the ship changing its course too rapidly for the fine compass receiver to closely follow the fine compass transmitter, the fine compass receiver gets out of synchronism with the fine compass transmitter, and the coarse compass receiver takes control as stated earlier herein. Under these circumstances, the rotor 208 and stator 207 of the coarse compass receiver, as well as the drum cam 212 and lever 213 act similarly to the corresponding elements of the fine compass receiver.

During the time when the coarse compass receiver is in control, its stator 207 is being driven simultaneously with the stator 170 of the fine compass receiver from the compass clutch 193 through the previously described drive and the additional gears 229, 239 and 240. Though the fine compass receiver is out of synchronism with the fine compass transmitter at this time, there is a definite gear ratio between the coarse and fine compass receivers, and the fine compass receiver rotor 171 will be caused to rotate, correspondingly rotating shaft 174 and drum cam 175, in consequence of which the lever 176 may alternately engage contacts 178 and 179. This is of no consequence, however, since, when the coarse compass receiver takes control, the relay 183 has been actuated, as previously described, to open the contacts 182 and 184 so that engagement of lever 176 with either contact 178 or 179 does not close the circuit containing such contact.

When the fine compass receiver again comes into synchronism with the fine compass transmitter, the definite gear ratio between the coarse and fine compass receiver stators 207 and 170, respectively, and the initial setting of the interrelated parts, results in the lever 176 being in engagement with the contact, as 178, that continues the drive of the compass clutch 193 in the same direction as it is being driven in consequence of the lever 213 being in engagement with a certain contact, say, 215. Therefore, as the lever 213 leaves contact 215, for example, at a time when there is a coincidence of coarse and fine compass measures of the change in the ship's heading, the coil 218 of relay 183 becomes de-energized and the relay armature 222 is spring-actuated to again engage contacts 182 and 184, reestablishing the formerly described conditions whereby the fine compass receiver resumes control of the compass clutch 193 and the mechanism operated therefrom.

Referring to Fig. 2, when the compass clutch 193 drives the shaft 198, the bevel gears 230, shaft 231, bevel gears 232, and the shaft 233, the latter also turns bevel gears 241 near its right hand end. This drive is continued through a shaft 242, bevel gears 243, a shaft 244, a clutch 245, a shaft 246, bevel gears 247, a shaft 248, other bevel gears 249, another shaft 250, a pair of bevel gears 251, a shaft 252, another pair of gears 253 and a shaft 254. As shown in Fig. 1, the shaft 254 extends to and enters the range keeper 126, where, as seen in Fig. 9, it continues to drive through bevel gears 774, a shaft 775, other bevel gears 776, another shaft 777 and gears 778, 779 and 780, the last named gear being rigid with one side 781 of a differential 782, the center 783 of which is fast on a shaft 784. This shaft passes freely through the differential side 781, which is mounted to revolve thereon, and carries a gear 785 rigidly attached to its lower end. The gear 785 meshes with another gear 786 fast on a shaft 787, which carries own ship vernier dial 425′, another gear 788 also fast on shaft 787 meshing with a gear 789 that is compounded with a gear 790, the latter meshing with another gear 791 that is fast on a shaft 792, which carries the main or coarse own ship dial 425.

Thus, it is evident that the ship's master compass operates a follow-up mechanism 159, which controls coarse and fine compass transmitters that are electrically in control of coarse and fine compass receivers, the latter controlling a compass clutch 193. It has been shown that this clutch controls a mechanical drive to a shaft 254 which enters the range keeper 126 and controls own ship dials 425 and 425′, as described.

With the switch that controls the power motor in the director closed, so that this motor also drives the range keeper, the director is trained on the target. As the trainer of the director operates his hand wheel 75, and so turns the shaft 83, the latter drives through the bevel gear 84, bevel gears 469, 470 and 471, a differential 466, a shaft 468, bevel gears 473, a shaft 474, and other bevel gears 475 to turn a shaft 476 in accordance with measures of observed target's bearing.

In Fig. 9, the shaft 476 has a portion within the range keeper which is provided with a gear 793 that drives gears 794, and 795, a shaft 796 and gears 797 and 798 to turn a shaft 799. The center 800 of a differential 801 is turned by the shaft 799, and itself turns a side 802 of the differential, and with it a gear 803 which is rigidly combined with the differential side 802. When the gear 803 turns it drives another gear 804 fixed to a shaft 805, which carries a gear 806 at its upper end, the gear 806 driving a gear 807 affixed to a sleeve 808, on which is mounted a zero-reading ring dial 809′ operable in accordance with fine or subdivisional measures of observed target's bearing. For furnishing the main or coarse indications of observed target's bearing, the sleeve 808 is provided with another gear 810, which drives a gear 811 compounded with a gear 812 that drives a gear 813, which is rigid with a sleeve 814 that serves as the shaft for a zero-reading coarse observed target's bearing dial 809.

Engraved on the coarse and fine observed target's bearing dials 809 and 809′ are indexes 815 and 816, as shown in Fig. 5. As soon as the director telescopes have sighted the target, the indexes 815 and 816 will indicate the observed target bearing. By operating the bearing crank handle 691, the indexes 815 and 816 on the coarse and fine observed target's bearing ring dials 809 and 809′ may be lined up with the fixed indexes 429′ and 429′′′, which co-act with the compass ring dials 157 and 157′. Thus, the target's bearing as generated in the range keeper may be made to correspond to that of the director.

When the bearing crank handle 691 (see Fig. 11) is turned for this purpose, it drives through the shaft 692, bevel gears 693, the shaft 694, bevel gears 695, the shaft 696, the center 697 of the differential 698, the side 699 thereof, bevel gears 700 and 701, the shaft 702, which as shown in Fig. 9, has a gear 703 that drives another gear 704, the gear 705 compounded therewith, the gear 706, the sleeve 707 and the fine or vernier compass dial 157′. The gear 708 on the sleeve 707 simultaneously drives gears 709 and the gear 710 compounded therewith, the latter turning gear 711 and sleeve 712, and hence the coarse compass ring dial 157. Thus, both coarse and fine compass dials 157 and 157′ are simultaneously driven.

As the dials 157 and 157′ are being driven, the gear 704, shown in Fig. 9, turns as already explained, this gear being rigid with a side 817 of the differential 782, so that this side 817 is turned with the gear 704. With own ship maintaining its course, the shaft 254, which is responsive to own ship's compass, is stationary, as are bevel gears 774, shaft 775, bevel gears 776, the shaft 777 and gears 778, 779 and 780, so that the side 781 of the differential 782 is held from movement while own ship remains on its present course. Consequently, under these circumstances, the side 817 of the differential 782 turns the center 783 of this differential, and with it the shaft 784 and the gear 785 carried thereby. The gear 785 drives the gear 786 and the shaft 787 which carries own ship vernier dial 425'. At the same time, the gear 788, which also turns with the shaft 787, drives the gears 789, 790 and 791, thereby rotating the shaft 792 and the coarse own ship dial 425. Thus, the coarse and fine own ship dials 425 and 425' turn in unison with their associated compass ring dials 157 and 157', respectively, and since there is no relative movement between the own ship dials and their associated compass ring dials, there is no change of course of own ship shown by these dials while own ship does not change its course.

Since the fine or vernier own ship dial 425' turns as explained, its shaft 787 turns a gear 818 thereon, which turns a gear 819 and a side 820 of the differential 801. With the director telescopes remaining fixed as they bear on the target, the shaft 476, shown in Fig. 9, remains stationary, as do gears 793, 794 and 795, the shaft 796, gears 797 and 798, the shaft 799, and, hence, the center 800 of the differential 801. But, it was shown that as the dials 425 and 425' were turning, the gear 819 and the side 820 of the differential 801 also turned, so that the differential side 820 drives through the gears of the now stationary differential center 800, thus turning the side 802 of the differential and the gear 803 rigid therewith. The gear 803 turns the gear 804, the shaft 805 and the gear 806, the latter turning the gear 807 on the sleeve 808, and so the fine observed target's bearing ring dial 809'. The gear 810, which is also on the sleeve 808, drives gears 811, 812 and 813 on the sleeve 814, so turning the coarse observed target's bearing ring dial 809. Thus, the indexes 815 and 816 on the observed bearing dials 809 and 809' are brought into coincidence with the indexes 429' and 429''', which co-operate with the compass ring dials 157 and 157' to show the generated target's bearing. In this way, the target's bearing in the range keeper is made to correspond with that in the director, and any discrepancy in the generated target's bearing in the range keeper may be at once detected and corrected for.

For the "stand-by position" the target's speed dial 431, shown in Fig. 10, was previously said to be set equal to own ship's speed, and the target dial 427 was to be set parallel to own ship dial 425 for the "stand-by position." When, however, estimates of the target's speed and course are received these values are set on the respective dials, in the manner heretofore set forth in place of those set for the "stand-by position." Referring to Fig. 5, the target's course may be set by reading the zero of the target dial 427 against the compass ring 158 for the true target's course, or by reading the target dial 427 against the target bearing index 429'' for the target angle to the line of sight.

Initial range finder range becoming available, it is set on the present range counter 433, shown in Fig. 11, in the hitherto described manner, in place of the range at which it was previously expected to pick up the target.

The range keeper 126 will now indicate the advance range and deflection and transmit to the director, sight depression and sight deflection based on data received, as will become evident hereinafter.

As the target is being tracked it can be assumed that the settings of the course and speed of own ship are correct, in view of the instruments aboard own ship for determining these quantities, and, hence, any errors in tracking will be due to incorrect settings in the range keeper of the target's course and speed.

An appreciation of various relations of own ship and the target is to be had from an inspection of Fig. 16, wherein OS indicates own ship and T the target. If the target's bow is headed in area A and B, a change in target's speed will be more effective in changing the range than in changing the target's bearing. But, if the target is headed in area C or D a change in the target speed will be more effective in changing the target bearing than the range.

It is also evident, from Fig. 16, that for any heading of the target, if the target's bow is turned away from own ship, by the changing of the target's course, the range will be increased, or reduced at a slower rate if the range rate is decreasing, as the target continues to move. Likewise, if the target's course is changed to bring the target's bow nearer a line perpendicular to the line of sight, the target's movement will have more effect on the target's bearing.

If the range finder readings are different from the reading of the present range counter 433, but the observed target's bearing indexes 815 and 816 remain under the fixed indexes 429' and 429''' against which the generated target's bearing is read, the target's course and speed should be changed so as not to change the indicated deflection. Similarly, if the range finder readings check with the reading of the present range counter 433, it indicates that the indicated range rate is correct, and in correcting the generated bearing the target's course and speed readings should be changed so as not to change the range rate.

After each change to affect the range rate, the present range should be set on the counter 433 to equal the range finder range by operating the handle 722, shown in Fig. 11, so operating the range counter through the previously described drive. After changes made to affect the generated target's bearing, the generated bearing handle 691, disclosed in Fig. 11, should be used to bring the observed target bearing indexes 815 and 816 under the fixed indexes 429' and 429''', in the manner already described, thereby bringing the generated target's bearing to match the observed target's bearing.

Before firing the first salvo from the guns, the deflection ballistic correction for wind, etc., should be set in the range keeper 126 by turning the knob 821, shown in Figs. 5 and 13. As shown in the latter figure, the knob 821 turns a shaft 822, gears 823, a shaft 824, bevel gears 825, a shaft 826, gears 827 and 828, a sleeve or tubular shaft 829 and the deflection correction ring dial 434, which bears the engraved index 830. In setting this index, it should be read against the correction scale 831 for the deflection correction, and against the deflection dial 832 for the total corrected deflection.

The reading of the present range counter 433 should be changed by the amount of the range ballistic correction, this being accomplished in the hereinbefore described manner, by using the range crank handle 722, shown in Fig. 11. This should be done between the setting up of the last range finder range reading and the firing of the first salvo.

The understanding of the operation of the range keeper 126 is facilitated by a familiarization with the face plate thereof. It is important to bear in mind that the indexes 429′ and 429″ at opposite ends of the wire 429 are on a theoretical line, which is visualized by this wire and represents the line of sight between own ship and the target. Therefore, the own ship dial 425, when read against this line indicates relative target bearing. The target dial 427 read in the same way indicates the target angle, i. e., the angle of the line of sight relative to the target course. The physical representation of the line of sight is fixed with respect to the face plate of the range keeper, and thus forms an established line of reference.

A target bearing integrator 833, shown in Fig. 11, generates true target bearing, as explained hereinafter, this integrator including a roller 834 which rotates in accordance with measures of true target's bearing. A train of gears 835 is driven by the bearing integrator roller 834, and drives a gear 836 which is rigidly combined with a side 837 of the differential 698. The differential side 837 drives through the gears of the then-stationary differential center 697, so turning the differential side 699, the bevel gears 700 and 701 and the shaft 702, this shaft turning the gear 703, shown in Fig. 9.

The drive from here is the same as that previously described for the hand setting of the coarse and fine compass ring dials 157 and 157′. That is, the drive continues through gears 704, 705, 706 and the sleeve 707 to the fine or vernier compass ring dial 157′ and by gears 708, 709, 710, 711 and sleeve 712 to the coarse or major compass ring dial 157. Thus, the coarse and fine compass ring dials 157 and 157′, respectively, are driven by the target's true bearing integrator 833 to indicate true target's bearing, when read against the fixed indexes 429′ and 429‴, shown in Fig. 5.

The own ship dials 425 and 425′ and the target dial 427 shown in Figs. 5, 9 and 10, are also driven from the target bearing integrator 833, shown in Fig. 11, through the drive traced above to the gear 704, shown in Fig. 9, and then by way of the previously explained hand setting. Briefly traced again, such drive continues from the gear 704, in Fig. 9, by way of the side 817 of the differential 782, through the differential center 783, the shaft 784, gears 785 and 786 and the shaft 787 to own ship's fine dial 425′. The gear 788 also on the shaft 787 drives gears 789, 790, 791, the shaft 792, and so own ship's coarse dial 425. The drive to the target dial 427 from the bearing integrator 833 to the gear 704, shown in Fig. 9, is continued from gear 704 through gear 706, sleeve 707, gears 708, 709, 710, 711, 713, the shaft 714, bevel gears 715, the shaft 716, bevel gears 717, shown in Fig. 10, the shaft 718, gears 719, 720, 838, a shaft 839, gears 840 and 841, one side 842 of the differential 684, the center 685 of the differential, the shaft 686, gears 687, 688, 689 and the shaft 690, which carries the target dial 427.

As long as there is no change of course by own ship or the target, there is no movement of the own ship and target dials 425, 425′ and 427 relative to their respective compass dials 157, 157′ and 158, the own ship and target dials being so geared, as previously set forth, as to move in unison with their associated compass ring dials under these circumstances. When a change of course does occur, if it be by own ship, own ship's dials 425 and 425′ will shift relatively to the compass dials 157 and 157′, while, if the target changes its course, the target dial 427 will shift with respect to its compass ring dial 158.

When own ship changes its course, its master compass actuates the follow-up mechanism indicated in Fig. 4, at 159, thus operating the fine and coarse compass transmitters which respectively comprise the rotors and stators 163, 166 and 200, 203, as already explained. In the manner previously set forth, this results in operating the fine and coarse compass receivers comprising respectively, the stators and rotors 170, 171 and 207, 208. By the hereinbefore set forth control of electro-magnetic compass clutch 193 by the compass receivers, through the cams 175 and 212, the electric switches having the contacts 176, 178, 179 and 213, 215, 216, and the associated electrical circuits, the shaft 198 is driven by the compass clutch 193 in accordance with the change in the ship's course.

As seen in Fig. 2, the drive from the shaft 198 continues through gears 230, shaft 231, gears 232, shaft 233, gears 241, shaft 242, gears 243, shaft 244, clutch 245, shaft 246, gears 247, shaft 248, gears 249, shaft 250, gears 251, shaft 252, gears 253 and the shaft 254. In Fig. 9, the shaft 254 is shown to drive gears 774, the shaft 775, gears 776, shaft 777, gears 778, 779 and 780 and one side 781 of the differential 782. The differential side 781 applies its drive to the center 783 of the differential 782, and so turns the shaft 784, gears 785, 786 and the shaft 787, and, hence, the fine or vernier own ship dial 425′. The shaft 787 also drives through gears 788, 789, 790, 791 and shaft 792 to turn the major or coarse own ship dial 425. Thus, own ship dials 425 and 425′ are shifted with respect to their associated compass ring dials 157 and 157′, when own ship's course is changed, as was stated.

Changes in the target's course are put in by operating the target's course handle 677, shown in Fig. 10, as previously described, through shaft 678, gears 679, shaft 680, gears 681, 682, the side 683 of the differential 684, the differential center 685, the shaft 686, gears 687, 688, 689 and the shaft 690, so shifting the target dial 427 with respect to its associated compass ring 158, as asserted above.

Shifting of the own ship dials 425 and 425′ relatively to their respective compass ring dials 157 and 157′ obviously does not change the reading of the true target bearing, since, as may be noted from Fig. 5, the compass ring dials 157 and 157′ not being moved in response to a change of course by own ship, continue to read against the fixed indexes 429′ and 429‴ to show the same true target's bearing. The shifting of own ship dials 425 and 425′ does, however, change the relative target bearing an amount equal but of opposite sign to the change of course.

Own ship's course, which corresponds to the angle designated in Fig. 7 as OS course, is received mechanically by the shaft 254, shown in Fig. 9 and carried, as already explained, to the side 781 of the differential 782. The side 817 of this differential was previously shown to represent true target's bearing, which corresponds to the angle so identified in Fig. 7. The center or spider 783 of the differential 782 represents the difference between these two angles, i. e., own ship's course angle and the true target's bearing angle, and, hence, corresponds to the angle OSA in Fig. 7, which last named angle is own ship's heading relative to the line of sight. As already shown, the center 783 of the differential 782 is geared to own ship dials 425 and 425', and it will be seen from Figs. 5 and 7 that, if these dials are read from own ship's bow to the line of sight, they will indicate the angle of the relative target bearing. Moreover, the shaft 792 of the coarse or major own ship dial 425, shown in Fig. 9, rotates the own ship vector 843, so that its angular position represents the own ship angle OSA. As explained later, this vector is used in resolving the movements of own ship into components along and perpendicular to the line of sight.

It was shown hereinbefore how the director transmitted observed target's bearing to the range keeper, the observed target's bearing entering the range keeper by the shaft 476, shown in Fig. 9, as relative target bearing. This quantity is conveyed by gears 793, 794, 795, the shaft 796, gears 797, 798 and the shaft 799 to the center 800 of the differential 801, where it is combined with the measure of own ship angle OSA. The angle OSA is transmitted from the center 783 of differential 782, which center was shown to represent own ship angle OSA by the shaft 784, and gears 785, 786, shaft 787, and gears 818 and 819 to the side 820 of the differential 801, of which the member 800 is the center. The other side 802 of the differential 801 drives through the gears 803, 804, the shaft 805, gears 806, 807 and the sleeve 808 to position the fine observed target bearing ring dial 809', and from the sleeve 808 by gears 810, 811, 812, 813 and the sleeve 814 to position the major or coarse observed target bearing ring dial 809, as previously shown. The displacement of the indexes 815 and 816 on the observed bearing ring dials 809 and 809' respectively, from the fixed target bearing indexes 429' and 429''' indicates the difference between the observed and generated target bearing.

It is to be noted that the shaft 805, which was shown to be driven from the side 802 of the differential 801, also drives through bevel gears 844, a shaft 845, other bevel gears 846, a shaft 847, bevel gears 848, and a shaft 849 to turn a dial 850, and from shaft 849 through a gear train 851 and another shaft 852 to turn another dial 853. The dials 850 and 853 are known as the train zero reader dials, and are located on a side of the range keeper where they may be easily seen by the director trainer. The stationary index 854 represents the target bearing, corresponding, in effect, to the fixed indexes 429 and 429', shown in Fig. 5, the pointers 855 and 856 on the train dials 850 and 853, shown in Fig. 9, being similar to the indexes 815 and 816 on the observed target bearing ring dials. Thus, when the pointers 855 and 856 on the zero reader train dials 850 and 853 are aligned with the stationary index 854, it will be known that the observed target bearing matches the generated target bearing. Therefore, if the target becomes obscured, or for any other reason the director trainer wishes to follow the generated target bearing, he trains the director so as to keep the train dials 850 and 853 on zero, i. e., aligned with the stationary index 854.

The target dial 427, which, as shown in Figs. 5 and 7, indicates the target angle to the line of sight, is set as already shown by the target course crank handle 677 shown in Fig. 10 through the center 685 of the differential 684, shaft 686, gears 687, 688, 689 and the shaft 690. From Fig. 7 it is apparent that the target angle will vary with changes in the target's bearing. This variation is taken care of automatically, so that the target dial 427 will read correctly as long as the target's true course, also shown in Fig. 7, does not change, by the differential 684, which is shown in Fig. 10 to be between the crank handle 677 and the gearing that drives the target dial 427.

From previously traced mechanical drives, it will be clear that the side 683 of the differential 684 is responsive to the target's course crank handle 677, the side 842 of this differential being driven in accordance with the generated target bearing. The differential center 685, which represents the target angle, has been shown, in Fig. 10, to be geared to the shaft 690, which positions the target dial 427 and also the target vector 857 to represent the target angle. The shaft 690 also is geared through gears 689, 858, 859 and a shaft 860 to the center 861 of a differential 862, which is thus also set for the target angle. The differential center 861 drives the side 863 of the differential 862, so turning gears 864, 865, 866 and a crown gear 867 which is rigid with the spur gear 866. The crown gear 867 thus turns in unison with the mechanical vector 857, and accordingly does not turn the spur gear 868 which is fast on the target's speed screw 869.

When the target's speed knob 431', shown in Fig. 10, is turned to drive gears 670, 671, 672, the shaft 673, the worm 674, the worm gear 675 and the shaft 676 to set the target's speed dial 431, the shaft 673 also drives through spiral gears 870 and 871 to turn the side 872 of the differential 862. The differential side 872 drives through the gears of the differential center 861, which remains stationary while the target keeps on the same course, thus rotating the differential side 863, the gears 864, 865, 866, the crown gear 867 and the spur gear 868, thus turning the target's speed screw 869. Movement of this screw displaces a travelling nut 873, which is provided with a pin 874 that projects through elongated slots in the crossed arms 875 and 876 of a target's range rate slide 877 and a target's deflection slide 878, respectively. The slides 877 and 878 are utilized to resolve the target's vector into components thereof in accordance with the target's rate of change of range and with the target's deflection, as more fully explained hereinafter.

When, as previously set forth, the own ship's speed knob 430', shown in Fig. 9, is operated to turn gears 662, 663, 664, 665, the shaft 666, the worm 667, the worm gear 668 and the shaft 669 to the dial 430 to show the speed of own ship, the shaft 666 also drives spiral gears 879, one side 880 of a differential 881, and the gears of the differential center 882, which center remains stationary while own ship maintains the course it is on. From the differential center 882 the drive continues through the other side 883 of the differential, gears 884, 885, 886 and a crown gear 887 rigid therewith. The crown gear drives a spur gear 888 fast on an own ship's speed screw 889, thereby displacing a travelling nut 890 which is provided with a pin 891, to which reference is made later.

The reason the differential center remains stationary while own ship keeps on the same course is because the dial 425, which shows own ship's course, is on the shaft 792, which also has rigid therewith the gear 791 that meshes with a gear 892 that is in mesh with another gear 893 on a shaft 894 on which the spider of the center 882 of the differential 881 is fast.

Referring again to own ship's mechanical vector 843, the pin 891, of the travelling nut on own ship's speed screw, projects through elongated slots in crossed arms 895 and 896 of an own ship's range rate and deflection slides 897 and 898, respectively. The slides 897 and 898 serve to resolve own ship's vector into a rate of change of range component and an own ship's deflection component.

When own ship changes its course, own ship's dials 425 and 425' turn to indicate the change, and the shaft 792, which carries own ship dial 425, turns the gears 791, 892, 893, the shaft 894 and the center 882 of the differential 881, thus driving the differential side 883 and the gears 884, 885, 886, and the crown gear 887. Hence, the crown gear 887, turns with own ship's mechanical vector 843, as the latter turns in unison with own ship's dial 425 that is on the same shaft with the vector 843. There, thus, being no relative movement between the crown gear 887 and own ship's mechanical vector 843, the crown gear 887 will not turn the spur gear 888 of own ship's speed screw 889, when there is only a change of own ship's course unaccompanied by a change of own ship's speed.

To obtain the rate of change of range, it is necessary to resolve the own ship's course and the target's course into range rate components, such as OSR and TR, along the line of sight, as shown in Fig. 7, and deflection components OSD and TD across the line of sight. This is accomplished by the mechanical own ship's vector 843 and target's vector 857, already referred to, each of which is adapted to serve as a crank, and comprises a slotted bar mounted intermediate its length on the same shaft as the own ship's, or the target's dial, there being the speed screw 889, or 869, journalled in the ends of the bar and lying in the slot thereof. The angular position of the bar and the speed screw of own ship's vector 843 is equivalent to the angular position OSA in Fig. 7, of own ship's course relative to the line of sight, while the radial distance of the crank pin 891 from the center of rotation of the crank or bar represents own ship's speed. Similarly, the target vector 857 is, in effect, a crank whose angular position corresponds to the target angle shown in Fig. 7, the distance between the center of rotation of the target vector 857 and the pin 874 representing the target's speed.

As hitherto set forth, the crank pin 891 of own ship's mechanical vector 843 actuates two slides as best seen in Fig. 15, one being the slide 897 that is mounted to move along the line of sight and constitutes own ship's range rate slide, and the other slide 898 being mounted to move at right angles to the line of sight and constituting own ship's deflection slide. Similarly, the crank pin 874 of the target's mechanical vector 857 actuates two slides, also shown in Fig. 15, one of which is the slide 877 which is movable along the line of sight and is the target's range rate slide, the other slide 878 being movable at right angles to the line of sight and constituting the target's deflection slide.

Own ship's range rate slide 897, as shown in Fig. 15, is provided with a rack 899, whereby movements of this slide turn a gear 900, which drives through bevel bears 901, a shaft 902, which, in Fig. 11, drives bevel gears 903, a shaft 904, other bevel gears 905, a shaft 906, gears 907, 908 and one side 909 of a differential 910.

Referring again to Fig. 15, it is seen that the target's range rate slide 877 has a rack 911, which turns a gear 912, so driving through bevel gears 913, a shaft 914, which, in Fig. 11, carries a gear 915, that drives through gears 916, 917 and one side 918 of the differential 910.

The center 919 of the differential 919 is responsive to both sides 909 and 918 of this differential, which algebraically adds own ship's range rate and the target's range rate, as received from the own ship's and target's range rate slides 897 and 877, respectively. As the differential center 919, shown in Fig. 11, is fast on a shaft 920, the latter carries the algebraic sum of the own ship's and target's range rates, i. e., the total range rate, by way of gears 921, 922 and a shaft 923 to the range rate dial 432, which is also shown in Fig. 5.

Additionally, the total range rate, as algebraically added by the differential 910, shown in Fig. 11, is carried by the shaft 920, gears 924, a shaft 925, bevel gears 926, a shaft 927, other bevel gears 928, a shaft 929, bevel gears 930, a shaft 931, bevel gears 932, a shaft 933, bevel gears 934, a shaft 935, other bevel gears 936, another shaft 937, bevel gears 938, a shaft 939, bevel gears 940, a shaft 941 and a spur gear 942 to a rack 943 attached to a ball carrier 944, of the range integrator 750.

Since the disk 945 of the range integrator is rigidly combined with the disk gear 750' to turn therewith, it rotates in accordance with time $t$, inasmuch as the disk gear 750' is so driven from the time-controlled power motor 127 in the director, as previously explained. The position of the balls 944' retained by the ball carrier 944 radially from the center of the disk 945 being in accordance with the range rate $dR$, this rate is multiplied by time as furnished by the disk 945, whereby a roller 946 rotates so as to give generated range $R$, or $tdR=R$.

In rotating, the roller 946 drives through a train of spur gears 947, a shaft 948, bevel gears 949, a shaft 950, bevel gears 951, spur gears 952, a shaft 953, bevel gears 954, a shaft 955, bevel gears 956, a shaft 957, bevel gears 958, a shaft 959, bevel gears 960, a shaft 961, spur gears 962 and 963, the latter gear being rotatable with one side 964 of the differential 736. With the side 735 of this differential stationary, the other differential side 964 thereof turns the differential center 737, the shaft 738, bevel gears 739, the shaft 740, bevel gears 741, the shaft 742, bevel gears 743, the shaft 744 and bevel gears 745 to operate the present range counter 433. Since the side 735 of the differential is first set by the handle 722 at the beginning of the operation to introduce initial range, as already explained, the differential 736 adds the generated range to the initial range, as shown, so that the center 737 of the differential 736 gives the present range, which is transmitted to the present range counter 433, as traced above.

In addition, the differential center 737 transmits its measures of present range through the left hand portion of the shaft 738 to bevel gears 965 and upwardly by a shaft 966, so turning bevel gears 967, a shaft 968, bevel gears 969, a shaft 970, bevel gears 971, a shaft 972 and a worm 973. The latter turns a worm gear 974, and, hence, an inverse range cam 975 fixedly mounted on one face of the worm gear 974, and having its purpose explained later. The shaft 966, which was shown to be driven from the center 737 of the differential 736 in accordance with present range, also extends downward, and is continued in Fig.

12, where it drives bevel gears 976, a shaft 977, bevel gears 978, a shaft 979, spur gears 980, a shaft 981, a universal joint 982 and the deflection screw 983 referred to again hereinafter. Continuing toward the right, the shaft 977 turns bevel gears 984, a shaft 985, bevel gears 986, spur gears 987, a shaft 988 and a universal joint 989 to turn a prediction range screw 990 also referred to later.

The various transmissions of present range from the center 737 of the differential 736 having been shown, attention is directed to a range stop, which is shown in Fig. 11, whereby the measures of present range are kept within predetermined limits, say, between 2,000 and 30,000 yards. The shaft 744 has affixed to it a bevel gear 991, which drives another bevel gear 992 on a shaft 993. A pin 994 rotates with the shaft 993, and engages a yoke 995 when the limits of range have been reached. The yoke 995 is provided with arm 996 the end of which is adapted to be engaged by either of a pair of studs 997 or 998 on the worm gear 974, which carries the inverse range cam 975, the arm 996 being moved to swing the yoke 995 so that one or the other of its prongs will be engaged by the pin 944, when the maximum or minimum range limit is reached, as determined by one or the other of the studs 997, or 998. The previously described friction drive between the member 724 and the bevel gear 725 prevents any possible damaging of the mechanism due to turning range crank handle 772 after the range limits have been reached.

Considering now the inverse range cam 975, which was shown to be rotated to represent present range, the contour of this cam is such that its follower 999, shown in Fig. 11, will be moved to represent a function of inverse range $$\frac{1}{R}$$

The follower 999 is pivotally mounted in an arm 1000, to which a flexible element, as the cord 1001, is attached. A spring 1002 is interposed between two portions of the cord, the latter passing around a pulley 1003, and being wrapped around a drum 1004 on which it winds and unwinds as the cam 975 turns in one direction or the other. The follower 999 is thus kept in intimate contact with the periphery of the cam to be shifted thereby, and through the arm 1000 shifts the carriage 1005, which has rollers 1006 mounted in its corners arranged to run on guide rails 1007.

Another arm 1008 is affixed to the carriage 1005 and at its outer end is attached to a ball carrier 1009, the latter having balls 1010 mounted in it. These balls are driven from a disk 1011, which is rigid with the disk gear 773', which was shown to be driven in synchronism with time. The inverse range integrator roller 1012 is cone-shaped to allow for a more practical shape of the inverse range cam, the shape of which combined with the cone-shaped roller makes it possible to have the roller 1012 represent time divided by range, or $$\frac{t}{R}$$

since the disk 1011 represents time, as pointed out. The roller 1012 drives spiral gears 1013, bevel gears 1014, a shaft 1015, bevel gears 1016, a shaft 1017, other bevel gears 1018, a shaft 1019, spur gears 1020 and 1021, and hence, the disk 1022 of the bearing integrator 833, which is thus seen to represent time divided by range.

Referring again to own ship's and target's mechanical vectors, shown in Fig. 15, the movements of own ship's and target's deflection slides 898 and 878, respectively, are added. To accomplish this, own ship's deflection slide 898 in being moved, as already described, to represent the deflection component of own ship's course and speed, has its rack 1023 displaced, thereby turning a spur gear 1024, bevel gears 1025, a shaft 1026, which, in Fig. 13, turns gears 1027 and 1028, and, hence, a side 1029 of a differential 1030. When the target's deflection slide 878, shown in Fig. 15, moves, its rack 1031 turns a spur gear 1032, thus driving through bevel gears 1033, a shaft 1034, bevel gears 1035, a shaft 1036, which, as shown in Fig. 13, turns spur gears 1037 and 1038, and, thus, the other side 1039 of the defferential 1030. The center 1040 of this differential accordingly gives the sum of own ship's and target's deflection, and represents the total knots deflection.

This quantity is transmitted by the shaft 1041, to which the differential center 1040 is affixed, through bevel gears 1042, spur gears 1043, a shaft 1044, bevel gears 1045 to a shaft 1046, which, in Fig. 11, carries a spur gear 1047 that drives a rack 1048 that is attached to a ball carrier 1049. The balls 1050 are shifted radially of the disk 1022, which represents time divided by range $t/R$, as previously shown. By their radial position the balls 1050 represent knots deflection, as stated, which is thus multiplied by time divided by range, $t/R$, resulting in generated bearing. The bearing integrator roller 834 represents this value, and through the gear train 835 and the gear 836 drives the side 837 of the differential 698 and since at the beginning of the operation the initial true target bearing is set up by the bearing crank handle 691, as already described, the differential 698 algebraically adds the generated increment to the initial true target bearing, giving the total generated target bearing on the differential side 699. As the initial bearing is introduced by the crank handle 691 as true target bearing, the sum of this value plus the generated increment will be true bearing.

By the hereinbefore described drives from the differential side 699, by shaft 702 into Fig. 9, and by gears 703, 704, 705, 706 and sleeve 707 to ring dial 157', and from sleeve 707, by gears 708, 709, 710, 711 and sleeve 712 to ring dial 157, and from gear 711 by gear 713, shaft 714, bevel gears 715, shaft 716, gears 717 (in Fig. 10), shaft 718, gears 719, 720 and sleeve 721 to the ring dial 158, the ring dials 157 and 157' are subject to rotary movement about own ship's dials 425 and 425', while the ring dial 158 is similarly movable about target dial 427, whereby the ring dials 157, 157' and 158 read against the bows of the engraved own ship and target dials 425, 425' and 427 to show the courses of these ships. The fixed target bearing index 429' has been shown to read against the compass ring dial 157 to indicate the target's true bearing, the dial 157 thus functioning as a compass card, except that as the target's bearing changes, the dial moves and the target bearing line remains fixed, whereas a compass card is usually thought of as remaining fixed in space, while other quantities rotate about it.

The range rate obtained by adding the components of own ship's course and target's course along the line of sight is correct for use in calculating present range, because present range is a matter of actual distance, only. Advance range, however, is computed for the purpose of obtaining sight depression, i. e., the elevation of the gun measured from the line of sight necessary to give to the projectile leaving it a trajectory which will terminate at the target at the place at which the latter will be at the end of the flight of the projectile and the change in velocity given the projectile due to the motion of own ship.

An allowance must, therefore, be made for the fact that the effect of own ship's motion on the projectile is not the same as the effect of target motion on the range. In other words, if own ship were to travel 100 yards away from the target during the time of flight of the projectile, the effect of the ship's speed on the distance which the projectile would travel would not be 100 yards but would be 100X yards; where X is the ratio obtained by dividing change of range (of projectile) due to motion of own ship, by the change of range due to the same motion of target. This ratio is averaged for all ranges and can be assumed to be constant. It is always less than one. It is, therefore, necessary to obtain a different range rate for computing prediction for the target than is used for calculating range prediction for own ship.

The sum of the above two range rates is called the "prediction range rate," and from the explanation given above it is evidently equal to the target rate, plus factor X times own ship's range rate, because the motion of own ship has less effect on the prediction rate than does the motion of the target. If the range rate shaft were geared directly to the range prediction mechanism with gear ratios which would apply the factor X, the target range rate would be reduced by the same ratio as the own ship rate. To avoid this, the target range rate is multiplied by a factor which will make up this reduction, as the target's range rate is carried from the gear 916, in Fig. 11, which was shown to be responsive to the target's range rate slide 877, by a shaft 1051 to gears 1052 and 1053, which have a ratio which multiplies the target's range rate, as stated above, to make up the mentioned reduction. The product of this multiplication is represented by the movement of a side 1054 of a differential 1055, and is thus applied to the center 1056 of this differential. This differential center 1056 thus represents X times the target's range rate, plus the own ship range rate, which is the desired prediction range rate. From the differential center 1056, the prediction range rate is carried by a shaft 1057, which is seen in Fig. 12 to drive bevel gears 1058 and a spur gear 1059 that applies the prediction range rate to the prediction range rate sector 1060.

The sector 1060 is pivoted at one end 1061, and carries the prediction range screw 990, which is mounted to extend radially of the sector, and drives a threaded block 1062. The screw 990 is driven by the hereinbefore traced drive from the spider 737 of the differential 735, shown in Fig. 11, which spider was shown to represent present range. The gear ratios are such, however, that the screw 990, shown in Fig. 12, represents the time of flight equivalent to the present range. This is based on the assumption that the time of flight is proportionate to range, the error involved in this assumption being negligible. Rotation of the screw 990 shifts the block 1062 and, hence, the time of flight pin 1063 carried thereby.

The time of flight, represented as above described, is multiplied by the prediction range rate through the already-described movement of the prediction range rate sector 1060, the result being represented by the movement of the range prediction parallel 1064, in consequence of the displacement of the time of flight pin 1063 in an elongated slot in a cross arm 1065, extending at right angles to the parallel 1064. The parallel 1064 is pivoted at one end, as at 1066, to a pivoted arm 1067, and at its other end is pivoted at the same radius, as at 1068 to the arm 1069 of a prediction sector 1070. The movement of the parallel 1064 determines the position of the prediction sector 1070, which represents the range prediction. Movement of the sector 1070 turns a spur gear 1071, bevel gear 1072, a shaft 1073, bevel gears 1074, and a shaft 1075, which, as seen in Fig. 11 turns the center 1076 of a differential 1077. Since the shaft 740, shown in Fig. 11, operates, as already explained, in accordance with present range, it is clear that the gear 1078 drives the gear 1079 and one side 1080 of the differential 1077. Hence this differential adds the range prediction and the present range algebraically, whereby the side 1081 turns in accordance with advance range. Rotatable with the differential side 1081 is a spur gear 1082, which drives another spur gear 1083, a shaft 1084, bevel gears 1085, a shaft 1086, spur gears 1087 and an advance range counter 1088.

The next step is to obtain sight depression, in minutes of arc, from the advance range in yards. The relationship between the two quantities is shown by the curve *abc* which is drawn in Fig. 18 to represent sight depression in minutes, including a correction for vertical parallax. To obtain certain advantages in construction the curve *abc* is assumed to be made up of a straight line *def* plus or minus the ordinates in the shaded area between the two curves.

Referring again to Fig. 11, it will be seen that the shaft 1084, which turns in accordance with advance range, also extends downward and drives through bevel gears 1089, a shaft 1090, which extends into Fig. 14, spur gears 1091, a shaft 1092 and a worm 1093 to turn the worm gear 1094, with which a range converter cam 1095 turns in unison. The shaft 1090, as shown in Fig. 14, also drives through bevel gears 1096, a shaft 1097, bevel gears 1098 and 1099 to operate the side 1100 of a differential 1101, which, by the proper use of gear ratios is made to represent the straight line approximation *def* shown in Fig. 18.

Co-acting with the range converter cam 1095, shown in Fig. 14, is a sector 1102, having a radial arm 1103, which is pivoted at 1104 and carries a roller 1105 that is the follower for the range converter cam 1095, being maintained against the periphery thereof by a spring 1106, which urges the sector arm 1103 in the proper direction for this purpose. Actuation of the sector 1102 by the cam 1095 causes the former to drive through a spur gear 1107, bevel gears 1108, a shaft 1109, bevel gears 1110, a shaft 1111, bevel gears 1112 and a shaft 1113 to turn the center 1114 of the differential 1101. Due to the shape of the range converter cam 1095, its association with the sector 1102 and the traced drive from the latter to the differential center 1114, this differential center represents, with the proper algebraic sign, the ordinates of the shaded areas between the straight line approximation *def*, shown in Fig. 18, and the sight depression-range curve *abc*. The side 1115 of the differential will, therefore represent sight depression, and through the gears 1116 and 1117 drives a shaft 1118, so operating the sight depression counter 1119 and dial 1129, which read in minutes of arc, but are not located on the face plate of the range keeper shown in Fig. 5, since the indication is only used in initially setting the range keeper with the director with which it is associated.

The shape of the range converter cam 1095 is such as to include a correction for vertical parallax in the director sight depression, which, in Fig. 17, is the angle designated as DSD. This angle is equal to the sum of the angles GSD and D, the former representing the gun sight depression and the latter the dip correction, or vertical parallax correction. The sight depression is equal to the required gun elevation in minutes of arc measured from the line of sight and necessary to cause a projectile from own ship's gun to reach the target. The mimic gun in the director has the same elevation GSD as own ship's real gun, and, therefore, the addition thereto of the corrective angle D for vertical parallax gives the director sight depression DSD.

Measures of sight depression are also transmitted from the side 1115 of the differential 1101 by way of gears 1116 and 1121 to a side 1122 of a differential 1123, and from the gear 1121 by a gear 1124 to a side 1125 of a differential 1126. The differential members 1122 and 1125 of the differentials 1123 and 1126, respectively, are elements of differentials which are included in a double unit follow-up mechanism for transmitting or relaying sight depression to the mechanism of the director.

It is to meet the conditions of adapting the measure of sight depression to the loading of the guns with either a full charge or a reduced charge, according, for example, to battle or target practice requirements, that both differentials 1123 and 1126 are present. The differential 1123 is operative for a full charge and its side 1127 is driven from a sight depression clutch 541, shown in Fig. 2, which clutch drives through a shaft 553, bevel gears 554, and 555, a shaft 556, bevel gears 557, a shaft 558, a clutch 559, another shaft 560, bevel gears 561, a shaft 562, other bevel gears 563, a shaft 564, bevel gears 565, another shaft 566 and bevel gears 567, which turns the sight depression shaft 436, shown in Fig. 1 to enter the range keeper 126. In Fig. 14, the shaft 436 is seen to have a gear 1128, which drives a gear 1129 and the side 1127 of the differential 1123.

As long as the operation of the side 1127 of the differential 1123 is unequal to the operation of the other side 1122 of this differential from the range converter cam and sector 1095 and 1102, the center 1130 of the differential 1123 turns a shaft 1131, gears 1132, 1133, 1134, 1135 and a shaft 1136. This shaft drives bevel gears 1137, one of which is revoluble with a spur pinion 1138 mounted thereon. The pinion 1138 is a member of a gear train further comprising a gear 1139, a pinion 1140, and a gear 1141, which is fast on a sleeve 1142 on which a low speed cam 1143 is rigidly secured. The shaft 1144 on which the bevel gear 1137 and pinion 1138 are secured passes through the sleeve 1142 and turns a high speed cam 543.

The high speed cam 543 is adapted to revolve a number of times, but the low speed cam 1143 makes only a partial turn wherein a neutral position $n$ on either of a pair of slopes connecting the dwell $h$ of greater radius and the dwell $l$ of less radius, or either the dwell $h$ or the dwell $l$ is engaged by a roller 1145. This roller and another roller 1146 are on the same stud, which is carried by the end of a double arm lever 1147 that is pivoted to a fixed fulcrum 1148, the opposite end of the lever 1147 being attached to a spring 1149, which pulls on the lever 1147 to urge the rollers 1145 and 1146 toward the peripheries of the low and high speed cams 1143 and 543, respectively.

Also pivoted to the fixed fulcrum 1148 is another double arm lever 1150, which at one end carries a roller 1151, a spring 1152 being connected to both levers 1147 and 1150, and serving to pull on the latter lever to urge the roller 1151 against the periphery of the low speed cam 1143. Pivoted at 1153 to the lever 1147 is a switch arm 544, which is connected by a spring 1154 to the outer end of the lever 1150, thus causing the switch arm 544 to be drawn against an arm 1155 which projects from the lever 1150. The free end of the arm 544 is provided with a double ended electrical contact, which is adapted to engage either of a pair of electrical contacts 545 and 568, that are in an electrical circuit hereinafter referred to.

A pair of slopes are present between the dwells of greater and less radii, $h'$ and $l'$, respectively, of the high speed cam 543 and each has a neutral position $n'$, and when the high and low speed cams 543 and 1143 assume positions wherein a pair of the neutral positions $n'$ and $n$, of the different cams are aligned and have the same circumferential disposition, both rollers 1146 and 1145 will be in engagement with cams 543 and 1143 in a neutral position. As this neutral position is radially intermediate the radii of the high and low dwells of the two cams, the lever 1147, acting under the influence of the spring 1149 will have turned about the pivot 1148 to permit the rollers 1145 and 1146 to lie in their neutral position. The springs 1152 and 1154, hold the levers 1147 and 1150 and the arm 544 in correlation for simultaneous movement, whereby the arm 544 is also moved into a neutral position, wherein its electrical contact is out of engagement with both of the fixed electrical contacts 545 and 568. In passing out of the neutral position, the dwell $h$ of the low speed cam 1143 will move sufficiently, during the first revolution of the high speed cam 543, to hold the roller 1145 out of its neutral position, so that as the smaller radius dwell $l'$ of the high speed cam 543 comes under the roller 1146, the latter cannot move inward against the dwell $l'$, and the switch arm 544 will not move back into its neutral position.

When, however, sight depression is being measured in one direction, both rollers 1145 and 1146 are riding on the dwells $h$ and $h'$ of the cams 1143 and 543, as shown in Fig. 14, and the levers 1147 and 1150 will have accordingly been turned about the fixed pivot 1148 so as to carry the spring-grouped parts through an angular displacement which will move the contact of the arm 544 into engagement with the fixed electrical contact 545. Continued rotation in the same direction will not interrupt this engagement as the dwell $l'$ of the high speed cam 543 comes under the roller 1146, despite the smaller radius of this dwell. This is because the roller 1146 is on the same stud as the roller 1145. The latter still rides on the dwell $h$ of greater radius on the low speed cam 1143, and roller 1151 remains against dwell $l$ of the low speed cam.

For a reversed direction of sight depression measure, as when the elevation of the guns is to be changed in the reverse direction, the smaller radius dwell $l$ of the low speed cam will come under the roller 1145. With the smaller radius dwell $l'$ also under the roller 1146, the lever 1147 is swung by the spring 1149 about the fixed pivot 1148 until the rollers 1145 and 1146 bear on the smaller radius dwells $l$ and $l'$ of the low and high speed cams 1143 and 543. The springs 1152 and 1154 so hold the levers 1147 and 1150 and the switch arm 544 that the latter is swung into engagement with the fixed electrical contact 568. Continued rotation in the same direction does not interrupt this electrical connection, for, while the high speed cam 543 rotates so that its dwells of different radii act on the roller 1146 so as to reversely turn the lever 1147, the spring 1149 is merely alternately expanded and contracted, but the spring 1154 continues to hold the contact of the switch arm 544 against the fixed contact 568. The reverse movements of the lever 1147 impart a substantially reciprocatory motion to the arm 544, whereby its electrical contact rubs on the end of the fixed contact 568 without disengagement therefrom.

Direct current is conveyed from the positive line conductor 138, shown in Fig. 4, by conductors 480, 481 and a switch 481$^a$ to the switch arm 544 (also shown in Fig. 14), and to one or the other of the contacts 545 or 568, according to which the cam 543 has caused the switch arm 544 to engage. Reference to Fig. 4, shows that, if the switch arm 544 engages the contact 545, for example, the current will continue to flow from the contact 545 by a conductor 546 to an electromagnet 547, from which it goes by conductors 548 and 549 to and through a cut-out switch 550, proceeding therefrom by conductors 551, 191 and 140 to the negative line conductor 141. As a result the disk-gear 542 is thrown into mesh with the gear train 552, which drives a gear on a shaft 553.

As shown in Fig. 2, the shaft 553 drives through bevel gears 554 and 555, a shaft 556, bevel gears 557, a shaft 558, a clutch 559, another shaft 560, bevel gears 561, a shaft 562, other bevel gears 563, a shaft 564, bevel gears 565, another shaft 566 and bevel gears 567, which turn the sight depression shaft 436, shown in Fig. 1 to enter the range keeper 126. In Fig. 14, the shaft 436 is shown to have the gear 1128, which drives the gear 1129 and the side 1127 of the differential 1123 until this differential side matches the other differential side 1122, which is driven from the range converter cam 1095 and the sector 1102. Upon such matching, the differential spider 1130 and the follow-up cams 543 and 1143 will have been brought back to the neutral position, causing the switch arm 544, shown in Figs. 4 and 14, to also be in its neutral position, thereby opening the circuit already described and shown in Fig. 4. This stops the operation of the sight depression clutch 541, after it has driven the differential side 1127 an amount representative of the sight depression.

For a reduced charge, the differential 1126, shown in Fig. 14, is used, the switch 481$^a$, shown in Fig. 4, being thrown to disconnect the switch arm 544 from the circuit, and to carry the current from the conductor 481, through the switch 481$^a$ and a conductor 481$^b$ to the switch arm 544' of the reduced charge follow-up switch. As seen in Fig. 14, the gear 1129, which is driven from the director in accordance with sight depression turns with a gear 1156 that drives another gear 1157 and a side 1158 of the differential 1126. Similarly to the differential 1123, the differential center 1159 of the differential 1126 turns a shaft 1160, so driving through gears 1161, 1162, 1163, 1164, a shaft 1165 and bevel gears 1137' to operate the reduced charge follow-up mechanism, which corresponds in operating means to the full charge mechanism already described, the parts being indicated by the same numerals as those of the full charge mechanism, except that they are affected by a prime mark. The control of the reduced charge follow-up mechanism is the same as that already described for the full charge follow-up mechanism, except that the gear ratios are such that a larger sight depression will be transmitted to the director for a given value of sight depression in the range keeper.

Referring now to Fig. 15, it is evident that knots deflection due to the target's motion is proportional to the movement of the target's deflection slide 878, the rack 1031 of which drives the spur gear 1032, bevel gears 1033, shaft 1034, bevel gears 1035 and the shaft 1036, which in addition to driving through gears 1037 and 1038 to operate the side 1039 of the differential 1030, also extends below the gear 1037 and continues in Fig. 12. In this figure, the shaft 1036 drives through bevel gears 1166, a shaft 1167, bevel gears 1168, a shaft 1169, bevel gears 1170 and a spur gear 1171 to operate a target's deflection sector 1172. The screw 983, which is carried by this sector, has been shown by a previously traced drive to be operated in accordance with present range, but the screw pitch is such that the radial position of the block 1173 threaded on the screw 983, and the range pin 1174 carried by the block, represents time of flight divided by present range. This is possible since $$\frac{t}{R}=K+K_1R$$

where $t$ is time of flight, R is present range and K and K$_1$ are constants. By this construction, the amount of rotation of the range pin 1174 about the axis of rotation of the sector 1172 represents knots deflection due to target's motion multiplied by time of flight and divided by range, i. e., mils deflection due to target.

A deflection parallel 1175 has one end pivoted at 1176 to a pivoted arm 1177, its other end being pivoted at 1178 to the arm 1179 of an arbitrary deflection sector 1180, at a radius equal to that of the pivoted arm 1177. Mounted on the deflection parallel 1175 is a drift cam 1181, the shape of the cam slot representing drift correction in mils, so that the resultant motion of the arbitrary deflection sector 1180 represents arbitrary deflection due to the target's motion plus drift correction. This value is transmitted through a spur gear 1182, bevel gears 1183, and a shaft 1184, which extends, in Fig. 13, to the center 1185 of a differential 1186, driving this differential center.

Reference to Fig. 15 shows that own ship's deflection slide 898 drives through the spur gear 1024, bevel gears 1025, the shaft 1026, bevel gears 1187, a shaft 1188, spur gears 1189, a shaft 1190, bevel gears 1191, a shaft 1192, other bevel gears 1193, a shaft 1194, bevel gears 1195, another shaft 1196 and gears 1197 and 1198 to drive a side 1199 of the differential 1186 in accordance with deflection in knots due to own ship's movement. The gear ratios are such, however, that knots are converted into mils. This is based on the fact that the lateral deviation due to motion of own ship as given in range tables may be said to be independent of the range without incurring any appreciable error.

The differential 1186 algebraically adds the two values of deflection in mils mentioned above, i. e., from the arbitrary deflection sector 1180, shown in Fig. 12, and from own ship's deflection slide 898, shown in Fig. 15, whereby the sum is represented by the side 1200 of the differential 1186, shown in Fig. 13. The differential side 1200 drives through spur gears 1201, 1202, a shaft 1203, spur gears 1204, 1205, a shaft 1206, other spur gears 1207, 1208 and a shaft 1209 to turn the deflection dial 832. Additionally, the drive from the differential side 1200 through the gears 1201 and 1202 also turns a gear 1210 and a side 1211 of a differential 1212.

Deflection corrections in mils, from spotting, etc., are set by the knob 821, shown in Fig. 13, which as previously explained drives through the shaft 822, spur gears 823, shaft 824, bevel gears 825, the shaft 826, gears 827 and 828, and the sleeve 829 to position the deflection correction ring dial 434 of the range keeper. The index 830 on the deflection correction ring dial 434, when read against the deflection correction scale 831, as shown in Fig. 5, gives the deflection correction in mils, as already explained. When read against the deflection dial 832, the index 830 on the ring dial 434 indicates the total corrected deflection which is being transmitted to the director.

The deflection correction, which is put in through the deflection knob 821, travels, as already shown, by way of shaft 822, spur gears 823, shaft 824, bevel gears 825 to the shaft 826, where, in addition to being sent to the deflection correction ring dial 434, the deflection correction is also carried by spur gears 1213 and 1214 to a side 1215 of the differential 1212. Thus, the deflection correction is introduced by the side 1215 of this differential and the arbitrary deflection sector 1180, shown in Fig. 12, by way of gears 1182, 1183, shaft 1184, in Figs. 12 and 13, differential center 1185, differential side 1200, and gears 1201, 1202, and 1210 to the differential side 1211, are algebraically added by the differential 1212.

This sum corresponds to corrected arbitrary deflection and is represented by the center 1216 of the differential 1212. The differential center 1216 drives a shaft 1217, bevel gears 1218, a shaft 1219, spur gears 1220, a shaft 1221, bevel gears 1222, a shaft 1223, and spur gears 1224 and 1225 to turn a side 1226 of a differential 1227, of a follow-up mechanism which controls the corrected arbitrary deflection mechanism of the director. This is accomplished by the differential side 1226 turning the center 1228 of the differential 1227, thus driving through a shaft 1229, and a gear train comprising a pinion 1230, a gear 1231, a pinion 1232 and gear 1233, so turning a sleeve 1234 and a low speed cam 1235 of the deflection follow-up mechanism. The deflection follow-up mechanism is similar to that shown in Fig. 14 and already described in connection with sight depression, and it will, therefore, be sufficient to point out its elements and say that it acts like the previously described follow-up mechanism.

Continuing the tracing of the deflection follow-up mechanism, the shaft 1229 passes through the sleeve 1234 and has the high speed cam 477 fast thereon. A pair of rollers 1236 and 1237 are on the same stud, which is carried by a double arm lever 1238 that is fulcrumed on a fixed pivot 1239. A spring 1240 is attached to the opposite end of the lever 1238 and urges the latter to cause the roller 1236 to bear on the low speed cam 1235 and the roller 1237 on the high speed cam 477. Another double arm lever 1241 is also fulcrumed on the fixed pivot 1239 and is connected to the other double arm lever 1238 by a spring 1242, the lever 1241 carrying a roller 1243 which rides on the low speed cam 1235. A switch arm 478 is pivoted at 1244 to the lever 1238 and is drawn by a spring 1245 against an arm 1246, which projects from the lever 1241. The switch arm 478 has a double contact that is adapted to engage either of a pair of electrical contacts 479 and 504, in accordance with increasing or decreasing deflection, as the case may be, the cam 477 becoming so positioned as to properly shift the switch arm 478 through the levers 1238 and 1241, etc.

If the switch arm 478 engages the contact 479, for example, reference to Fig. 4 shows that current will flow from the positive line conductor 138, by conductors 480 and 481 to the switch arm 478, to the contact 479, going by a conductor 482 to the coil of an electro-magnet 483 of a deflection clutch 484, and therefrom by conductors 485 and 486 to and through a cut-out switch 487, then proceeding by conductors 508, 191 and 140 to the negative line conductor 141. Hence, the electro-magnet 483 attracts a disk gear 488, carrying it into mesh with a gear train 489 of the deflection clutch in the director, which clutch drives a gear on a shaft 490.

Referring to Fig. 2, the shaft 490 drives bevel gears 491, a shaft 492, bevel gears 493, another shaft 494, through a clutch 495, turning a shaft 496, bevel gears 497, a shaft 498, other bevel gears 499, another shaft 500, bevel gears 501, a shaft 502 and bevel gears 503 to turn deflection shaft 448 that extends into the range keeper 126. As shown in Fig. 13, the shaft 448 drives through a universal joint 1247, a shaft 1248, a gear 1249 fast thereon and a gear 1250, which is rigidly combined with a side 1251 of the differential 1227. The side 1251 of this differential is driven from the director until it matches the corrected arbitrary deflection applied to the other side 1226 of this same differential by the range keeper, when the center 1228 of the differential will become stationary, as, of course, will the shaft 1229, the cams 477 and 1235 assuming their neutral position. This results in the switch arm 478 being moved into its neutral position out of engagement with both fixed contacts 479 and 504, thus opening the circuit through the electro-magnet of the deflection clutch 484 in the director, and stopping the drive of the side 1251 of the differential 1227 in the range keeper. When the deflection changes oppositely, the switch arm 478 becomes engaged with the contact 504, thus energizing the coil of another electro-magnet 506, which then attracts the disk-gear 488 to mesh it with another gear train 509 which drives the shaft 490 in the opposite direction. This effects a reversed driving of the deflection shaft 448 and the parts responsive thereto. Accordingly, shaft 448, shown in Fig. 13, reversely drives the universal joint 1247, shaft 1248, gears 1249 and 1250, the side 1251 of differential 1227, the differential center 1228 and the shaft 1229. Hence, the high and low speed cams 477 and 1235, respectively, will also be reversely driven to return to their neutral position, after having previously been turned away therefrom by the actuation of the side 1225 and center 1228 of differential 1227 in accordance with a measure of corrected arbitrary deflection when the latter has taken place in the opposite direction to that first referred to. The reversed driving of the deflection shaft 448 also reversely drives other parts responsive thereto, as will appear hereinafter.

Referring now more particularly to the director, it has previously been shown that the mirrors 15 and 16, shown in Fig. 1, stabilize the image rays and that the mirrors may be adjusted at will. It has also been made clear that, when the trainer turns his handwheel 75, he orients the superstructure of the director about a vertical axis, thereby keeping the mirrors 15 and 16 trained on the target. At the same time, the degree of train was shown to be transmitted to the guns, and other stations. The director's rotatable frame was shown to carry a range keeper, which received actuating power from a power motor mounted on the rotatable portion of the director, the range keeper receiving compass indications of own ship's movements through the previously described transmission.

To bring the mirrors 15 and 16 quickly to bear on a target the trainer may press in his hand wheel 75, thus disengaging gears 77 and 78, and engaging a clutch member 255 on the gear 77 with a clutch member 256 on the gear 82. With this done, the director may be slewed rapidly. During training or slewing a pair of bevel gears 257 turn with the shaft 83 and turn a shaft 258. At its upper end the shaft 258 drives through spiral gears 259 to turn a drum dial 260 bearing the major readings of a gun train indicator 261. Bevel gears 262 are also driven by shaft 258, and turn a shaft 263 provided at its other end with a finger 264. This finger causes intermittent rotation of a shaft 265 by striking a star wheel 266. The shaft 265 turns spiral gears 267 to turn another drum dial 268, which bears the minor sub-divisions of the gun train indicator 261.

The pointer receives information from available sources as to the point of the roll of the ship, i. e., director correction, at which it is desired to fire. Thereupon, he turns his hand wheel 269, shown in Fig. 1, thus turning a shaft carrying a spur gear 270, the latter turning another spur gear 271. The gear 271 is rigid with a bevel gear 272 forming one side of a differential 273, which has a center comprising a spider 274 and bevel gears 275 and 276 rotatably mounted on the spider. A third member of the differential is formed by a bevel gear 277 having another bevel gear 278 rigidly combined with it.

When the pointer sets up the director correction, the side 272 of the differential 273 and the differential spider 274 and its gears 275 and 276 turn, the side 277 of the differential being held at this time. When the spider 274 turns so does a shaft 279 to which it is pinned. The shaft 279 carries a gear 280 which drives another gear 281 rigidly mounted on a shaft 282. Bevel gears 283 are driven by shaft 282 and turn another shaft 284 at the upper end of which are spiral gears 285 which turn a drum dial 286 bearing the major indications of gun elevation. Bevel gears 287 are driven by the shaft 284 and turn a shaft 288, which carries a finger 289 that operates a star wheel 290 to intermittently turn a shaft 291 and spiral gears 292, thereby turning another drum dial 293, which bears the minor subdivisions of the gun elevation indicator 294.

Simultaneously, the shaft 282 is driving a pair of bevel gears 295, shown in Fig. 1, which turn a shaft 296, other bevel gears 297 and another shaft 298. On the upper end of the shaft 298 is a worm 299 that is in mesh with a worm sector 300, which is rigid with a mimic gun trunnion bail 301. Thus, if the director pointer changes director correction by turning his hand wheel 269 he effects the turning of the worm 299 which through the worm sector 300 raises or lowers the mimic gun trunnion bail 301 by the same amount. A shaft 302, termed the dummy or mimic gun, corresponds in position to the train as well as the elevation of the real gun, for, when the trainer trains the director, the mimic gun 302 is likewise trained.

To accurately preserve the analogy of the mimic gun to the real gun, mimic gun trunnions 301', 301'' are associated with the mimic gun 302 through the medium of the mimic gun trunnion bail 301, the mimic gun trunnions 301', 301'' being mounted in the body of the director in a plane parallel to the trunnion plane of the real guns which will be served by the director. The diagrammatic form of Fig. 1 emphasizes this graphically, since the mimic gun trunnions 301', 301'' are shown as being pivoted in the standards 9, 9, which symbolize the standards of a real gun, the bottom plate 7 of the director framing being so mounted as to be constantly parallel with the plane of the deck upon which the real guns are mounted, and therefore, being representative of the deck. It is accordingly obvious that whatever disposition the trunnions of the real guns acquire, there is an exactly corresponding disposition of the mimic trunnions 301', 301'' of the mimic gun 302.

On the end of the mimic gun 302 is a wide fork having pivots 303 at the terminals of the bifurcation, which pivots engage a zenith ring 304 at diametrically opposite points. To the zenith ring 304 a sector 305 is affixed, which sector is shown in Fig. 1 to be in a substantially vertical plane. The sector 305 is in mesh with a worm 306 which is mounted between the upper and lower arms of a bracket 307 that is rigid with the mimic gun 302. Because of the meshing of the worm 306 and the sector 305, the zenith ring 304 is tilted with the mimic gun 302, when the latter is elevated or depressed by its pivotal connection 302' with the mimic gun trunnion bail 301.

An irregularly shaped deflection bail 308 is pivoted at diametrically opposite points 309 in the zenith ring 304 on an axis perpendicular to the pivotal axis 303—303. The two intersecting axes of the zenith ring 304 have a common intersection with that of the mimic gun axis and the axis of the mimic gun trunnions.

Projecting from the deflection bail 308 is a pin 310 which pivots in a firing bail 311 midway between the pivotal connections 312 of the firing ring with the correction frame 10. When the zenith ring 304 is tilted with the mimic gun, as described, the deflection bail 308 is correspondingly tilted about the pivotal axis common to pivots 303—303 and 312—312, because of its own pivotal connections 309—309 with the zenith ring 304. The pin 310 also correspondingly tilts the firing bail 311, which through a pin 313 projecting from it actuates a link 314, this link thus moving an arm 315 of a firing mechanism.

Figure 6:
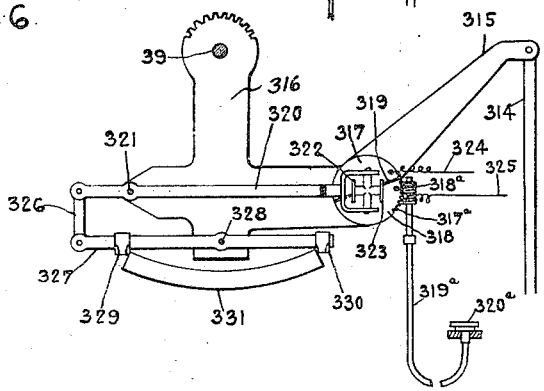
Fig. 6 is an enlarged view of a portion of the firing mechanism.

Referring to both Figs. 1 and 6, the arm 315 is rigid with a supporting plate 316, which, in the simple illustrated form of the invention, is shown as being pivoted about the axis of the elongated outer gimbal ring trunnion 39. Therefore, movement of the arm 315 by the link 314 moves the supporting plate 316 about the said axis.

Mounted on the supporting plate 316 is an electric switch comprising a pair of semi-circular segments 317 and 318 disposed to form a disc and separated from each other by intervening insulation 319. A switch arm 320 is fulcrumed at 321 and has an insulated end portion in which are mounted a pair of contact wheels 322 and 323. These wheels are adapted to bear against one or the other of the switch segments 317 and 318, except when the ship is at the point of its roll at which firing of the guns is to take place. At this point, the wheel 322 will be on one switch contact segment 317 and the wheel 323 will be on the other switch contact segment 318. Then, current may flow from a conductor 324 through switch contact segment 317, the contact wheel 322, the metallic support therefor, the other contact wheel 323 also carried by this support, the other switch contact segment 318 and another conductor 325. The conductors 324 and 325 are part of a gun-firing circuit, which is thus closed if the firing key at the gun or other control station is also closed, as in the usual practice.

The free end of the short arm of the double arm switch lever 320 is pivoted to a link 326, the opposite end of which is pivoted to another double arm pallet lever 327, which is fulcrumed at 328. Spaced from this fulcrum on opposite sides of it are pallets 329 and 330 on the lever 327. These pallets co-act with the ends of a curved member 331, which is stabilized by being mounted on arms 332 and 333 that extend outward and curvingly downward from the stabilized outer gimbal ring 37.

Accordingly, when the supporting plate 316 is moved by the movement of its arm 315 through displacement of the link 314, the pallets 329 and 330 change their relation to the stabilized curved member 331, so that the pallet lever 327 turns about its fulcrum 328 an amount proportional to the director correction given the firing bail 311 by the pointer. Obviously the link 326 turns the switch lever 320 about its fulcrum 321 thereby altering the relation of the wheel contacts 322 and 323 with regard to the switch contact segments 317 and 318. Thus compensation is made in the firing switch for the amount of director correction given to the director so that the point of firing in the roll of the ship may be correctly maintained.

Account is also taken of the losses in time between the moment of the closing of the firing switch and the moment that the exterior ballistics become effective. Appreciable periods of time elapse during the ignition of the powder charge, and the travel of the projectile through the barrel of the gun till it leaves the muzzle thereof, etc. Thus, it is plain that to close the firing switch at the exact point in the roll of the ship whereat the guns have the correct elevation for the range, would mean that when the projectile left the gun muzzle the continued roll of the ship may have altered the elevation sufficiently to jeopardize the accuracy of the shot.

To avoid the danger of such unsatisfactory performance, the contact segments 317 and 318, together with the intervening insulation strip 319 are combined into a unit, which is rotatably adjustable on the supporting plate 316. The rotary unit 317—318—319 has teeth 317a on its periphery, which are in mesh with a worm 318a that is adapted to be driven by a flexible shaft 319a that is operated by a knob 320a. Thus the unit 317—318—319 may be turned enough to advance the moment of firing by an amount which will compensate for the time-loss between the time the firing switch is closed and the projectile leaves the gun muzzle.

While the pointer turns his hand wheel 269, shown in Fig. 1 and the range keeper adds in sight depression to elevate the mimic gun 302, the shaft 282 turns as set forth and drives bevel gears 334, thus turning a shaft 335. As seen in Fig. 2, the shaft 335 turns a pair of bevel gears 336, thereby turning a shaft 337 and the rotor 338 of a fine gun elevation transmitter.

As shown in Fig. 4, the rotor 338 is connected by conductors 339 and 340 across the alternating current line 115—116, while the stator 341 of the fine gun elevation transmitter has spaced points of its delta winding connected by conductors 342, 343, and 344 to correspondingly spaced points in the stator 345 of a fine gun elevation receiver at the gun or other station. The rotor 346 of the fine gun elevation receiver is connected by conductors 347 and 348 across the alternating current maine 115 and 116.

Coupled with the fine gun elevation transmitter is a coarse gun elevation transmitter, the rotors of which are connected through a reduction gear train 349, as shown in Fig. 2. From Fig. 4 it is clear that the rotor 350 of the coarse gun elevation transmitter is connected by conductors 351 and 152 across the alternating current main line 115—116. Spaced points in the stator 353 of the coarse gun elevation transmitter are connected by conductors 354, 355 and 356 with corresponding points in the winding of the stator 357 of the coarse gun elevation receiver. The rotor 358 of this receiver is connected by conductors 359 and 360 across the alternating current mains 115 and 116.

It is now evident that the pointer in operating his hand wheel 269, for director correction and the range keeper adding in sight depresison set up the gun elevation on the gun elevation indicator 294 of the director, position the mimic gun 302 in accordance with the indicated gun elevation, adjust the contacts of the switch of the firing mechanism in accordance with the director correction and operate fine and coarse gun elevation transmitters to send the gun elevation to the fine and coarse gun elevation receivers at the gun, or elsewhere.

Due to the action of the waves, the ship will oscillate about an axis which passes through its center of gravity. Since the guns are mounted at higher levels than the ship's center of gravity, the line of fire will be swung to one side or the other of a vertical plane in which the axis of the bore of the gun will lie when the ship is upright, or on an even keel, and the gun is aimed at the target. This vertical plane is the one which would contain the trajectory of the projectile from the gun, if the ship did not oscillate or rock. Manifestly, such displacement of the line of fire renders it inaccurate, unless suitable correction for the displacement be made.

With this possible inaccuracy in mind, the director is provided with a cross-leveller's telescope 361, shown in Fig. 3. An optical system is associated therewith and includes a pair of reversely inclined mirrors 362 and 363, which are mounted on a common shaft 364. As shown in Fig. 1, the mirror shaft 364 is provided with spaced enlargements between which a bifurcated arm 365 embraces the shaft. A rock shaft 366 carries the forked arm 365, and may be turned by a knob 367 to shift the mirror shaft 364 longitudinally, the mirror shaft being rotatably and slidably mounted in bearings in standards 368 and 369 supported by the main rotatable frame 8 of the director.

The knob 367 is turned to bring one or the other of the mirrors 362 or 363 into alignment with an objective lens 370, shown in Fig. 3, of the cross leveller's telescope, which is of the periscope type. The mirrors 362 and 363 bear on the horizon at 90 degrees to the line of sight and either may be used, except when the horizon is obscured, as by a smoke screen. Then the mirror which still reveals the horizon in the opposite direction is aligned with the lens 370. Both the mirrors may be used simultaneously by so adjusting the knob 367 that neither of the mirrors 362 or 363 will be entirely withdrawn from a position in which it reflects the horizon, and in times of stress the need for operating the knob 367 to change from the use of one mirror to the other is obviated by the setting which makes both mirrors simultaneously effective.

Referring to Fig. 3, the reflection of the horizon comes along with the line 371 or 372, and the reflection of the horizon image rays in the aligned cross leveller's mirror may be traced by the central ray 373, which passes through the lens 370 to the prism 374, which reflects it into the tube 375 of the cross leveller's telescope and to the ocular 376 thereof.

The cross leveller observes the relation of the reflection of the horizon with respect to the cross wires of his telescope and notes any departure from coincidence. Detecting a lack of coincidence of the horizon with the cross wires, the cross leveller operates his hand wheel 377, shown in Fig. 1. This turns an inclined shaft 378, which drives a pair of bevel gears 379 and a shaft 380. Near the upper end of the shaft 380 is a worm 381 secured thereon and in mesh with a worm gear 382 which is mounted on the mirror shaft 364 to rotate therewith but not to accompany the shaft when it has endwise motion due to the operation of the mirror-shifting knob 367.

By the operation of his hand wheel 377, the cross leveller thus tilts the mirrors in one direction or the other until the mirror aligned with the lens 370 again bears on the horizon. When both mirrors are partially aligned with the lens 370, so as to show two opposite portions of the horizon, the operation of the hand wheel 377 is such as to cause both mirrors to bear on the horizon in opposite directions at 90 degrees to the line of sight, the images of the two portions of the horizon being in coincidence. While the cross leveller's hand wheel 377 is being turned, the shaft 378 also turns a worm 383 near its lower end, which, being in mesh with a worm gear sector 384, displaces the latter and a cross leveller's bail 385 with which it is rigid. The cross leveller's bail 385 is pivoted at 386, 386 to the main rotatable frame 8, so as to swing transversely of the axis of the mimic gun 302. The deflection bail 308 is provided with a depending arm 387, carrying a roller 388 near its lower end, which roller runs in a slot 389 in the lowermost portion of the cross leveller's bail 385.

When the cross leveller seeks to reposition his mirror to bring the image of the horizon into coincidence with the horizontal cross wire of his telescope, or both images of the horizon when both cross-levelling mirrors are maintained in reflecting positions, he swings the bail 385 an amount proportional to that which the ship has rolled from its even keel, or upright, position. The arm 387 is similarly displaced, and as it has a pivotal connection 399 at its upper end with the bottom of the zenith ring 304, the latter is rotated about the axis 302'—310. Thus, the axis of the arm 387 and the coincident axis 309—309 of the zenith ring 304 are brought into a vertical plane that is directed toward the zenith of the heavens. The result is that the pivots 303—303 of the zenith ring 304 are maintained truly horizontal. Other results also follow, as will now be explained.

In Fig. 1 the mimic gun 302 is shown to have the axis of its simulated barrel horizontal, but when the mimic gun has been moved, as previously set forth, its axis is inclined and passes through the theoretical center of the zenith ring 304, as shown by the dotted line 302'', in Fig. 1. This inclination has been given it by the pointer and range keeper as hereinbefore described, and corresponds to the elevation which has been given to the real gun. It is plain that, as the ship rolls in a direction perpendicular to the plane containing the line of fire, the real gun will be swung about the center of oscillation of the ship, so that the gun is displaced from the plane containing the intended line of fire. Also, in swinging about the center of oscillation of the ship, the elevation of the real gun is changed. Thus, the gun is incorrectly positioned both with regard to train and elevation, whenever the plane of its trajectory does not pass through the target, as it will not, except for a moment, during the rolling of the ship.

At such times, the condition exists where the trainer, pointer and cross leveller of the director are jointly coacting in maintaining the correct condition for firing the gun to hit a target. The cross leveller turns his hand wheel 377, until his mirror reflects the horizon so that it is in coincidence with the horizontal cross wire of his telescope. This action, in the already described manner, swings the cross leveller's bail 385, whereupon the arm 387 turns the zenith ring 304 about the axis of the simulated barrel of the mimic gun 302, while that axis is in the position of the dotted line 302''. But, the outer end of the mimic gun 302 is not free like the muzzle of the real gun, being pivoted at 302' to the gun elevation bail 301. As this bail has its ends pivoted to the upper ends of the standards 9, and since actuation of the drive from the cross leveller's hand wheel 377 is insufficiently strong to rotate the main frame which includes the standards 9, there is a reaction through the mimic gun, whereby its pivotal connections 303—303 with the zenith ring 304 turn the latter about what the cross leveller has caused to be an axis in a vertical plane.

The zenith ring 304 is provided at opposite sides with arms 390, which converge and are joined by a toothed sector 391. Meshing with this sector is a worm 392 that is rotatively mounted in a bracket 393 carried by the deflection bail 308. As the zenith ring turns about the axis 309—309, the sector 391 turns with it, carrying with it the worm 392 and the deflection bail 308, the pin 310 of which applies force to the firing bail 311 by reason of its pivotal connection therewith. In turn, the firing bail 311 applies a force couple to the correction frame 10 through its pivotal connections 312—312 with it, turning the correction frame about its upper and lower pivots 11 and 12. The standards 13, 13 are, of course, turned with the correction frame 10, thus turning the mirrors 15 and 16 about the axis that passes through the pivots 11 and 12. These mirrors are consequently thrown off the target in azimuth, which is noted by both the trainer and the pointer through their respective telescopes, as already set forth.

First considering the trainer's response, the trainer's hand wheel 75 is operated in a direction to bring the mirrors 15 and 16 back on the target. This involves a training operation like that already described, the fine and coarse gun train transmitters being operated to send to the guns directions for movement of the latter in train to compensate for the inaccurate training component introduced by the roll of the ship.

Inasmuch as the guns, in being displaced from the vertical plane which contains the proper line of fire, swing about the center of gravity of the ship, the guns not only acquire an inaccurate component of train, but also one in elevation. This is evident, since the muzzles of the guns move substantially in arcuate paths as the ship rolls, the highest points of which paths are occupied by the gun muzzles when the ship is upright. In other words, the training component of inaccuracy may be regarded as being equal to one-half of the chord which connects the ends of the arcuate path through which the gun muzzle travels during the roll of the ship. The component of inaccuracy in elevation is equal to the height of the geometrical segment formed by the arcuate path of the gun muzzle and the chord that connects the ends of the arcuate path.

It is accordingly plain that merely training the mirrors 15 and 16 in a horizontal plane does not restore the accuracy of the position of the gun when the mirrors again bear on the target. Therefore, the pointer should make a correction in elevation, so that the combined corrections in train and elevation re-establish a correct line of fire from the gun to the target.

In the hereinbefore described manner, the pointer operates his hand wheel 269 to turn the shaft 282 and thus drive the worm 299, thereby moving the gun elevation bail 301. By so doing, the pointer is enabled to make the correction in elevation for the roll of the ship, and as he simultaneously operates the fine and coarse gun elevation transmitters, information is sent to the gun regarding how much to elevate it to make the proper correction.

It is needful, of course, that the pointer shall have means to determine when he has made the proper correction in gun elevation. To this end, an auxiliary optical system is employed, in which there is a mirror 394 that is rigidly mounted on the outer end of the long trunnion 39 of the stabilized outer gimbal ring 37. Associated with the stabilized mirror 394 is a drum dial 395, which turns about the long trunnion 39. The drum dial 395 has been omitted in Fig. 1, since its presence there would obscure other important parts, but it is shown in Fig. 3 in co-operative relation to the stabilized mirror 394, but the drum dial 395 is rotatable in accordance with the roll of the ship.

Consisting of a web and a peripheral flange, the drum dial 395 has a firing line 396 inscribed on the internal face of its flange, as shown in Fig. 3. This firing line 396 is swung in front of and across the face of the stabilized mirror 394 in response to the rolling of the ship, and is opposite the center of this mirror when the ship is at a point in its roll where it desired to fire the gun. At this time, the firing line 396 is reflected into the stabilized mirror 394, the paths of reflection of the extremities of this line being traced by the dot and dash lines 397 and 398.

The firing line 396 is reflected from the stabilized mirror 394, as shown by the lines 397 and 398, to a mirror 399, then to a total reflecting prism 400, thereafter proceeding to a partially reflecting prism 401. Some of the rays of the reflection of the firing line are deflected by the partially reflecting prism 401 to other prisms 402 and 403, lenses 404 and 405, prisms 406 and 407 and prisms 408 and 409 into the tube 22 of the trainer's telescope.

Part of the rays of the reflection of the firing line 396 pass through the partially reflecting prism 401 to be reflected by a mirror 410 back onto the opposite side of the partially reflecting prism 401, which throws the reflection rays, indicated by the lines 397' and 398', to prisms 411 and 412, lenses 413 and 414, prisms 415 and 416 and prisms 417 and 418 into the tube 29 of the pointer's telescope. Thus, both the trainer and pointer are kept posted as to the arrival of the firing point in the roll of the ship.

To the pointer, the displacement of the image of the firing line 396 is a gauge by which he may operate his hand wheel to bring the firing line image into coincidence with the horizontal cross wire of his telescope, whereupon the pointer will have corrected for the elevation inaccuracy due to the roll of the ship. In making such correction, the pointer operates the fine and coarse gun elevation transmitters, sending information to the real gun for elevating it the proper amount to correspondingly correct its position.

When both the trainer and the pointer have made the corrections outlined above, the mimic gun 302 will have been positioned in accordance with the gun train and elevation required for a projectile to reach the target, and the real gun will have been set with corresponding gun train and elevation transmitted from the director.

Occasions are liable to occur when the cross leveller's view of the horizon will be obscured in either of the directions which the mirrors 362 and 363 ordinarily make available to him. Whether this be due to smoke screens, or atmospheric conditions producing such low visibility that the horizon is not discernible, he may at such times call into use an artificial horizon.

As shown in Fig. 1, a plate 419 is mounted on the casing of the gyroscope 45, and has inscribed thereon a mark 420, which is thus stabilized and may serve as the artificial horizon, due to the relation of the gyroscope to the earth.

Referring to Fig. 3, it will be seen that the mark or line 420 is reflected, in the direction of the line 421, to a prism 422, the reflection following the line 421 to a lens 423 through which it passes to mirror 424, going then to the mirror 363, to the lens 370, to the prism 374, and into the tube 375 of the cross leveller's telescope, replacing for the time being the image of the true horizon. When, however, there is no obscurity of vision, and both mirrors are in reflecting positions, both images of the natural horizon and that of the artificial horizon will be visible in the field of view of the cross-leveller's telescope.

As previously set forth, operation of the director by the trainer, pointer and cross leveller, is augmented by the co-operation with the director of the range keeper to take care of certain further considerations that are essential to satisfactory gunnery, when there is relative movement between own ship and the target, since due to the time of flight of the projectile from the gun, the target will have passed from the place of ultimate impact of the shell, unless provision is made to avoid such an occurrence, as explained hereinbefore. The range keeper 126 is combined, in the already described manner, with the director receiving operating power from the latter and compass indications from the ship's compass. The other previously mentioned quantities are received and dispensed by the range keeper 126, enabling the director to be continuously adjusted to changing conditions between own ship and the target.

Referring now to Fig. 5, a typical setting of the dials of the range keeper is shown, the compass dial 157 that is associated with own ship's movements being positioned below the compass dial 158, which is associated with the target's movements. Own ship's dial 425 is rotatable within the compass ring dial 157, and like the latter is graduated in 360° of azimuth. Engraved on own ship's dial is a conventional plan contour of own ship which serves as the pointer 426 that reads against the graduations of the compass ring dial 157 to show own ship's compass course. In Fig. 5, reading from zero of the compass ring 157 to the bow of own ship pointer 426, own ship is seen to have a course of 84° in azimuth which corresponds to what is shown in Fig. 7.

Rotatable within the compass dial 158 is the target dial 427, having a conventional ship outline engraved thereon to represent the target and to serve as the pointer 428. This pointer, reading against the compass ring dial 158 from its zero point, shows the target's course to be 100° in azimuth.

Common to both own ship's and target's dials is the wire pointer 429, which, relative to the ship-shaped pointers 426 and 428, is positioned to represent the line of sight from own ship to the target. The end 429' of the pointer 429, which reads against the compass ring dial 157 from the zero point thereof, shows the target's true bearing, in the illustrated instance, to be 42°. Reading from the zero point of own ship's dial 425 to the end 429' of the pointer 429, the relative target's bearing is shown to be 318°, thereby conforming to the target's bearing shown in Fig. 7. From the zero point of the target dial 427 to the end 429'' of the pointer 429, the measure of the target angle is set off as being 122°.

From these enumerated readings, the relations of own ship and the target are established in the range keeper 126. These relations, though constantly changing, are maintained as own ship and the target sustain relative movement with respect to each other. For this purpose, not only are the respective courses of own ship and the target set up, as already shown, but own ship's speed, as set up on the dial 430 shown in Fig. 5, is introduced into the range keeper, as is the target's speed as set up on the target's speed dial 431.

Relative change of the positions of own ship and the target being accompanied by a change of range between the vessels, the range rate dial 432 shows the range rate, and whether the range is increasing or decreasing. The actual range for the movement is shown by the present range counter 433, but, as previously pointed out, account must be taken of the time of flight of a projectile shot to hit the target. The amount of deflection to offset the change of the target's position in the interval between the firing of the shot and the arrival of the projectile at the place where the target will contemporaneously arrive, is set up on the deflection correction dial 434. This dial also is set in accordance with whether deflection correction is to be made to the left or the right. The range for this advance position will be different from the present range, and the advance range counter 435 is provided to show it. Enough of the range keeper 126 has been again referred to to illustrate a specific example of the various readings that it gives in continuously supplying gunnery information for instant use.

Aboard ship a gun setting for continuous firing cannot be maintained because of the rolling of the craft. Consequently, the practice is to elevate the gun with respect to the deck of the ship at an angle thereto more or less than the angle of the sight depression for the gun, and to depend upon the roll of the ship to supply the angular difference between the gun elevation and the sight depression. The firing switch of the firing mechanism is set to operate when the sum of the angle of gun elevation and the angle formed by the tilt of the deck with the horizontal equals the sight depression. The roll of the ship may, therefore, exceed the angle necessary to supplement the gun elevation, and the firing of the gun still takes place at a point where the inclination of the axis of the bore of the gun has the correct sight depression. On the other hand, the roll of the ship may fall short of the angle required to supplement the gun elevation, whereupon the pointer turns his hand wheel 269 to make up the deficiency by additional gun elevation, which is transmitted to the real gun.

When there is relatively opposite movement between own ship and the target, as when one gains on the other, or there is a change of course, or for some other reason, there will be a change in range, and also one in deflection. First considering the change in range, the range keeper 126 continuously measures the sight depression, so that if the distance between own ship and the target increases or diminishes, the sight depression will show a corresponding increase or diminution, and the sight depression shaft 436 will move accordingly. When it does so, it turns bevel gears 437, shown in Fig. 1, a telescopic universally-jointed drive shaft 438, bevel gears 439, a shaft 440 journalled in the bracket 307 on the mimic gun 302, and the worm 306. The latter correspondingly turns the curved rack 305.

Simultaneously, the shaft 436 turns other bevel gears 441, a shaft 442, bevel gears 443, another shaft 444, other bevel gears 445, a shaft 446 and a bevel gear 447. This bevel gear meshes with the bevel gear 278 that is combined with the member 277 of the differential 273. The differential member 277 accordingly is turned and turns the differential center comprising the spider 274 and bevel gears 275 and 276, the side 272 of the differential remaining stationary since the pointers' hand wheel is held. As the spider 274 turns, it turns the shaft 279 and the spur gear 280 mounted thereon, so turning the gear 281 and the shaft 282, gears 295, the shaft 296, bevel gears 297, the shaft 298 and the worm 299, which through the sector 300 turns the mimic gun bail 301. Thus, the worm 299 acts to change the elevation of the mimic gun 302, in accordance with the changes in range between own ship and the target, while the worm 306 acts to maintain the zenith ring 304 and the firing bail 311 in the fixed position determined by the pointer's actuation of hand wheel 269. Changes in gun elevation are taken off the shaft 282 by the bevel gears 283 and carried by the previously described drive to the gun elevation indicator 294, correspondingly modifying its reading. In addition, these range changes cause modifying measures of gun elevation to be taken off the shaft 282 by other bevel gears 334 and to be carried by the shaft 335 to the fine and coarse gun elevation transmitters 338 and 350, shown in Fig. 2, which transmit to the real gun the measures of change in gun elevation necessary to compensate for the varying distance between own ship and the target.

The deflection which allows for the advance bearing is also affected by changes varying the relationship of own ship and target, and measures of the deflection and its correction in consequence of changing conditions are computed by the range keeper 126 which control mechanism in the director, whereby the shaft 448, shown in Fig. 1, is driven in accordance with such measures of deflection, as already described. Bevel gears 449 transfer the deflection and its corrections to a shaft 450, which sends them onward by bevel gears 451, a shaft 452, other bevel gears 453 and a telescopic universally-jointed drive shaft 454 to the worm 392. The sector 391 in mesh with worm 392 is held stationary through pivots 303, mimic gun 302, mimic gun bail 301 and pivots 301'. The worm 392, therefore, travels around the sector 391 carrying with it the worm bracket 393, deflection bail 308, pin 310, firing bail 311 and pivots 312, thus turning the correction frame 10 about its pivots 11 and 12. In this manner, the mirrors 15 and 16 are thrown off the target by an amount proportional to the deflection and its incidental corrections.

As the correction frame 10 turns, as described, a rack 455 mounted thereon turns a pinion 456, a shaft 457, bevel gears 458, a shaft 459, other bevel gears 460, a shaft 461, bevel gears 462 and a spur pinion 463. This pinion is in mesh with a gear ring 464 that is mounted on the center 465 of a differential 466, and, during the application of measures of deflection and corrections thereof, the differential center 465 turns and effects the turning of a side 467 of the differential 466, the differential side 467 being pinned to a shaft 468.

This shaft relates to measures of the target's bearing, which are taken from the shaft 83 as the trainer operates his hand wheel 75. At such times, the bevel gear 84, shown in Fig. 1 toward the left hand end portion of the shaft 83, not only turns the bevel gear 85 to effect the training of the director, but also turns another bevel gear 469. This turns bevel gears 470, and through a shaft other bevel gears 471, one of which is rotatable with another side 472 of the differential 466.

During the training of the director, as considered apart from training due to deflection, the differential side 472 turns, the differential center 465 remaining stationary, but its gears revolving so as to turn the other side 467 of the differential. The differential side 467 being pinned to the shaft 468, the latter turns, and with it bevel gears 473, a shaft 474, bevel gears 475 and a shaft 476, which carries measures of the target's relative bearing to the range keeper 126. As explained, these measures are modified by the deflection corrections, since the target's bearing is necessarily altered when the line of fire is shifted from the present range to an advanced range.

While the movements of the deflection shaft 448, shown in Fig. 1, are under the control of the range keeper 126, power is supplied to the deflection shaft 448 from the power motor 127 of the director, as previously explained. As shown in Fig. 4, the deflection cam 477, with which the range keeper 126 is provided, operates switch arm 478 in accordance with increasing or decreasing deflection, as the case may be.

If the switch arm 478 engages a contact 479, for example, current will flow from the positive line 138, by conductors 480 and 481 to the switch arm 478, to the contact 479, going by a conductor 482 to the coil of electro-magnet 483 of the deflection clutch 484, and therefrom by conductors 485 and 486 to and through a cut-out switch 487, then proceeding by conductors 191 and 140 to the negative line conductor 141. Hence, the electromagnet 483 attracts a disk-gear 488, carrying it into mesh with a gear train 489 of the deflection clutch, which drives a gear on a shaft 490.

Referring to Fig. 2, the shaft 490 drives through shafts 492, 494, 496, 498, 500 and 502 to turn the bevel gears 503 and the deflection shaft 448 that is under the control of the range keeper 126, as previously explained, in one direction, as for, say, increasing deflection.

Should the deflection be changing oppositely, so as to be decreasing, the switch arm 478, shown in Fig. 4, will respond to the cam 477 to engage the contact 504. Thereupon, current will flow from the positive line conductor 138 by conductors 480 and 481 to the switch arm 478 and the contact 504, proceeding by the conductor 505 to the coil of the other electro-magnet 506, thence going by conductors 507 and 486 to the cut-out switch 487, and by conductors 508, 191 and 140 to the negative line conductor 141.

This circuit causes the electro-magnet 506 to attract the disk-gear 488 and mesh it with a different gear train 509, which drives the shaft 490 in the opposite, i. e., decreasing direction. This, of course, also effects a reversed drive of the deflection shaft 448 that is associated with the range keeper 126, shown in Fig. 1, as well as reversely turning the correction frame 10 and the mirrors 15 and 16. Reversing the previously described drive from the correction frame curved rack 455, the target's relative bearing shaft 476 to the range keeper 126 is also reversely turned.

As the deflection clutch 484, shown in Fig. 2, operates in either direction, the resultant turning of the shaft 490, bevel gears 491, the shaft 492, bevel gears 493, the shaft 494, the clutch 495 and the shaft 496 turns other bevel gears 510, a shaft 511, spur gears 512 and shaft 513, which operates a deflection indicator 514, which shows the existing amount of deflection for the gun.

When, as hereinbefore set forth, the mirrors 15 and 16 are thrown off the target in consequence of the introduction of measures of deflection, the trainer turns his hand wheel 75, shown in Fig. 1 and trains the director in the already described manner to bring the mirrors 15 and 16 back on the target. While the deflection remains the same, there is no movement of the deflection shaft 448 controlled by the range keeper 126, and, hence, none of the correction frame 10. Therefore, the correction frame rack 455 maintains the drive therefrom to the center 465 of the differential 466 stationary.

Under this condition, while the training shaft 83 orients the superstructure of the director about the fixed annular rack 3, the bevel gear 84 on the shaft 83 turns the bevel gear 469. The latter thus effects the turning of the bevel gears 470 and 471 and one side 472 of the differential 466. The gears of the otherwise stationary center 465 of the differential revolve, turning the other differential side 467, and, thus, the shaft 468. As this turning of the shaft 468 is in the direction opposite to that in which it was turned when the deflection was introduced, and to the same extent, the deflection that was added is now subtracted from the shaft 468, whereby the target's bearing shaft 476 will have been turned in accordance with the observed relative target's bearing and carried into the range keeper 126, where it sets the coarse and fine observed target's bearing ring dials 809 and 809', as previously set forth.

Also driven by the shaft 468, shown in Fig. 1, is a pair of bevel gears 515, which turn a shaft 516, that, as shown in Fig. 2, turns bevel gears 517, a shaft 518, other bevel gears 519 and a shaft 520 which turns a rotor 521 of a searchlight transmitter. Fig. 2 shows that the stator 522 of this transmitter is operated in unison with the stator 107 of the coarse transmitter of gun train, by reason of a drive comprising spur gears 523 and 524, a shaft 525, bevel gears 526, a shaft 527, bevel gears 528, a shaft 529 and spur gears 530 and 531. This is for the purpose of introducing parallax corrections as will be hereinafter described. It has been shown that shaft 468 is turned in accordance with observed relative target bearing which is without deflection. Since the rotor 521 of the searchlight transmitter is driven from shaft 468 it is also turned in accordance with observed relative target bearing, which is what is wanted, since it is desired to train the searchlight on the target and not on a place beyond it. In other words, the searchlight is trained without any deflection correction such as is required for the guns.

In Fig. 4, the rotor 521 of the searchlight transmitter is shown to be connected across the alternating current mains 115 and 116 by conductors 532 and 533. Spaced points of the delta winding of the stator 522 of the searchlight train transmitter are connected by conductors 534, 535 and 536 to corresponding points in the stator 537 of a searchlight train receiver, which is located at the place of control of the searchlight. Rotatable within the searchlight receiver stator 537 is a rotor 538, which is connected by conductors 539 and 540 across the alternating current mains 115 and 116. The searchlight train transmitter and receiver act as do the previously described transmitters and receivers, and furnish information for keeping the searchlight beam on the target.

It was previously stated that the range keeper 126 continuously measured the sight depression, which being a function of range changes with the latter as the relation between own ship and the target changes. It was also shown that the sight depression shaft 436 was under the control of the range keeper 126, and served to change the elevation of the mimic gun 302, and to cause information revealing the extent of the changes in gun elevation to be transmitted to the real gun that its elevation might be similarly corrected. The sight depression shaft 436, while controlled by the range keeper 126, is driven from the power motor 127 of the director, shown in Fig. 2. The shaft 128 driven by this motor turns the gears 129 and 223, so turning the shaft 224, which, in one direction, enters the sight depression clutch 541. In this clutch, as shown in Fig. 4, the disk-gear 542 is mounted on the shaft 224, and is responsive to assume positions in accordance with the operation of the range keeper 126, as explained hereinbefore. In Fig. 4, the cam 543 of the range keeper mechanism turns in response to changes in sight depression, which corresponds to the range elevation for the gun. The cam 543 moves the switch arm 544 either for increasing or decreasing sight depression. Moved in one direction the switch arm 544 engages the contact 545, say in response to increasing sight depression.

Thereupon, current flows from the positive line conductor 138, by conductors 480 and 481 to the switch arm 544 and the contact 545, continuing by the conductor 546 to the electromagnet 547, from which it goes by conductors 548 and 549 to and through the cut-out switch 550, proceeding therefrom by conductors 551, 191 and 140 to the negative line conductor 141. As a result, the disk-gear 542 is thrown into mesh with the gear train 552, which drives a gear on the shaft 553.

As shown in Fig. 2, the shaft 553 turns bevel gears 554, and thus other bevel gears 555. The latter drive the shaft 556, bevel gears 557, the shaft 558, the clutch 559, another shaft 560, bevel gears 561, the shaft 562, other bevel gears 563, the shaft 564, bevel gears 565, another shaft 566 and bevel gears 567, which turn the sight depression shaft 436 to perform its already described duties in accordance with increasing range.

If the range is decreasing, the cam 543, shown in Fig. 4, swings the switch arm 544 to engage the contact 568, whereupon current flows from the positive line conductor 138, by conductors 480 and 481 to the switch arm 544 and the contact 568, whence it goes by the conductor 569 to another electro-magnet 570 of the range elevation clutch, the current going from here by conductors 571 and 549 to the range elevation clutch cut-out switch 550, proceeding therefrom by conductors 551, 191 and 140 to the negative line conductor 141. When this circuit is established, the disk-gear 542 of the sight depression clutch is thrown into mesh with the other gear train 572, which turns the shaft 553 in a direction opposite to that caused by the other described circuit through the sight depression clutch. Hence, the sight depression shaft is turned in a direction corresponding to decreasing range, and the mimic gun 302 and the real gun have their elevations affected accordingly.

Recognition is taken of the possibility of injury to the range keeper during a conflict, and provision is made for manually supplying to the director quantities which ordinarily are supplied to it automatically by the range keeper. Assuming that the range keeper is so injured that it cannot supply measures of sight depression to the director, a member of the director crew grasps and thrusts inward an emergency sight depression input handle 573, shown in Fig. 2. This handle is on a shaft 574 on which a spur gear 575 is rigidly mounted, the inward thrust carrying the gear 575 into mesh with another spur gear 576, with which the gear 575 is normally out of engagement.

After the meshing of gears 575 and 576, the sight depression handle 573 is turned, whereby the gear 576 turns a shaft 577 and a bevel pinion 578 thereon. The latter turns a bevel gear 579 and a shaft 580, a pinion 581 fixed thereon driving a gear 582 and a range drum 583 both being mounted rigidly on a common shaft.

Turning with the shaft 580 is a range screw 584, a travelling nut 585 being threaded thereon and movable longitudinally thereof. Carried by this travelling nut is an indicator arm 586 having a window 587 therein. The range drum 583 has a series of range values arranged helically over its convex surface, and the rotation of the range drum 583 brings successive range values under the window 587 of the indicator arm 586, while the travelling nut 585 shifts the indicator arm 586 to succeeding convolutions of the series of range values.

Inasmuch as sight depression is a function of range, proportionate measures of the former may be gauged by the range values set up under the window 587 of the indicator arm 586, and the emergency input sight depression handle 573 may be turned accordingly. As the shaft 577 then turns responsively, to operate the range drum it also turns a spur gear 588, which turns another spur gear 589 and the shaft 560. From here the drive is the same as the power drive to the sight depression shaft 436, shown in Fig. 1.

When the emergency sight depression handle 573 is thrust inward, it opens the sight depression cut-out switch 550, and, as is clear from Fig. 4, the circuit through either of the electro-magnets 547 and 570 is interrupted. Therefore, the disk-gear 542 of the sight depression clutch is not attracted by either magnet and is out of mesh with both of its associated gear trains. Consequently, there is no conflicting manual and power operations of the sight depression drive.

Moreover, the inward thrust of the sight depression handle 573, shown in Fig. 2, causes the gear 575 to rock a pivoted lever 590, which is connected by a rod 591 to another pivoted lever 592, thus separating the driving members of the sight depression clutch 559. This prevents any power operation of the sight depression drive while the manual emergency input is taking place, if the sight depression electro-magnetic clutch 541 should accidentally fail to be rendered ineffective.

Similarly, an emergency input of deflection is possible by thrusting inward an emergency deflection handle 593, shown in Fig. 2. A shaft 594 to which this handle is secured also carries a bevel gear 595 normally out of engagement with another bevel gear 596, but adapted to be thrown into mesh therewith when the deflection handle 593 is pushed in. When the bevel gears 595 and 596 are in mesh, the apices of their theoretical pitch cones are coincident, and the gear 596 turns the shaft 496. This effects the turning of the bevel gears 497, and the already described drive therefrom to the deflection shaft 448 that is shown in Fig. 1 to go to the range keeper 126. Also, the inward thrust of the emergency deflection handle 573, shown in Fig. 2, results in the bevel gear 595 pushing against and turning a pivoted bell-crank lever 598, which opens the deflection cut-out switch 487 and operates a rod 599. This rod turns another pivoted lever 600 to separate the driving members of the deflection clutch 495. Thus, the power drive is suspended through both the electro-magnetic deflection clutch 484 and the clutch 495, when there is an emergency input of deflection through the use of handle 593.

There is also an emergency compass input handle 601, shown in Fig. 2, which may be pushed inward, so that its shaft 602 will throw a bevel gear 603 carried by it into mesh with another bevel gear 604 on the shaft 246. In using the emergency compass input handle 601, its inward thrust actuates a lever 605, which through a connecting rod 606 operates another lever 607 to separate the driving members of the compass clutch 245. A simultaneous action of the lever 605 opens the emergency compass cut-out switch 190, thus eliminating the power drive through both the electro-magnetic compass clutch 193 and the mechanical compass clutch 245.

Consideration is given to parallax in connection with the use of the director, since there are a variety of conditions into which it enters, depending upon the director installations aboard any particular ship. For example, a plurality of directors may be employed at different stations aboard a ship, and the control of the guns may be divided between them, one of the director stations being regarded as a reference point. In such an installation, any director located materially away from the reference point will need a correction for parallax, and the varying parallax corrections for differently positioned guns may be furnished the individual guns in any suitable manner, and be incorporated in the train thereof.

Parallax corrections for the guns may be furnished directly thereto by the director at the reference point, this being particularly suitable in connection with the guns of primary batteries which guns are mounted in turrets, those of each turret being operable as a group in a unitary manner.

It is evident from what has been said that the director is suited to various installations, being provided with means for eliminating error due to parallax which means are adaptable to conditions varying in accordance with the particular form of fire control in use on a given ship.

Parallax mechanism is shown in Fig. 2, and includes a range carriage 608 mounted to move between its guide rails 609 and 610, the range carriage having a lug 611 through which is threaded a range screw 612. The latter has a spiral gear 613 affixed to its upper end, and is driven by another spiral gear 614 on the end of a shaft 615. This shaft is turned by a handle 616, and is provided with a worm 617, which meshes with a worm gear 618 that turns with a range drum 619, which is mounted on a shaft 620.

The parallax range drum is like the emergency range drum 583, and comprises the drum proper 619, which has helically distributed range values thereon, a spur gear 621 meshing with another spur gear 622 on a range screw 623, a travelling nut 624 and an indicator arm 625, having a window 626 through which to observe the critical range value.

Projecting rearwardly from the range carriage 608 is a pin 627, shown in dotted lines, which enters a slot 628 in the upper portion of a parallax compensation arm 629, and serves as a fulcrum therefor. The lower end of the parallax compensation arm 629 is bifurcated and embraces a pin 630, which projects from an angle of train carriage 631, which is guided by rails 632 and 633. On and affixed to the opposite side of the angle of train carriage 631 are a pair of juxtaposed members 634 and 635 which form a groove in which a pin 636 may travel. The pin 636 projects from a bevel gear 637 of relatively large diameter, which turns about a center 638, and is driven by a pinion 639 on a shaft 640. The latter is driven by bevel gears 641, which are turned by a shaft 642 that is driven by bevel gears 643. One of these bevel gears 643 is fixed on the shaft 102 that is driven through the bevel gears 103 and the shaft 104 from the rotor 105 of the coarse gun train transmitter.

As the parallax angle is the angular space between the line of sight from a director to a target and the line of fire from a somewhat remote gun to the target, or the angle between lines of sight from spaced directors to a target, it is clear that this angle changes in response to changes in range and azimuth due to changes in the relative positions of own ship and the target. It has now been shown how these changes, which bring about changes in the parallax angle, are introduced into the parallax mechanism by the maintenance therein of the range and train values, the positioning of the range carriage 608 and the angle of train carriage 631 resulting in the positioning the parallax compensation arm 629 in accordance with changes in horizontal parallax.

On own ship, the distance between the director at the reference point and the real gun or between spaced directors, constitutes the base line of the parallax angle, and is, of course, a fixed dimension since the director and gun stations remain fixed with respect to each other. There is a representation of the base line in the parallax mechanism, and it is the fixed radial distance between the center 638 of the large bevel gear 637 and the center 636' of the pin 636 carried by this same bevel gear.

With the positioning of the parallax compensation arm 629 by the range carriage 608 and the angle of train carriage 631 the upper slotted end of the parallax compensation arm 629 shifts a pin 644 that is mounted on a parallax angle correction carriage 645. The movement of this carriage is proportional to the parallax correction, and is in accordance with the following formula:

$$P = \sin^{-1}\left(\frac{B \sin \alpha}{R}\right)$$

which applies to such conditions as are shown in the diagram of Fig. 8, in connection with which let R=range in yards
B=base length in yards
P=parallax angle
T=target
O=reference point
α=bearing of target from the base line B
OD=side opposite the parallax angle Then, OD=R sin P
OD=B sin (180°−α), but
Sin (180°−α)=sin α, if α is less than 180° or greater than 90° therefore, $$OD = B \sin \alpha$$
$$R \sin P = OD = B \sin \alpha$$
$$R \sin P = B \sin \alpha$$
$$\sin P = \frac{B \sin \alpha}{R}$$
$$P = \sin^{-1}\left(\frac{B \sin \alpha}{R}\right)$$

Reference to Fig. 8 makes it evident that, as the target changes its position relative to own ship, the value of the train angle α varies, and it has been shown that the angle of train carriage 631, depicted in Fig. 2, is shifted proportionately to such variances in the train angle. Moreover, changes in the train angle are accompanied by changes in range, as will be appreciated by further consideration of Fig. 8, and it may be seen from Fig. 2 that accurate measures of range are introduced, as hereinbefore set forth, to position the range carriage 608 in accordance with the conditions shown in Fig. 8, or for any other instant.

Inasmuch as the parallax angle, as illustrated in Fig. 8, is a resultant of the train angle and the range, it is clear that the parallax compensation arm 629, shown in Fig. 2 and which is under the control of the train angle and the range carriages, assumes a position which is the resultant of the values of the train angle and the range, as accurately introduced into the parallax mechanism in the manner previously described. Thus, a measure of the horizontal parallax angle, as shown by way of example in Fig. 8, is effected by the movement of the parallax correction carriage 645, and, since the movement of this carriage is a measure of parallax angle P in the geographical triangulation, it is in accordance with the formula $$P = \sin^{-1}\left(\frac{B \sin \alpha}{R}\right)$$

A rack 646 is mounted on the back of the parallax angle correction carriage 645 and turns a gear 647 in mesh with it, so turning a shaft 648, bevel gears 649, a shaft 650, bevel gears 651, another shaft 652 and a spur gear 653, which turns a gear 654 mounted on the stator 106 of the fine train transmitter. The gear 654 also operates a gear train 655 to turn the gear 523 that turns with the stator 107 of the coarse train transmitter. Thus, the movement of stators of the transmitters relative to their rotors transmits the measure of the parallax angle to the guns, or to another director, as the case may be, whereby such guns or director may have their train corrected for horizontal parallax.

At the same time, the gear 523, shown in Fig. 2, effects a drive through the gear 524, the shaft 525, the bevel gears 526, the shaft 527, the bevel gear 528, the shaft 529 and the gears 530 and 531 to turn the stator 522 of the searchlight train transmitter, whereby this transmitter also transmits the parallax correction to the searchlight for the correction of its train.

From the foregoing it is clear that the invention provides fire control apparatus which includes a director and a computing instrument in combination therewith, the computing instrument deriving its operating power from a source that is common both to the director and itself, though separate applications of power for each instrument is feasible, if desired. It has been shown that the computing instrument may be in the nature of a range keeper, wherein the courses of own ship and a target may be constantly kept track of, as well as the relative bearing of the target from own ship, compass information being received by the director and introduced thereby into the range keeper. Means have been revealed for showing the target's true bearing also. Own ship's and the target's speeds have been shown to be taken account of, as affecting the relative positions of the opposing craft, and not only have means been provided for setting up the present range, but the rate of change of range due to movements of own ship and the target, is computed and utilized in the creation of generated range, the target's bearing being also generated. Observed target's bearing has been shown to be determined by the director, and sent therefrom to the range keeper where the generated bearing is compared with it for the detection and elimination of error in the generated bearing. The effect of the elapse of time, as for the time of flight of the projectile, has been shown to be reckoned in the range keeper, which determines the target's deflection, including corrections due to drift, spotting, etc. Such measures of deflection, it has been made clear, are carried into the director for utilization therein. The target's deflection modifies the range, and the range keeper computes the advance range, as hereinbefore demonstrated, and sight depression is determined by the range keeper and made use of in connection with the mimic gun of the director, as well as in the transmission of gun elevation from the director to the real gun.

It is furthermore evident that the invention also provides a director which is capable of being operated so that optical manifestations permit of actuations, whereby measurements required for gun-setting are obtainable and may be transmitted to gun stations and other places where such information is desirable. Moreover, due to the use of optics and appropriate operating means, the present invention permits the various members of the crew attending the director to conduct their individual operating without physical resistance resulting from operating by another of the attendants. Provision is made to allow for and transmit information to the guns concerning allowance for advance range, at the same time furnishing the present bearing to the searchlight operators, thus permitting the searchlights to remain on the target as it progresses toward the place where the projectiles are to meet it. Corrections, including that for parallax resulting from the difference in positions of the director and the guns, or between stations, as well as corrections for subsequent or continuous change of position of the target, are introduced into the director during its normal operation. The fire control apparatus is readily adaptable to the usual conditions which develop during a conflict and it is, of course, to be understood that the invention may be practiced in various forms other than that illustrated, without departing from the spirit of the invention as defined in the appended claims.

I claim:

1. A director comprising a rotatable sighting device having a deflectible optical element, a mimic gun having trunnion pivots rigid thereon, an operative connection between said gun trunnion pivots and optical element, and cross-levelling means operable to displace said trunnion pivots whereby the latter actuate said connection and optical element.

2. A director comprising a rotatable sighting device having a deflectible optical element, a mimic gun having trunnion pivots rigid thereon, an operative connection between said gun trunnion pivots and optical element, means to position said gun in elevation, means to modify the position of said gun in accordance with sight depression and cross-levelling means operable to displace said trunnion pivots whereby the latter actuate said connection and optical element.

3. A director comprising a rotatable sighting device, an assemblage of interconnected parts including a mimic gun, means to train and elevate said gun, a firing switch adjustable with respect to the desired point of firing of a gun, cross levelling means operable to displace some parts of said assemblage with respect to other parts thereof to actuate said assemblage proportionately to required corrections in train and elevation, and an adjusting connection between said assemblage and said switch, said assemblage being angularly displaceable in rigid combination in response to changes in the elevation of said mimic gun to adjustably actuate said connection.

4. A director comprising a rotatable sighting device having a deflectible optical element, a deflectible frame mounting said optical element, an adjustable firing switch, and an assemblage of interconnected parts including a mimic gun pivoted one to another, some of said parts being displaceable relatively to others thereof to deflect said frame, said assemblage being angularly displaceable in rigid combination in response to changes in elevation of said mimic gun to adjust said switch.

5. A director comprising a rotatable sighting device having an optical part adjustable in azimuth, means to stabilize the field of view of said sighting device in elevation, an assemblage of mutually responsive parts including a mimic gun, mechanism to train and elevate said gun, target deflection predicting means, an operating connection therefrom to said assemblage to displace the latter and said optical part, and cross-levelling means for actuating said assemblage.

6. A director comprising a rotatable sighting device adjustable in azimuth, pivotally mounted mutually co-acting parts including a mimic gun, an operative connection between said co-acting parts and sighting device, differential means, means coacting therewith for setting the mimic gun in accordance with gun elevation, and means operable in accordance with variable sight depression coacting with said differential means for altering the elevation of said mimic gun proportionately to changes in sight depression.

7. In a director, a revoluble support having a training axis, an optical sighting device rotatable about said axis and adjustable in azimuth with respect to said support, an assemblage of interconnected frames controllingly connected thereto and including a mimic gun, elevating means therefor, training mechanism for said mimic gun, a train indicator operable thereby, and cross-levelling means operable to actuate said assemblage including the mimic gun thereof.

8. In a director, a revoluble support having a training axis, an optical sighting device rotatable about said axis and adjustable in azimuth with respect to said support, an assemblage of interconnected frames controllingly connected thereto and including a mimic gun, elevating mechanism for the latter, an elevation indicator operable thereby, and cross-levelling means operable to actuate said assemblage including the mimic gun thereof.

9. In a director, a revoluble support having a training axis, optical sighting means rotatable about said axis and having an independently operable optical element adjustable in azimuth with respect to said support, auxiliary optical means co-acting with said sighting means to indicate required correction in gun elevation, means movable in proportion to measures of train and elevation respectively operable to adjust said optical element and in accordance with the indicated gun elevation correction, and cross-leveling means operable to determine the extent of the adjustment of said independently operable optical element.

10. In a director, a revoluble support having a training axis, optical sighting means rotatable about said axis and having an independently operable optical element adjustable in azimuth with respect to said support, auxiliary optical means co-acting with said sighting means to indicate required correction in gun elevation, members adapted to be positioned in accordance with gun train and gun elevation to respectively adjust said optical element and in accordance with the indicated gun elevation correction, means movable in measures of sight depression and target's deflection to alter the position of said members, and cross-levelling mechanism adapted to actuate said adjustable optical element.

11. In a director adapted to oscillate, a rotatable sighting device adjustable in azimuth, a stabilizer, an element maintained substantially fixed in space thereby against rotative movement in the direction of the line of gun fire and having a point thereon representative of a gun-firing point in the oscillation of the director, a cooperating element movable with the director in the direction of the line of gun-fire provided with an index movable before the face of the first named element, pivoted interconnected members adjustable in accordance with the elevation for a gun and connected to said co-operating element to correspondingly adjust the same, whereby when the index of said second element moves opposite said point of said first element the proper gun-firing point is indicated, cross-leveling means operable to adjust said members and sighting device, and means to train said director.

12. In a director adapted to oscillate, a rotatable sighting device adjustable in train, pivoted interconnected members connected to said sighting device and including a mimic gun pivotally mounted on one of said members about a gun trunnion simulating axis, training mechanism operable to train said sighting device and mimic gun, cross-levelling means manually operable to displace said members and mimic gun to adjust said sighting device to require training, and an electrical transmission system operable synchronously with said training mechanism.

13. In a director adapted to oscillate, a rotatable sighting device adjustable in train, pivoted interconnected members including a mimic gun and a sight-adjusting member connected to said sighting device, cross-levelling means adapted to actuate said interconnected members to operate said adjusting member to adjust said sighting device to require training for a cross-levelling correction, deflection-predicting mechanism operable to displace said sight-adjusting member and sighting device, training mechanism for said sighting device and mimic gun, differential means comprising a portion operable by said training mechanism, another portion responsive to said sight-adjusting member to subtract the deflection displacement from the aggregate displacement of the sighting device to cause the line of sight to bear on a target and an ultimately actuated portion displaceable in accordance with the resultant value effected by the said subtraction, and an electrical transmission system controlled by the last named portion of said differential means.

14. In a director for use on a craft adapted to oscillate, a main frame rotatable about a training axis, adjustable optical systems carried by said frame and adapted to be trained on a distant object, another adjustable optical system mounted on said frame adapted to be trained on a distant point at an angle to the object and adjustable about a line of sight to the object proportionately to the oscillation of the craft, an adjusting frame for the first named optical systems and a cross-levelling bail both being directly pivotally mounted on the first named frame, an operating connection between the second named frame and said bail, and operating mechanism connected to the last named optical system and to said bail for adjusting the former and actuating the latter simultaneously.

15. In a director for use on a craft adapted to oscillate, optical systems mounted to be respectively trained on a distant object and on a distant point at an angle to the object, indicators each associated with one of said systems and comprising relatively displaceable co-acting elements one of which has a reference indication and the other being a reflector, one of said elements being displaceable with the craft as it oscillates, stabilizing means substantially fixedly positioning the other of said co-acting elements, and other optical systems each correlated to a different one of the first named optical systems to project the reference indication of the indicator associated therewith into the field of vision thereof.

16. In a director for use on a craft adapted to oscillate, training, elevational and cross-levelling optical systems each of which is provided with an adjustable initial view-receiving optical element, connections between said initial optical elements operable by corrective adjustment of the last-named system to disturb the adjustment of said other systems proportionately to the oscillation of the craft, and means to restore the adjustment of the last-named systems adapted to measure the disturbances thereof.

17. In a director for use on a craft adapted to oscillate, adjustable training, elevational and cross-levelling optical systems, connections therebetween operable by corrective adjustment of the last named system to disturb the adjustment of said other systems proportionately to the oscillation of the craft, another optical system including co-acting mutually referred elements respectively partaking of and restrained from participation in the oscillation of the craft, whereby the system is automatically adjustable in response to oscillation of the craft in a direction at an angle to the other mentioned oscillation and arranged to form an optical manifestation of its automatic adjustment in the elevational optical system, and means to measuringly restore the adjustment of the training and elevational optical systems.

18. In a director for use on a craft adapted to oscillate, a mimic gun having trunnions rigid therewith, a frame in which said trunnions are pivoted, said frame being adjustably connected to said mimic gun but adapted to be tilted therewith in elevation, a second frame mounted to tilt with said first frame, a member connected to said second frame to be tilted thereby, a firing mechanism, a connection between said member and firing mechanism, an adjustable training optical system, adjusting means therefor, an optical system operable in response to and in accordance with the oscillation of the craft about the trunnion axis of the mimic gun, an adjusting connection from the last named optical system combined with the first named frame, said member and adjusting means to adjust said training optical system from the second named optical system, train-measuring operating means for said training optical system, and elevating means for said mimic gun operable in accordance with the oscillation of the craft about the mimic gun trunnion axis and to measure the elevation of said gun, said firing mechanism being adjustable in accordance with the elevation of the mimic gun.

19. In a director for use on a craft adapted to oscillate, a mimic gun having a trunnion axis, training means therefor, an optical system adapted to be trained and responsive to said means, a reference device provided with an indication of a firing point for a gun, said device being operable in response to and in accordance with the oscillation of the craft about said trunnion axis, another optical system provided with a stabilized optical element with which said reference device co-operates to form therein a moving image of said firing point indication, the last named optical system reflecting said image into said trainable optical system, a cross-levelling optical system, operating means therefor adapted to disturb said trainable optical system, and elevating means for said mimic gun adapted to be regulated in accordance with the actuation of the second named optical system.

20. In a director for use on a craft adapted to oscillate, a mimic gun having a trunnion axis, training means therefor, a training optical system responsive to said means, a gyroscopic control effective to stabilize an image of a distant object in the field of view of said optical system, an optical system including mutually referred parts respectively under said gyroscopic control and movable in accordance with oscillation of the craft about said trunnion axis, and means adjustable proportionately to the oscillation of the craft about the line of sight of said training optical system adapted to afford measures of correction for the last-named oscillation.

21. In a director for use on a craft adapted to oscillate, training and elevational optical systems mounted to be trained on a distant object, training means for said systems, a gyroscopic control effective to stabilize the image of the distant object in the fields of view of said optical systems, reference means responsive to oscillation of the craft, and an optical system comprising an optical element under said gyroscopic control and other optical elements responsive to oscillation of the craft adapted to project an optical manifestation thereof into the elevational optical system.

22. In a director for use on a craft adapted to oscillate, training and elevational optical sighting systems each having optical parts normally in set correlation and an optical part mounted for independent correctional movement, a cross-levelling optical system having an optical part adjustable perpendicularly to a line of sight to a distant object and another optical part restrained to oscillate with the craft in the same direction, a connection between the adjustable part of the cross-levelling optical system and said other optical systems operable to displace said correctional optical parts thereof, means to correctively actuate said parts, and measuring means operable to evaluate such actuations.

23. In a director for use on a craft adapted to oscillate, a sighting optical system having an adjustable optical part mounted for correctional movement about a training axis, a gyroscopic control for controlling said optical part about an axis perpendicular to said first axis, means to adjust the said optical part about the second named axis independently of its gyroscopic control, and mechanism to correctively actuate said optical part in accordance with an oscillation of the craft.

24. In a director for use on a craft adapted to oscillate and vary in position relatively to an object, a mimic gun, a firing mechanism for a gun of which the mimic gun is representative, a connection between said mimic gun and firing mechanism operable to adjust the latter, means for initially setting the elevation of the mimic gun, and a supplementary setting means operable in accordance with sight depression to actuate said connection for operating said firing mechanism at a point in the oscillation of the craft different from that at which the firing mechanism would be operated in consequence of the initial elevational setting of the mimic gun as the distance between it and the object changes.

25. In a director for use on a craft adapted to vary its position relatively to a target, a support mounted to be trained, training mechanism therefor, a frame movable with said support but independently deflectible about the training axis thereof, a sighting optical system comprising certain optical parts carried on said support for movement therewith about its training axis and an optical part mounted on and deflectible with said frame, a second frame pivotally mounted in said first frame, means operable in accordance with the target's deflection to displace said frames and deflect said last named optical part from the target, said training mechanism being operable to restore the bearing of said optical system on the target, and means responsive to the training system to indicate the algebraic sum of the target's bearing and deflection.

26. In a director for use on a craft adapted to oscillate and vary in position relatively to a target, a mimic gun, a gun-firing mechanism, a connection between said mimic gun and firing mechanism operable to adjust the latter, means to initially set the elevation of the mimic gun, supplementary setting means for the latter operable in accordance with sight depression to actuate said connection for operating said firing mechanism at a point in the oscillation of the craft different from that at which it would be operated in consequence of the initial elevational setting of the mimic gun, a sighting optical system, a rotatable supporting structure mounting the aforesaid elements in cooperative relation and for mutual displacement in train, training means therefor operable to cause said system to bear on the target, and auxiliary training mechanism for algebraically adding the target's predicted deflection to the train of said optical system, said training means being operable to subtract the deflection from the train of the optical system.

27. In a director for use on a craft adapted to vary in position relatively to a target, a rotary sighting optical system having an adjustable optical element, training mechanism operable to train said system on the target, means operable in measures of predicted target's deflection to throw said optical element off the target, and a connection between said training mechanism and optical element including a differential having a member movable concurrently with said optical element, said differential permitting reversed training of said optical system equal to the predicted deflection said differential member being maintained free from movement during such reversed training corresponding to measures of the target's deflection.

28. In a director for use on a craft adapted to vary in position relatively to a target, a rotary sighting optical system having an adjustable optical element, searchlight train measuring means, a differential, a connection between the same and said optical element, training mechanism operable to train said system on the target and operate said searchlight train measuring means through said differential, and target's deflection predicting means operable to displace said optical element and add the target's predicted deflection to the searchlight train, said training mechanism being reversely operable to train said optical element on the target and to subtract the target's predicted deflection from the searchlight train.

29. In a director for use on a craft adapted to vary in position relatively to a target, a rotary sighting optical system having an adjustable optical element, a differential, a connection between the same and said optical element, training mechanism adapted to train said optical system, target's deflection predicting means adapted to displace said optical element and actuate said differential, and a drive controlled by said differential to operate in accordance with the target's true bearing.

30. In a director for use on a craft adapted to oscillate, a sighting optical system having an adjustable element, a mimic gun, a mimic gun trunnion frame therefor, said gun and frame being adjustable in conformity to gun elevation, a displaceable member connected to the mimic gun and having a normally vertical axis, an extension from said member, a connection between said extension and optical element, and means adapted to be operated in accordance with the oscillation of the craft to position said member with said axis in a plane that is directed toward the zenith of the heavens and to deflect said optical element.

31. In a director for use on a craft adapted to oscillate, a sighting optical system having an adjustable optical element, a displaceable member having an axis adapted to be positioned in correspondence to gun elevation and a second axis permanently perpendicular thereto, a connection between said member and optical element, and means operable in accordance with the oscillation of the craft to position said member with its second-named axis in a plane directed toward the zenith of the heavens and its first named axis in a horizontal plane and to deflect said optical element.

32. In a director for use on a craft adapted to oscillate, a sighting optical system having an individually adjustable optical element, another optical system having an individually adjustable optical element, a displaceable member having an axis adapted to be positioned in accordance with gun elevation and a second axis permanently perpendicular thereto, means operable to maintain the adjustable optical element of the second mentioned optical system directed on a point of reference while the craft oscillates and to simultaneously position said second axis of said member in a plane directed toward the zenith of the heavens and its first named axis in a horizontal plane, and a connection between said member and the first-mentioned optical element effecting concomitant deflection of the latter.

33. In a director for use on a craft adapted to oscillate, an adjustable sighting optical system, another optical system having substitutional adjustable reversing optical elements shiftable laterally of the line of sight of the last named optical system, selective means therefor operable to laterally shift said elements to substitute one of said reversing elements for another thereof, mechanism adapted to be positioned in accordance with gun elevation and connected with the first-mentioned optical system, and actuating means operable in accordance with the oscillation of the craft to maintain the selected optical element of the second-mentioned optical system directed on a point of reference with a concomitant actuation of said mechanism to effect an adjustment of the first-mentioned optical system.

34. In a director for use on a craft adapted to oscillate, trainer's and pointer's sighting optical systems having independently adjustable optical elements, a rigid support movable about a training axis, a correction frame pivoted to said support to be deflected independently thereof about the same training axis, a cross-leveller's sighting optical system having an independently adjustable optical element, said support mounting the adjustable optical element of the third mentioned optical system and said frame mounting the adjustable elements of said first two optical systems, a plurality of adjustable members, means for setting the same in accordance with gun elevation, cross-levelling mechanism operable to maintain the adjustable optical element of the cross-leveller's optical system directed on a point of reference and to simultaneously actuate said independently adjustable members in accordance with the oscillation of the craft, an operating connection between said adjustable members and the independently adjustable optical elements of the first two mentioned optical systems, and means to measure corrections for deflections thereof.

35. In a director for use on a craft adapted to oscillate, trainer's, pointer's and cross-leveller's sighting optical systems each having an independently adjustable optical element, frames pivoted one to the other on a single training axis to turn thereabout, one being adjustable independently of the other, the independently adjustable elements of the first two systems being carried by one frame and that of the cross-leveller's system being carried by said other frame, a plurality of interconnected adjustable members, independently operable means for positioning the same in accordance with gun train and gun elevation, mechanism operable to maintain the adjustable optical element of the cross-leveller's optical system directed on a point of reference and to simultaneously actuate said interconnected members in accordance with the oscillation of the craft, and an operating connection between said members and the adjustable optical elements of the first two mentioned optical systems.

36. In a director for use on a craft adapted to oscillate, trainer's, pointer's and cross-leveller's sighting optical systems each having an independently adjustable optical element, a plurality of interconnected adjustable members one of which is a mimic gun, independently operable means for positioning said members in accordance with gun train and gun elevation, means for algebraically adding measures of a target's deflection and sight depression thereto, said means altering the position of one of said members to deflect the adjustable optical elements of said trainer's and pointer's optical systems and changing the position of said mimic gun, mechanism to maintain said cross-leveller's adjustable optical element directed on a point of reference and to simultaneously actuate said interconnected members in accordance with the oscillation of the craft, and an operating connection between said members and the adjustable optical elements of the first two mentioned optical systems.

37. In a director for use on a craft adapted to oscillate, trainer's, pointer's, cross-leveller's and auxiliary optical systems the first two mentioned systems having adjustable optical elements, a gyroscope, a connection between the same and said elements to stabilize the fields of view of said first two optical systems, a firing mechanism, and a firing point indicator oscillatory with the craft, said auxiliary optical system having an optical element stabilized by said gyroscope and co-acting with said indicator to give an indication of the firing point, said auxiliary optical system projecting the reflection of said firing point indication into the pointer's optical system.

38. In a director for use on a craft adapted to oscillate, adjustable trainer's, pointer's, cross-leveller's and auxiliary optical systems, a firing point indicator adapted to partake of the oscillation of the craft, a gyroscope effecting the stabilization of the fields of view of the first two mentioned optical systems and a part of the auxiliary optical system which co-acts with said firing point indicator to give an indication of the firing point, said auxiliary system reflecting said indication into the pointer's optical system, means for training said optical systems, and mechanism operable to adjust the trainer's and pointer's optical systems in accordance with the adjustment of the cross-leveller's optical system to a point of reference as the craft oscillates at an angle to the other mentioned oscillation.

39. In a director for use on a craft adapted to oscillate, a frame rotatable about a training axis, a correction frame mounted thereon for pivoting on said training axis and capable of angular displacement about that axis independently of the rotation of said first named frame, trainer's and pointer's sighting optical systems having optical elements mounted on said correction frame for movement independently of the other optical elements of said systems, a gyroscope carried by said correction frame, a connection between said gyroscope and optical elements adapted to turn the latter through an angle equal to one-half that of the oscillation of the craft, and means to turn said correction frame in accordance with measures of gun elevation.

40. In a director for use on a craft adapted to oscillate, a frame rotatable about a training axis, a correction frame pivoted about the same axis for angular displacement independently of the rotation of said first named frame, a pivoted member adapted to be positioned in accordance with measures of gun elevation, an assemblage of parts responsive to movement of said member and operatingly connected to said correction frame, trainer's and pointer's sighting optical systems partly mounted directly on said rotatable frame and having optical elements carried directly by said correction frame for angular displacement independently of the other optical elements of said systems, and means to train said rotatable frame and optical systems.

41. In a director for use on a craft adapted to oscillate, a frame rotatable about a training axis, a correction frame pivoted to said first named frame on said axis for angular displacement about said axis independently of said first named frame, a pivoted member adapted to have an initial position and to be positioned in accordance with measures of gun elevation, an assemblage of parts responsive to movement of said member and operatingly connected to said correction frame, means actuated proportionately to measures of sight depression operable to modify the gun-elevation-representing position of said member, means to displace said member proportionately to the cross roll of the craft when said member has other than its initial position, trainer's and pointer's sighting optical systems carried in part directly by said first named frame and having adjustable optical elements carried directly by said correction frame, and means to train said rotatable frame and optical systems.

42. In a director for use on a craft adapted to oscillate, a frame rotatable about a training axis, a correction frame pivoted thereto on said axis, a member pivoted with respect to said rotatable frame, means for positioning said member in accordance with measures of gun elevation, an assemblage of parts responsive to movement of said member and connected to said correction frame to effect a turning thereof, a sighting optical system partly mounted directly on said first named frame and having an optical element carried directly by said correction frame, training mechanism for said frames and optical system, and means operable in accordance with the oscillation of the craft about the line of sight of said optical system adapted to displace said assemblage of parts and said correction frame.

43. In a director for use on a craft adapted to oscillate, a rotatable frame, a correction frame pivoted thereto, a member pivoted to said rotatable frame, means for positioning said member in accordance with measures of gun elevation, other displacing means for said member adapted to modify its position in conformity to changes in sight depression, an assemblage of parts responsive to said member and adapted to turn said correction frame, a sighting optical system having an optical element carried by said correction frame, training mechanism for said frames and optical system, and cross-levelling means operable to displace said assemblage of parts.

44. In a director for use on a craft adapted to oscillate, a main frame, a correction frame pivoted thereto, a member pivoted to said main frame, means for positioning said member in accordance with gun elevation and sight depression, an assemblage of parts movable by said member and operatingly connected to said correction frame, target's deflection predicting apparatus operable to alter the position of said assemblage in train, a sighting optical system having adjustable reflecting means mounted on said correction frame, cross-levelling means adapted to displace said assemblage of parts, and training mechanism for said frames and sighting optical system.

45. In a director for use on a craft adapted to oscillate, rotatable apparatus comprising a main frame, a pivotally mounted correction frame, a sighting optical system having an optical element pivoted on the correction frame, a gyroscopic control for said optical element stabilizing the field of view of the optical system, an assemblage of interconnected parts, means for setting the same in accordance with the positioning of a gun, said assemblage being operatingly connected to said correction frame, cross-levelling means operable to displace said assemblage in its entirety in accordance with the oscillation of the craft about the line of sight of said optical system, and training mechanism for said rotatable apparatus.

46. In a director for use on a craft adapted to oscillate, rotatable apparatus comprising a main frame having a training axis, a correction frame pivoted thereto on said training axis and capable of angular displacement thereabout independently of the rotation of said main frame, a sighting optical system having an optical element pivoted on said correction frame, a firing mechanism, a gyroscopic control regulating said optical element to stabilize the field of view of the optical system and controlling a portion of said firing mechanism, a co-acting portion thereof partaking of the movement of said frames as the craft oscillates, means for moving said correction frame independently of said main frame about the training axis of the latter in accordance with the position of a gun and the oscillation of the craft in a direction angularly disposed to the other mentioned oscillation.

47. In a director for use on a craft adapted to oscillate, a rotatable main frame having a training axis, a correction frame pivotally mounted with respect thereto to be capable of angular adjustment independently of said main frame about said training axis, a sighting optical system having an individually pivoted optical element directly carried by said correction frame, position-governing means for said optical element, a cross-levelling optical system having an optical element directly pivotally carried by said main frame, means for correctively actuating said correction frame in accordance with corrections for a gun and in response to measures of the oscillation of the craft about the line of sight of the first mentioned optical system.

48. In a director for use on a craft adapted to oscillate, a rotatable main frame having a training axis, a correction frame pivoted thereon, a member having pivots which are supported by the first named frame and constituting mimic gun trunnions, a mimic gun, means coacting with said member and mimic gun to position the latter indicatively of the proper position for a real gun, a sighting optical system having an optical element carried by said correction frame, and an operating connection between said mimic gun and correction frame, including a member to which the mimic gun is pivoted.

49. In a director for use on a craft adapted to oscillate, a rotatable main frame, a correction frame pivoted thereon, a member pivoted to said main frame, a mimic gun connected to move with said member in changing its elevation, means to effect changes in the elevation of the mimic gun, a zenith member to which said mimic gun is pivoted, a sighting optical system having an optical element carried by said correction frame, and an operating connection between said zenith member and said correction frame.

50. In a director for use on a craft adapted to oscillate, a rotatable main frame, a correction frame pivoted thereon, a mimic gun trunnion member pivoted to said main frame, a mimic gun pivotally connected to said member, a zenith member to which said mimic gun is pivoted, means for elevating said mimic gun, a deflection frame connected to said zenith member, means operable to move a part of the latter toward the zenith of the heavens, deflection predicting mechanism adapted to deflect said deflection frame, a sighting optical system having an optical element carried by said correction frame, and an operating connection to the latter from said deflection frame.

51. In a director for use on a craft adapted to oscillate, a rotatable frame, a correction frame pivoted thereon, a mimic gun trunnion frame pivoted to said rotatable frame for displacement in accordance with gun elevation, a mimic gun connected thereto, a zenith member to which said mimic gun is pivoted, a deflection frame adjustably connected to said zenith member, a firing frame pivoted to said correction frame, a sighting optical system adjustable by movement of the last mentioned frame, an adjustable firing mechanism connected to said firing frame, means to actuate said gun trunnion frame to elevate the mimic gun, means to effect deflection of said mimic gun, and cross-levelling mechanism adapted to actuate said zenith member and mimic gun.

52. In a director for use on a craft adapted to oscillate, a main frame rotatable about a training axis, a correction frame pivoted thereto to be independently deflectible about said axis, a sighting optical system directly carried by said main frame except for an adjustable optical element thereof, said optical element being pivotally mounted on said correction frame, a gyroscope, pivotally connected inner and outer gimbal rings the former pivotally supporting the gyroscope and the latter being pivoted to said correction frame, and a connection between one of said gimbal rings and said optical element adapted to turn the latter through an angle equal to one-half of the angle of oscillation of the craft.

53. In a director for use on a craft adapted to oscillate, a pivotally mounted correction frame, a rotatable sighting system having an element pivotally mounted on said correction frame, a gyroscope, pivotally connected inner and outer gimbal rings the former pivotally supporting said gyroscope and the latter being pivoted to said correction frame, a connection between one of said gimbal rings and said optical elements adapted to turn the latter through an angle equal to one-half of the angle of oscillation of the craft, a series of members supported by said gimbal rings and said correction frame one of said members bearing on said gyroscope, said members being operable to actuate said connection between the ring and said optical element independently of said gyroscope.

54. In combination, a director for use on a craft adapted to oscillate comprising a rotatable main frame, a correction frame pivoted thereon, a sighting optical system having an optical element pivoted on said correction frame, a mimic gun, means for positioning the same in train and elevation, a connection between said mimic gun and correction frame, means operable in accordance with cross-levelling to actuate said connection, an auxiliary instrument associated with said director and operable to furnish measures of sight depression, and an operating connection from said instrument adapted to alter the elevation of said mimic gun.

55. In combination, a director for use on a craft adapted to oscillate comprising a rotatable sight device having a deflectible optical element, an assemblage of parts including a mimic gun and a deflection frame, an operating connection between said assemblage and optical element, means actuating said assemblage in accordance with cross-levelling of the oscillation of the craft, an auxiliary instrument operable to furnish measures of sight depression and predicted target's deflection, and operating connections from said instrument adapted to alter the elevation of said mimic gun and to actuate said deflection frame.

56. In combination, a director for use on an oscillatory craft comprising a rotatable sighting device having a deflectible optical element, an assemblage of interconnected parts including a mimic gun and a deflection frame, means for positioning the mimic gun in train and elevation, an operating connection between said assemblage and optical element, a cross-levelling device, means operable in accordance therewith to actuate said connection, a power drive, an instrument associated with said director which said power drive actuates, said instrument having sight depression determining mechanism and deflection measuring means, and operating connections from said mechanism to said mimic gun adapted to alter the elevation thereof and from said deflection measuring means to said deflection frame to actuate the same.

57. In combination, a director comprising a rotatable sighting device, a mimic gun, means operable to position said mimic gun in elevation and train, a power drive, an instrument associated with said director operable by said drive, and means under the control of said instrument adapted to be actuated to alter the train and elevation of said mimic gun.

58. In combination, a director comprising a rotatable sighting device, a mimic gun, means operable to position said mimic gun in train and elevation, a power drive, an instrument associated with said director operable by said drive, a compass intelligence transmission system extending to said instrument, control means for said system responsive to changes in compass indications, said compass intelligence system affecting operations of said instrument and means under the control of said instrument operable to alter the train and elevation of said mimic gun.

59. In combination, a director operable in accordance with compass actuations, a compass intelligence transmission system comprising a transmitter relatively remote to the director, a receiver at the director in circuit with said transmitter, selective circuits controlled by said receiver, and compass-movement reproducing means having separably energizable means selectively governed according to the control of said selective circuits.

60. In combination, a director operable in accordance with compass actuations, a compass intelligence transmission system comprising a plurality of transmitters apart from the director, a plurality of receivers at the director individually electrically connected to individual transmitters, sets of selective circuits respectively controlled by individual receivers, compass-movement reproducing means, and means to selectively place said reproducing means under the control of one or another of said sets of said selective circuits in response to the maintenance or lack of maintenance of synchronism between one of said transmitters and the receiver electrically connected therewith.

61. In combination, a director operable in accordance with compass actuations, a compass intelligence transmission system comprising a plurality of transmitters apart from the director, a plurality of receivers at the director individually electrically connected to individual transmitters, connections between said transmitters and between said receivers establishing predetermined rates of operation of connected transmitters and connected receivers, sets of selective circuits respectively controlled by individual receivers, compass-movement reproducing means, and means to selectively place said reproducing means under the control of one or another of said sets of said selective circuits in response to the maintenance or lack of maintenance of synchronism between one of said transmitters and the receiver electrically connected therewith.

62. A director comprising a mimic gun, elevating means therefor including means to set said gun in correspondence to gun elevation for range, means operable in accordance with variable sight depression, electric circuits controlled by the last named means to be energized in accordance with measures of sight depression and means responsive to the energization of said circuits operable to actuate said elevating means to position said mimic gun in accordance with gun elevation for changed range.

63. A director comprising a mimic gun, elevating means therefor including means to set said gun in correspondence to the elevation of a gun for range, means operable in accordance with variable sight depression, a gun elevation indicator operable with said elevating means, electric circuits controlled by the means variable according to sight depression to be energized in accordance with measures of sight depression, and means controlled by the energization of said circuits operable to actuate said elevating means and elevation indicator in accordance with gun elevation for changed range.

64. A director comprising a mimic gun, training mechanism therefor, means for modifying the train thereof, calculating mechanism operable to determine a target's deflection, circuit controlling means governed by said mechanism, electric circuits controlled by the last named means to be energized in accordance with the target's deflection, and means responsive to the energization of said circuits operable to actuate said train modifying means.

65. A director comprising a mimic gun, training mechanism therefor, a gun train indicator operable with said mechanism, means for modifying the train of said training mechanism, calculating mechanism operable to determine a target's deflection, circuit controlling means governed by said mechanism, electric circuits energized by the last named means in accordance with the target's deflection, and means responsive to the energization of said circuits operable to actuate said train modifying means.

66. A director comprising a mimic gun, training mechanism therefor, means for modifying the train thereof, calculating mechanism operable to determine a target's deflection, circuit controlling means governed by said mechanism, electric circuits controlled by the last named means to be energized in accordance with the target's deflection, and means responsive to the energization of said circuits operable to actuate said train modifying means, and train transmitting means operable to transmit the algebraic sum of the train and its modification.

67. A director comprising electrically controlled separate receivers of major and minor compass values, a connection establishing predetermined rates of operation of said receivers, selective electric switches associated with said receivers, switch-operating means controlled by the respective receivers operable to normally maintain one of said switches in a circuit-opening position while another of the switches is in a circuit-closing position, and means responsive to said receiver controlled means to determine the circuit opening and closing positions of said switches.

68. A director comprising electrically controlled separate receivers of movements corresponding to major and minor compass indications, said receivers being interconnected for operation at a predetermined ratio, reversing electric switches associated with individual receivers, switch-operating means controlled by the respective receivers, electro-magnetic means, compass indications measuring means operable thereby, a plurality of electrical circuits some including said electro-magnetic means for alternate control by different electric switches, and a make-and-break device automatically operable in response to the movements of said switches to deenergize circuits controlled by one of them.

69. In a director, a plurality of elements operable in conformity to the required train and elevation of a gun, certain of said elements being respectively movable proportionately to measures of compass displacement, sight depression and deflection, individual actuating means operatingly connected to the last referred to elements each said means being adapted to be operated in accordance with values of the quantity in accordance with which its associated element is operable and to be contributory to the positioning of others of said elements according to the required positioning of the gun, reversible and unidirectional electro-magnetic clutches individually controlling the respective actuating means in accordance with their respective stated characterizing quantities, said clutches having initially driven members all operable in the same direction, common operating means for driving said initially driven members, said reversible clutches each further comprising sets of selectable reversely operable driving members normally disengaged from the initially driven member, and a driven shaft responsively connected to both selectable reversely operable driving members, and means to selectively engage said initially driven member of each reversible clutch and one or the other of the selectable reversely operable driving members thereof.

70. In a director, a plurality of elements operable in conformity to the required train and elevation of a gun, individual actuating means operatingly connected to certain of said elements each adapted to be operated in accordance with values of a quantity distinct from the quantities in accordance with which the other individual actuating means are operated and contributory to the positioning of said elements, electro-magnetic power driven reversible and unidirectional clutches for operating said individual actuating means in accordance with their respective characterizing quantities, operating connections from said electro-magnetic clutches to said individual actuating means including clutches, substitutional manual operating means for the last named means, and actuating means for said last named clutches controlled by said manual operating means to operate the same to disconnect said operating connections from said electro-magnetic clutches to said individual actuating means.

71. In a director, a mimic gun, means for positioning the same in accordance with gun elevation, means to modify the position of said mimic gun in accordance with sight depression an electro-magnetic clutch for operating said modifying means, an electric circuit controlling said clutch, substitutional manual operating means for said modifying means, and an interrupter for said circuit operable with said manual operating means.

72. In a director, a mimic gun, mechanism adapted to train the same, means to modify such train in accordance with a target's deflection, an electro-magnetic clutch for operating said modifying means, an electric circuit controlling said clutch, substitutional manual operating means for said modifying means, and an interrupter for said circuit operable with said manual operating means.

73. In a director, a mimic gun, means for positioning the same in accordance with gun elevation, means to modify the position of said mimic gun in accordance with sight depression, a power driven clutch for operating said modifying means, a substitutional manual operating means for said modifying means, and a range indicator operable therewith.

74. In a director, a mimic gun, mechanism adapted to train the same, means to modify such train in accordance with a target's deflection, a power driven clutch for operating said modifying means, a substitutional manual operating means for said modifying means, and a deflection indicator operable therewith.

75. In combination, a director comprising a plurality of elements operable in conformity to the required positioning of a gun including its position in train with respect to a target's azimuthal position, actuating means therefor, an instrument associated with said director comprising algebraic adding mechanism having a part displaceable in accordance with the course of a ship carrying said instrument, a second part displaceable proportionately to the target's true bearing and a third part controlled by said other parts to algebraically add the displacements thereof and evaluate the angle between the line of said ship's heading and the line of sight to the target to establish the line of sight relatively to the ship's course, a movement-conveying drive to said first named part operable in accordance with compass indications including a power-driven clutch, and means to adjust said elements in train with respect to the established line of sight to have a given relation to the target's position.

76. In combination, a director comprising a plurality of elements operable in conformity to the required positioning of a gun, an instrument associated with said director, a movement conveying drive thereto operable in accordance with compass indications and including an electro-magnetic power driven clutch, a controlling circuit for said clutch, actuating connections from said instrument to said plurality of elements, substitutional manual operating means for said drive, and a circuit interrupter operable with said manual operating means.

77. In a director, training means for directing a line of collimation to a distant object, transmission means proportionately responsive thereto to transmit angular measures of train, parallax angle determining means comprising a gear responsive to measures of train, a member linearly displaceable thereby, another member linearly displaceable in accordance with measures of range, an element adapted to be positioned by movement of said members and a further member linearly displaceable by said element proportionately to the value of the parallax angle, and means to combine the measures of the parallax and train angles.

78. In combination, a director comprising mechanisms operable in accordance with the primary and correctional positioning of a gun in train and elevation, computing mechanism formed as a separate device but associated therewith, said mechanisms being interdependent upon each other, and connections between said director mechanism and computing mechanism operable to actuate each from the other.

79. In combination, a rotatable director having mechanism adjustable according to required gun train and elevation, computing mechanism formed as a device whose mechanism is separate and removed from that of the director, said computing mechanism being operable to determine requirements for the adjustment of the director mechanism, said computing mechanism being combined with said director for rotation therewith, and displaceable connections extending between said director mechanism and computing mechanism and being operable to actuate said mechanisms from each other.

80. In combination, a director provided with mechanism operable in accordance with a ship's azimuthal position, a computing device comprising members respectively representative of an own ship and a target, a compass dial co-acting with each of said members, a variable speed target's bearing integrator, differential mechanism having different portions respectively operable by said director mechanism and said integrator and a portion operable to actuate said ship representing member, means to set said target representing member, and operating connections from said integrator to the different compass dials.

81. In combination, a director for use on a ship comprising training means therefor, a deflectible sighting device, means operable independently of said training means and in accordance with the ship's oscillation to deflect said sighting device and mechanism actuated by said training means in accordance with changes in an own ship's course, a computing device associated with said director provided with members representative of own ship and a target, indicating means co-operative with said members, actuating means operable to relatively set said members and indicating means to indicate own ship's and the target's courses, and a connection from said deflectible sighting device to and actuatingly combined with said mechanism, and a further connection from such place of combination to the computing device to alter the course-indicating relation between the member that represents own ship and its indicating means.

82. In combination, a director, a computing device associated therewith provided with indicating means comprising an own ship's dial and a target dial having different axes of rotation, compass ring dials respectively concentric with said own ship and target dials, an observed bearing ring dial concentric with said own ship's dial and the compass ring associated therewith and being provided with an index, fixed indexes related to said dials, means to normally drive said own ship's, target's and compass dials from said computing device, compass-controlled means to relatively shift the own ship and target dials with respect to their respective compass dials upon a change of own ship's or target's course, and mechanism operable in accordance with the operation of the director in optically determining the target's bearing effective to adjust said observed bearing ring dial to relatively relate its index and said fixed indexes.

83. In combination, a director adapted to be trained, a computing device, said director having mechanism for operation in accordance with a target's deflection including a deflection frame pivoted about the training axis of said director, actuating means in said director including a shifting connection to said deflection frame for angularly displacing said frame, deflection-determining means in said computing device, and a driving connection therefrom extending away from said computing device to said shifting connection and controlling said deflection frame.

84. In combination, a director having mechanism for operation in accordance with a target's deflection, actuating means in said director for said mechanism, a computing device provided with means for determining the target's deflection required for the advance range of the target, deflection correction mechanism adapted to modify the operating of the deflection determining means and a control governing said actuating means from said deflection determining means.

85. In combination, a director having mechanism for operation in accordance with a target's deflection, actuating means in said director for said mechanism comprising a power device and an operating connection between the same and said deflection mechanism, a computing device combined with said director provided with means for determining a target's deflection required for the advance range of the target, and a control for the power device in the director operable to the extent necessary to satisfy the target's deflection as determined by said computing device.

86. In combination, a rotatable director comprising sighting means including an optical part adapted to be deflected, training mechanism for said director, actuating means for moving said optical part, a computing device associated with said director and provided with means to determine a target's deflection required for the advanced range of the target, and an operating connection between the deflection determining means of the computing device and the optical part actuating means in the director.

87. In combination, a director comprising a part adapted to be set in accordance with the gun elevation of a gun and actuating means for said part, a computing device associated with said director comprising mechanism operable to continuously determine the sight depression for such gun, and an operative connection between said computer mechanism and the actuating means of said part, in the director adapted to alter the position of said part in accordance with changes in sight depression for the gun.

88. In combination, a director comprising a part adapted to be set, means for setting said part in accordance with the required gun elevation and train of a gun, a computing device associated with said director comprising sight depression and target deflection determining means, and operating connections from said determining means to said setting means operable to modify the setting of said part in accordance with changes in sight depression and a target's deflection.

89. In combination, a director comprising a mimic gun, intelligence transmission means, mechanism for setting said mimic gun and transmission means in accordance with the required gun elevation and train of a gun, a computing device associated with said director comprising sight depression and target deflection determining means, and operating connections from said determining means to said setting mechanism operable to actuate the same in correspondence to changes in sight depression and a target's deflection.

90. In combination, a director comprising a part adapted to be set in accordance with the gun elevation of a gun, means for setting said part, a computing device associated with said director comprising range determining means, mechanism co-acting therewith to determine advance range and translate the same into sight depression, and an actuating connection from the last named means to said part setting means responsive to changes in sight depression to alter the position of said part for corresponding changes in sight depression.

91. In combination, a director mounted to be responsive to oscillations of an unstable body and comprising a part adapted to be set in accordance with the required position of a gun, intelligence transmission means, a gyroscope, gun firing mechanism having co-acting elements respectively controlled by said gyroscope and a portion of said director which is responsive to the disturbances thereof, and a computing device operable to determine changes required in the setting of a gun due to changes in range and deflection, said device being actuatingly connected to said part and transmission means.

92. In combination, a director comprising a main rotatable portion having a training axis for the director, telescopic sighting means having a portion thereof in fixed relation thereto and having an adjustable optical part, a gyroscope controlling said optical part, mechanism and intelligence transmission means adapted to be operated in accordance with the required setting of a gun, said mechanism having parts operable in accordance with the training of said sighting means and the adjustment of its adjustable optical part, an instrument for computing data for setting such gun carried by said director, and connections between said instrument and director operable to actuate portions of said mechanism and transmission means.

93. In combination, a director comprising a rotatable portion, telescopic sighting means partly in fixed relation thereto and having an adjustable portion, means stabilizing the field of view of said sighting means, a member adapted to be set and intelligence transmission means, mechanism independently operable by different operators to set said member and transmission means in accordance with the gun elevation and train required by a gun, said mechanism including relatively adjustable members commonly adjustable according to the gun elevation one of said members being a mimic gun, and another of said members being mounted for adjustment according to a target's deflection and connected to said sighting means to adjust the same, a computing instrument operable to determine sight depression and a target's deflection, and connections therefrom to said director mechanism to respectively correctively actuate the said mimic gun and said last named member for changes in sight depression and a target's deflection.

94. In combination, a director comprising a rotatable portion, a plurality of sighting devices in fixed relation thereto and having adjustable optical parts, a part adapted to be set, intelligence transmission means, mechanism with which said adjustable optical parts co-operate independently operable by a plurality of operators to set said part and actuate transmission means in accordance with the required gun elevation and train of a gun and to introduce a cross-levelling correction therefor, and a computing instrument connected to said mechanism to actuate said part and transmission means in accordance with changes in sight depression and a target's deflection.

95. In combination, a director comprising a rotatable portion, mechanism and intelligence transmission means operable in accordance with the required gun elevation and train for a gun, a power-supply, a computing instrument carried by the rotatable portion of said director operable to determine sight depression and a target's deflection, operating connections from said power-supply to said computing instrument, and actuating connections from said instrument to said director mechanism and to said intelligence transmission means to modify the operation thereof in accordance with changes in sight depression and a target's deflection.

96. In combination, a director comprising a rotatable portion, compass intelligence receivers, gun elevation and train measuring mechanism and transmitters, a power-supply, a computing instrument carried by the rotatable portion of said director comprising mechanism to determine sight depression and a target's deflection, an operating drive from said power-supply to the mechanism of said computing instrument, interruptible drives from said power-supply to the mechanism of said computing instrument, a control responsive to said compass intelligence receivers and operable in accordance with the reception of compass indications to actuate one of said drives and others of said drives being responsive to the actuations of the computing instrument mechanism, and connections from the latter to said director mechanism and gun elevation and train transmitters.

97. In combination, a rotatable director comprising train-measuring mechanism and gun elevation determining mechanism, a computing instrument carried by said director and comprising means operable to determine corrections proportionately to sight depression and a target's deflection, and means respectively actuated by said correction-determining means and operatingly connected respectively to said training and gun elevation determining means to apply the aforesaid corrections thereto.

98. In combination, a rotatable director having adjustable sighting means and mechanism operable in accordance with the required train and elevation of a gun and to adjust said sighting means, a range keeper mounted on said director and formed as a self-contained instrument containing computing mechanism, and operating connections between said director and range keeper extending from each to the other and operable to affect the mechanism of each by that of the other.

99. In combination, a director comprising a rotatable portion, telescopes in fixed relation thereto and having adjustable optical parts and means co-operative therewith to measure gun elevation and train, a range keeper carried by said director provided with means operable in accordance with changing range elevation and a target's deflection, and operating connections between the means of said range keeper and director for correctively actuating said first named means in accordance with changing range elevation and target's deflection.

100. In combination, a director having telescopes carried thereby and means to measure gun elevation and train including actuating means operable in accordance with images of distant objects viewed in said telescopes, a range-keeper mounted on said director, mechanism in said range keeper operable in accordance with sight depression and a target's deflection, and operating connections from said mechanism to said measuring means to correctively actuate said means in accordance with changes in sight depression and a target's deflection.

101. In combination, a director mounted for rotation and comprising a telescope for viewing a target, means for determining the gun elevation for a gun and means to correct the determined gun elevation for motion of such gun about the line of sight, and a range keeper mounted on said director and provided with means for determining changes in sight depression, and actuating connections from the last named means to said gun elevation determining means to correct the operation thereof for changes in sight depression.

102. In combination, a director having mechanism operable in accordance with the required train and elevation of a gun including power-actuated driving devices, a range keeper having computing mechanism for operation in accordance with the actuation of said devices, operating connections between said director and range keeper mechanisms to operate each from the other, some of said connections being operable by said driving devices and including clutches, and substitutional operating means connected to the last named connections and provided with actuating mechanism controlling said clutches to disconnect such connections from said driving devices.

103. In combination, a rotatable director having a training axis, a range keeper, combined therewith, means mounted in said director to be displaceable about its training axis to observe a target's bearing, a time-controlled power supply, variable speed mechanism having a member for uniform operation and adapted to generate bearing, an indicator responsive to the generated bearing mechanism, an observed bearing indicator, said mechanism and indicator being in said range keeper, and actuating drives from said power supply and the target's bearing observing means to the said member of the bearing generating mechanism and to the observed bearing indicator in the range keeper, said indicators being correlated to also indicate the relationship of the observed and generated bearings.

104. In combination, a rotatable director having mechanism including means settable in accordance with the elevation and train of a device to be aimed at a target, said director being displaced to one side of and above said device, a separately formed range keeper carried by said director and having mechanism including means to physically compute settings for the settable means of the director, and operating connections between the mechanisms of said director and range keeper for effecting co-operative actuation thereof, said mechanisms respectively including horizontal and vertical parallax measuring means operable to correct parts of said mechanisms for horizontal and vertical parallax due to the position of said director with respect to said device.

105. In a range keeper, an inverse-range-determining mechanism comprising an element operable according to time, rate-introducing means responsive thereto and a quotient-representing element actuated by said rate-introducing means, mechanism operable in accordance with present range to variably relate said rate-introducing means to said first and last named elements and including a cam, said cam and quotient-representing element being co-operatively formed to co-act with said first named element to actuate said quotient-representing element according to time divided by range, bearing generating mechanism comprising an initially driven member responsive to said quotient-representing element, rate introducing means and a product representing member, said second named rate introducing means being variably adjustable to said first and last named members in accordance with the total deflection of a target with respect to an own ship, said product-representing member being operable proportionately to the product of said time divided by range multiplied by said total deflection.

106. In a range keeper, a movable member representative of an own ship and a mechanical vector movable therewith, mechanism operable in accordance with compass indications to automatically set said member and vector in accordance with an own ship's course, and means to also set said vector according to an own ship's speed.

107. In a range keeper, mechanical vectors respectively settable in accordance with a target's course and speed and an own ship's course and speed, resolving means for both vectors adapted to measure deflection components thereof, means algebraically adding these components, bearing generating mechanism, and computing mechanism comprising range-inverting elements one of which is operable according to range, multiplying means operable in accordance with time and rate-introducing means responsive to said multiplying means and adjustably correlated thereto and another of said range-inverting elements by the first identified element, whereby said second named element is operable in accordance with time divided by range, said bearing generating mechanism having parts actuated respectively by said second named range-inverting element and measures of the algebraic sum of said components and another part operable proportionately to the product thereof.

108. In a range keeper, mechanical vectors respectively set in accordance with a target's course and speed and an own ship's course and speed, resolving means for both vectors adapted to measure deflection components thereof, present range determining means, an arbitrary deflection measuring mechanism operable by said present range determining means and by the part of said resolving means which measures the deflection component of the target's course and speed vector, algebraic adding means operable by the part of said resolving means which determines deflection due to own ship, differential means operable by said algebraic adding means, an electrical control responsive to said differential means, and means responsive to said electrical control effective to actuate said differential means and co-act with said adding means to actuate said electrical control in accordance with measures of total deflection.

109. In a range keeper, algebraic adding means operable by measures of deflection due to a target's and an own ship's movements, differential means, an electrical switch operable thereby, a device in circuit with said switch to be operated by the same in accordance with measures of deflection and actuating means responsive to such device and co-acting with said algebraic adding means to operate said differential means to control said switch in accordance with measures of deflection.

110. In a range keeper, different movable eletively ments respectively operable in accordance with measures of deflection due to a target's and an own ship's movements, deflection correction mechanism comprising a member responsive to said element that is operable according to the target's deflection, means adjustable in accordance with a deflection correction and another member movable proportionately to the actuation of the first named member modified by the adjustment of said correcting means, algebraic adding means having parts respectively actuated in accordance with displacements of said element that is operable according to the own ship's deflection and the last named member of said correction mechanism and another part actuated proportionately to the algebraic sum of the first named parts, differentially controlled transmitting means and following means therefor, said transmitting means being operated from said adding and following means.

111. In a range keeper, different movable elements respectively operable in accordance with measures of deflection due to a target's and an own ship's movements, deflection correction mechanism actuated by said element that is operable according to the target's deflection and to correctively modify such actuation, algebraic adding means responsive to said correction mechanism in accordance with correctively modified measures of the target's deflection, and from said element that is operable in accordance with the own ship's deflection, transmitting means operable proportionately to the algebraic sum produced by said adding means, and indicating means actuated in response to the resultant action of said adding means and said deflection correction mechanism.

112. In a range keeper, means having separably operable portions for respectively determining measures of deflection due to a target's and an own ship's movements, corrective mechanism responsive to the target deflection measuring portion of said means and having an element adjustable to arbitrarily correctively alter the target's deflection, algebraic adding means comprising parts operable from said element and the portion of said first named means that is operable to determine the own ship's deflection, and another part actuated proportionately to the resultant sum of own ship's deflection and the arbitrarily corrected target's deflection, a circuit controller governed by said algebraic-adding means, and an electrical transmitting device responsive to said circuit controller operable correspondingly to the action of the resultant sum of said adding means.

113. In a director for use on a craft adapted to oscillate, a rotatable main support mounted to partake of the oscillatory movement of the craft and to turn about a training axis only, optical sighting and cross-levelling systems each having an independently adjustable optical element, the remainder of said optical systems being in fixed correlation to said main support, a displaceable deflecting member for said adjustable optical element of the sighting system carried by said support, successively connected frames combined for common tilting in elevation with respect to said support, one of said frames being displaceable for deflection between the director and a target, an operating connection between the last named frame and said deflecting member, cross-levelling mechanism operatingly connected to the adjustable optical element of the cross-levelling system and through said frames and operating connection to said deflecting member and adjustable optical element of the sighting system, elevating and training means for said connected members and rotatable support, computing mechanism including means to determine sight depression and deflection, electro-magnetic driving devices operable in accordance with said determining means, operating connections from said electro-magnetic devices respectively to one of said successively connected frames to displace the same according to sight depression and to said deflection frame to displace it and said deflecting member and adjustable sighting optical element according to deflection, and data-disclosing means co-operatively combined with said computing mechanism.

114. In an instrument of the character described, a plurality of devices each comprising a measured quantity transmitting mechanism comprising a differential, cam mechanism operated thereby, an electrical switch reversely operable to be closed by said cam mechanism according to a positive or negative progression of the quantity, alternative circuits correspondingly energized by reverse closures of said switch, and quantity-applying means and means responsive to the energized circuit for applying increments of the quantity to different parts of said differential and effecting an opening of said switch when the differently applied measures balance, and means driving one of said devices at a different rate than another whereby the different devices are suited to different values.

115. An instrument of the character described having a plurality of devices each comprising a measured quantity transmitting mechanism comprising a differential, cam mechanism operated thereby, an electrical switch reversely operable to be closed by said cam mechanism according to a positive or negative progression of the quantity, alternative circuits correspondingly energized by reverse closures of said switch, and quantity-applying means and means responsive to the energized circuit for applying increments of the quantity to different parts of said differential and effecting an opening of said switch when the differently applied measures balance, selective switches in the circuits of one of said devices, auxiliary quantity-applying means for this device operable at a different rate than that of the principal quantity-applying means therefor, means for placing the circuits of said device under the control of the selected switch whereby this device is suited to operation in accordance with different values, in combination with a mechanism subject to different controls, and selective means, operable to place the last named mechanism under the control of the switch of one or another of said devices.

116. In an instrument of the character described, a measured quantity transmitting mechanism comprising a differential, cam mechanism operated thereby, an electrical switch reversely operable to be closed by said cam mechanism according to a positive or negative progression of the quantity, alternative circuits correspondingly energized by reverse closures of said switch, and means for applying increments of the quantity to different parts of said differential and effecting an opening of said switch when the differently applied measures balance.

117. In in instrument of the character described, a measured quantity transmitting mechanism comprising a differential, a plurality of cams driven thereby at different speeds, a plurality of pivoted levers having a fixed fulcrum, an arm pivoted to one pivoted lever and bearing against another, yielding means connecting said levers and said arm to a lever, a movable electrical control carried by said arm, normally fixed electrical contacts, means for applying increments of the quantity to one part of the differential to engage said movable contact with one or another of the fixed contacts, and means to operate another part of said differential to coact with the quantity increment applying means to disengage said contacts.

118. In a range keeper, range determining means, mechanism operated thereby to convert range into the reciprocal of range, multiplying means actuated in accordance with time and co-operating with said mechanism to multiply the reciprocal of the range by time, and a multiplying device comprising a part operable by said mechanism proportionately to time multiplied by the reciprocal of range, another part set in accordance with the deflection of a target relative to an own ship and co-acting with the first named part to multiply time multiplied by the reciprocal of range by deflection to generate a target's bearing.

119. In a range keeper, range determining means, an inverse range cam operated thereby, and an inverse range integrator comprising a disk rotatable in accordance with time, rotating means driven thereby and set by said cam radially of said disk, and a conical roller driven by said rotating means with increasing rapidity as said rotating means is disposed further away from the center of said disk, said roller operating proportionately to time multiplied by the reciprocal of range.

120. In a range keeper, means for determining range within predetermined limits, inverse range calculating mechanism including a rotary member properly operable within the predetermined range limits, spaced stops movable with said member and definitely related to the specified limits, a stoppage device normally permitting free operation of said range determining means but adapted to be actuated by either of said stops to interrupt the operation thereof.

121. In a range keeper, means to determine an own ship's range rate and a target's range rate, adding mechanism having different portions operated respectively by the own ship's and target's range rate determining means, multiplying means co-acting with the target's range rate determining means to combine therewith a correction for the effect of movement of an own ship upon a projectile fired at a target, another adding mechanism comprising a portion actuated from the first named adding mechanism in accordance with the sum of an own ship's and a target's range rates, a portion responsive to said multiplying means, and a part controlled by said portions and operable thereby proportionately to a prediction range rate.

122. In a range keeper, present range measuring mechanism means to determine an own ship's range rate and a target's range rate, mechanism operable by said means to add said range rates, multiplying means co-acting with the target range rate determining means to combine therewith a correction for the effect of a movement of an own ship on a projectile fired at a target, another adding mechanism operable by the first adding mechanism and by said multiplying means to give the sum of own ship and target range rates affected by the indicated correction to constitute a range prediction rate, a multiplier of the range prediction rate by the time of flight of a projectile operable to measure the range prediction, and a device operated by said multiplier and present range measuring mechanism to be actuated in accordance with advanced range.

123. In an instrument of the character described, range converting mechanism operable in accordance with advance range and comprising co-acting elements, one of which is operable in correspondence to a straight line approximation of sight depression, another of said elements being operable in accordance with complementary increments of sight depression, and means to algebraically combine the actuations of said elements to give measures of sight depression.

124. In an instrument of the character described, a range converter cam operable in accordance with advance range, a sector forming a follower for said cam and operable thereby to have an angular displacement proportionate to the difference between approximate and calculated sight depression, means operable to approximate sight depression, and adding means for combining actuations of the last named means and said sector to produce a resultant movement of said adding means corresponding to an angular measure of sight depression.

125. In an instrument of the character described, a range converter cam operable in accordance with advance range, a sector forming a follower for said cam and operable thereby to effect a complementary measure of sight depression, said cam being shaped to include a correction for vertical parallax, means operable proportionately to approximate sight depression, and means for combining actuations of the last named means and of said sector to produce a resultant movement of said combining means corresponding to a measure of sight depression corrected for vertical parallax.

126. In an instrument of the character described, advance range determining means, differential mechanism operable in part therefrom through means which operates such parts in accordance with a mean measure of sight depression, conversion means operable by said advance range determining means to operate another part of said differential mechanism proportionately to a measure of sight depression that is equal to the difference between the mean and real measure of sight depression, said differential means having another part operable proportionately to the algebraic sum of the quantities applied to its first two named parts.

127. In a range keeper, computing mechanism operable to generate target bearing, means operable separately from said mechanism proportionately to observed target bearing, and indicating means comprising rotary dials one circumscribing the other, the circumscribed dial representing a vessel and having an azimuth scale, the circumscribing dial constituting a compass dial, both of said dials being responsive to said computing mechanism in accordance with generated target's bearing, an outer annular dial surrounding said circumscribing dial and responsive to said means and a fixed index member with which the circumscribed dial and said outer annular dial co-act to indicate generated target bearing and afford comparison of the same with observed target bearing.

128. In an instrument for use on a craft adapted to oscillate, a part constituting a mimic gun adapted to be set in accordance with gun elevation, means for so setting said part, another part operable proportionately to sight depression to modify the setting of said first named part, a plurality of relatively adjustable interconnected members correlated to said first named part for rigid combination therewith to partake of the elevational setting thereof in response to the combined actuations of said first and second named parts, gun-firing mechanism having contacts connected to and adjustable by said interconnected members and relatively movable upon oscillation of the craft to close a gun-firing circuit.

129. In an instrument for use on a craft adapted to oscillate, a part constituting a mimic gun adapted to be set in accordance with gun elevation, means for so setting said part, a second part operable proportionately to sight depression to modify the setting of said first named part, a plurality of relatively adjustable interconnected members correlated to said first named part for rigid combination therewith to partake of the elevational setting thereof in response to the combined actuations of said first and second parts, a corrective third part in operative combination with said interconnected members and actuated proportionately to oscillatory departures of the craft from a level position, and gun firing mechanism having contacts connected to and adjustable by said interconnected members that are responsive to said first and second parts.

130. In mechanism for converting range to the corresponding sight depression, a driving member rotatable in accordance with range, a controlling means, a plurality of controlling elements each representing a different ballistic condition, the controlling means and the elements being jointly operable by the driving member, a source of power, a member driven thereby to represent sight depression, means for controlling the source of power jointly by the controlling means and any one of the controlling elements and means for selecting the controlling element to be effective in the control of the source of power.

131. In mechanism for converting range to the corresponding sight depression, a driving member rotatable in accordance with range, converting means actuated by the driving member, a source of power, a plurality of devices for controlling the source of power and operable in accordance with different ballistic conditions, means for actuating the devices jointly by the driving member and the converting means, a member driven by the source of power in accordance with sight depression and means for selecting the controlling devices whereby the driven member will be actuated in accordance with the sight depression corresponding to a selected ballistic condition and the range introduced by the driving member.

132. In mechanism for converting range to the corresponding sight depression, a driving member rotatable in accordance with range, a plurality of cams representing different ballistic conditions and actuated by said driving member, a source of power, a member driven by said source of power in accordance with sight depression and means for selectively controlling the source of power from the cams, whereby the movement of the driven member will be in accordance with the sight depression corresponding to a selected ballistic condition.

133. In fire control apparatus, the combustion of mechanism for converting range to the corresponding sight depression, a driving means under the control of the mechanism, a member operable in accordance with the determined sight depression and an operating connection between the driving means and the member, auxiliary mechanism for converting range to the corresponding sight depression, an operating connection between the member and the mechanism, a substitutional device for actuating the auxiliary mechanism and the member and means associated with the device for rendering the operating connection betwen the driving means and the member ineffective.

134. A director comprising remotely controlled separate receivers, means for predetermining the rates of operation of said receivers, selective controlling means associated with said receivers, means controlled by the respective receivers operable normally to maintain one of said control means in the effective position and the other in the ineffective position, and means responsive to said receiver controlled means to determine the position of said control means.

135. In a director, a mimic gun, means for positioning the same in accordance with gun elevation, means to modify the position of said mimic gun in accordance with sight depression, power means for operating said modifying means, manually operable means selectively substitutional for said power means, and means actuated by operation of said manual means to render the power means inoperative during operation of said manual means.

136. In a director, a mimic gun, mechanism adapted to train the same, means to modify such train in accordance with a target's deflection, selectively connectible power and manual operating means for said modifying means, and a deflection indicator operable therewith.

HANNIBAL C. FORD.